(12) United States Patent
Kawata et al.

(10) Patent No.: US 7,161,193 B2
(45) Date of Patent: Jan. 9, 2007

(54) ELECTRO-OPTICAL DEVICE AND ELECTRONIC APPARATUS

(75) Inventors: Hidenori Kawata, Chino (JP); Yoshifumi Tsunekawa, Chino (JP); Tomohiko Hayashi, Kokubo (JP)

(73) Assignee: Seiko Epson Corporation, Tokyo (JP)

( * ) Notice: Subject to any disclaimer, the term of this patent is extended or adjusted under 35 U.S.C. 154(b) by 86 days.

(21) Appl. No.: 11/115,139

(22) Filed: Apr. 27, 2005

(65) Prior Publication Data

US 2005/0199889 A1 Sep. 15, 2005

Related U.S. Application Data

(63) Continuation of application No. 10/693,963, filed on Oct. 28, 2003.

(30) Foreign Application Priority Data

Oct. 31, 2002 (JP) .............................. 2002-318624
Sep. 12, 2003 (JP) .............................. 2003-321783

(51) Int. Cl.
*H01L 31/0328* (2006.01)

(52) U.S. Cl. ...................... 257/184; 257/187; 257/225; 257/232; 257/258; 257/292; 257/296

(58) Field of Classification Search ..................... None
See application file for complete search history.

(56) References Cited

U.S. PATENT DOCUMENTS 6,610,997 B1 8/2003 Murade
6,621,546 B1* 9/2003 Yang et al. .................. 349/141
6,809,338 B1 10/2004 Murade
6,850,292 B1 2/2005 Murade
2001/0029070 A1* 10/2001 Yamazaki et al. .......... 438/149
2002/0008240 A1 1/2002 HIrabayashi et al.

FOREIGN PATENT DOCUMENTS

| JP | A-10-197897 | 7/1998 |
|---|---|---|
| JP | A-2001-249625 | 9/2001 |
| JP | A-2001-281684 | 10/2001 |
| JP | 2001-311964 | 11/2001 |
| JP | A-2001-330857 | 11/2001 |
| JP | A-2001-356371 | 12/2001 |
| JP | 2002-090721 | 3/2002 |
| JP | A-2002-149087 | 5/2002 |
| JP | A 2002-156652 | 5/2002 |
| JP | A-2002-158360 | 5/2002 |
| JP | A2002-215064 | 7/2002 |
| JP | A-2002-244155 | 8/2002 |

* cited by examiner

Primary Examiner—Wai-Sing Louie
(74) Attorney, Agent, or Firm—Oliff & Berridge, PLC

(57) ABSTRACT

There is provided an electro-optical device including, above a substrate, data lines extending in a first direction, scanning lines extending in a second direction and intersecting the data lines, pixel electrodes and thin film transistors disposed so as to correspond to intersection regions of the data lines and the scanning lines; and storage capacitors electrically connected to the thin film transistors and the pixel electrodes, the thin film transistors including semiconductor layers having channel regions which extend in a longitudinal direction and channel adjacent regions which extend further from the channel regions in the longitudinal direction, and the scanning lines including light-shielding parts disposed at sides of the channel regions.

15 Claims, 24 Drawing Sheets

ELECTRO-OPTICAL DEVICE AND ELECTRONIC APPARATUS

This is a Continuation of application Ser. No. 10/693,963 filed Oct. 28, 2003. The entire disclosure of the prior application is hereby incorporated by reference herein in its entirety.

BACKGROUND OF THE INVENTION

1. Field of Invention

The present invention relates to a technical field of an active-matrix-type electro-optical device, and more particular, technical fields of an electro-optical device having a structure where a thin film transistor (Thin Film Transistor; hereinafter referred to as "TFT") for switching a pixel is included in a laminated structure on a substrate, a method for manufacturing the same, and an electronic apparatus having the same as a light valve. The present invention also relates to a technical field of an electrophoresis device, such as an electronic paper, an EL (electroluminescent) device, and a device using an electron emission element (a field emission display and a surface-conduction electron-emitter display).

2. Description of Related Art

In an active-matrix-type electro-optical device, when incident light is exposed to a channel region of a pixel switching TFT provided in each pixel, excitation due to light causes light-leakage current so that properties of the TFT are changed. Particularly, in an electro-optical device for a light valve of a projector, because the intensity of incident light is very high, it is important to shield a channel region or peripheral region of the TFT from incident light.

Therefore, in the related art, such channel regions or peripheral regions are formed of light-shielding films defining opening of each pixel provided at a counter substrate, or data lines which are made of metal film such as Al (aluminum) or the like and pass over TFTs on a TFT array substrate. Further, light-shielding films made of high-melting-point metal or the like may be sometimes provided also under the TFTs above the TFT array substrate.

As described above, when light-shielding films are provided below the TFT, back side reflected light from a TFT array substrate or returning light, such as transmitted light transmitting through a prism from another electro-optical device, when a plurality of electro-optical device and prisms constitute one optical system, can be in advance prevented from being incident on the TFT of the electro-optical device.

However, there are the following problems with regard to each light-shielding technique described above. That is, first, according to a technique that a light-shielding film is formed on a counter substrate or a TFT array substrate, because the light-shielding film is separated through, for example, a liquid crystal layer, an electrode, an interlayer insulating film or the like far apart from the channel region in three dimensions, it is not sufficiently shielded from light incident between them at an angle. Particularly, in a small-sized electro-optical device used as a light valve of a projector, because incident light is a light beam obtained by wringing light from a light source through a lens, and includes unnegligible slant-incident component, for example, 10% slant-incident components at ten to fifteen angles from a vertical direction with respect to a substrate, being insufficiently shielded from such slant-incident light may be practically problematic.

In addition, light, which travels from a region free of light-shielding film to an electro-optical device, reflects onto a top surface of a substrate, top surfaces of light-shielding films formed on the substrate, or bottom surfaces of data lines, that is, inside surfaces of sides adjacent to channel regions. Sometimes, multi-reflected light, which is obtained by reflecting such reflected light onto a top surface of the substrate or inside surfaces of the light-shielding films or data lines again, may finally arrive onto channel regions of a TFT.

Particularly, as high precision of electro-optical device or fine pixel pitch is facilitated to meet recent, general requirements of high-quality display image, or light intensity of incident light is increased to display brighter image, it is more difficult to execute sufficient light shielding using various light-shielding techniques described above. Quality of display image may become worse due to flicker generated by characteristic change of the TFT transistor.

Further, although formation regions of light-shielding film may be broadened so as to enhance such light-resistant property, because enhanced aperture ratio of each pixel is basically requested to enhance brightness of display image, it is difficult to accomplish such enhancement of light-resistant property by broadening formation regions of the light-shielding films. Also, as described above, considering inside-reflected light or multi-reflected light due to light-shielding films, that is, lower light-shielding films under the TFT or upper light-shielding films above the TFT made of data lines and the like, optionally broadening the formation regions of light-shielding films will result in increase of such inside-reflected light or multi-reflected light, which is a difficult problem to be addressed.

SUMMARY OF THE INVENTION

Accordingly, the present invention provides an electro-optical device capable of suppressing generation of light leakage current and displaying high-quality image free of flicker or the like by enhancing light-shielding performance of the TFT to the semiconductor layer. The present invention provides an electronic apparatus including such an electro-optical device.

In order to achieve the above, the electro-optical device according to an aspect of the present invention includes, above a substrate, data lines extending in a first direction, scanning lines extending in a second direction and intersecting the data lines, pixel electrodes and thin film transistors provided so as to correspond to intersection regions of the data lines and the scanning lines, and storage capacitors electrically connected to the thin film transistors and the pixel electrodes. The thin film transistors include semiconductor layers having channel regions which extend in a longitudinal direction and channel adjacent regions which extend further from the channel regions in the longitudinal direction, and the scanning lines include light-shielding parts disposed at sides of the channel regions.

According to an aspect of the present invention, due to the light-shielding parts, incident light and returning light, which travel at an angle onto the surface of the substrate, and the slant light, such as the inside-reflected light and the multiple-reflected light based on these, can be at least partially prevented from entering into the channel regions.

In an aspect of an electro-optical device according to the present invention, the scanning lines preferably include main body parts extending in a direction intersecting the longitudinal direction and having gate electrodes of the thin film transistors overlapping the channel region in plan view, and horizontal protrusions protruding from the main body parts in the longitudinal direction at sides of the channel adjacent regions in plan view and constituting the light-shielding parts.

According to the above electro-optical device, the scanning lines include the horizontal protrusions protruding along the channel regions at the sides of the channel regions from the main body parts which include gate electrodes of the thin film transistors in plan view. Therefore, the incident light and the returning light, which travel at an angle with respect to the surface of the substrate and the slanted light, such as the inside-reflected light and the multiple-reflected light based on the incident light and the returning light, can be at least partially prevented from entering into the channel regions and the channel adjacent regions, due to light absorption and light reflection, particularly by the horizontal protrusions, as well as by the main body parts which include the gate electrodes among the scanning lines. At this time, particularly, since the light shielding is performed by the horizontal protrusions which are provided at positions where the interlayer distance from the channel adjacent regions is very short, that is, at the interlayer positions separated by the thickness of the gate insulating films, it is possible to further effectively perform the light-shielding.

For example, on the substrate, in a case wherein the lower light-shielding films are provided at the lower sides of the thin film transistors, since the construction that the channel adjacent regions or the channel regions are interposed between the lower light-shielding films interlayer distance of which is relatively short and the main body parts or the horizontal protrusions which function as light-shielding films can be obtained, it is possible to obtain the excellent light-shielding performance for the slanted light.

As a result, according to the above aspect, since the light-resistant property can increase, it is possible to efficiently control the switching of the pixel electrodes by the thin film transistors light leakage current of which is reduced under such a severe condition wherein strong incident light or returning light enters, and finally, to display images with high brightness and high contrast.

In one aspect of an electro-optical device according to an aspect of the present invention, it is preferable that the main body parts and the horizontal protrusions be formed of the same film in one body.

According to the above aspect, in the manufacturing process of the electro-optical device, since the light-shielding protrusions can be formed by the process of forming the scanning lines with the main body parts, any additional process is not necessary to form the protrusions. Therefore, it is possible to facilitate simplification of the laminated structure and the manufacturing process.

Furthermore, in an aspect that the horizontal protrusions are provided, it is preferable that the horizontal protrusions protrude at source side and drain side at every channel region in plan view.

According to the above aspect, by these protrusions, it is possible to enhance the light-shielding performance for the slanted light that enters from various directions three-dimensionally. Further, a total of four horizontal protrusions may be provided at the source side, the drain side, and both sides thereof at every thin film transistors.

In another aspect of the electro-optical device of the present invention, the thin film transistors include semiconductor layers having channel regions which extend in longitudinal direction, the electro-optical device may include upper light-shielding films which cover at least the channel regions of the thin film transistors from the upper side, and at least a part of the upper light-shielding films is formed in a concave shape on the cross section which is perpendicular to the longitudinal direction of the channel region, as viewed from the channel regions.

According to the above aspect, the upper light-shielding films covering at least the channel regions from the upper sides are provided, and at least a part of the upper light-shielding films is formed in a concave shape on the cross section perpendicular to the longitudinal direction of the channel region, as viewed from the channel regions. In other word, the lower side has a concave shape. For the reason, in comparison to the case that the upper light-shielding films are flat, the incident light which travels at an angle with respect to the surface of the substrate and the slanted light, such as the inside-reflected light and the multiple-reflected light based on the incident light and the returning light, can be prevented more effectively from entering from the slanted upper side finally into the channel regions by the upper light-shielding films.

For example, in a case wherein the lower light-shielding films are provided at the lower side of the thin film transistors above the substrate, since the construction that the channel regions are interposed between the lower light-shielding films and the upper light-shielding films, it is possible to obtain the excellent light-shielding performance for the slanted light. At that time, at least a part of the lower light-shielding films may be formed in a concave shape on the cross section, which is perpendicular to the longitudinal direction of the channel region, as viewed from the channel regions, contrary to the unevenness of the aforementioned upper light-shielding films.

As a result, in accordance with the aspect, since the light-resistant property can increase, it is possible to efficiently control the switching of the pixel electrodes by the thin film transistors leakage current of which light is reduced under such a severe condition that strong incident light or returning light enters, and finally, to display images with high brightness and high contrast.

In another aspect of the electro-optical device of the present invention, the thin film transistors include semiconductor layers having channel regions which extend in the first direction. The scanning lines include main line portions including gate electrodes of the thin film transistors which face the channel regions with gate insulating films interposed therebetween and extending in the second direction which intersects the first direction in plan view, and surroundings parts which extend to surround the semiconductor layers from the main line portions at positions which are separated from the channel regions by a predetermined distance in the second direction in plan view.

According to the above aspect, the scanning lines include surroundings parts which extend to surround the semiconductor layers from the main line portions at positions which are separated from the channel regions by a predetermined distance in the second direction in plan view. Therefore, the incident light and the returning light, which travel to the surface of the substrate and the slanted light, such as the inside-reflected light and the multiple-reflected light based on the incident light and the returning light, can be at least partially prevented from entering into the channel regions and the channel adjacent regions, due to light absorption and reflection, particularly by the surrounding portions, as well as by the main body parts which include the gate electrodes among the scanning lines. At this time, particularly, since the light-shielding is performed by the surrounding portions which are located at the positions where the interlayer distance from the channel regions or the channel adjacent regions is very short, that is, at the interlayer positions separated by the thickness of the gate insulating films and also the surrounding portions can shield the slanted light in any direction, it is possible to further effectively perform the light-shielding.

As a result, according to the present aspect, since the light-resistant property can increase, it is possible to efficiently control the switching of the pixel electrodes by the thin film transistors light leakage current which is reduced under such a severe condition that strong incident light or returning light enters, and finally, to display image with high brightness and high contrast by the present invention.

In addition, in consideration of the technical effects, the construction of "surround the semiconductor layer in plan view" has wider concepts including the construction that the surrounding portions are formed to have slight disconnection parts around the lower side of the channel regions around the semiconductor layers in plan view, the construction that the surrounding portions are intermittently formed, or the construction that the surrounding portions are sporadically formed in an island shape, other than the construction that the surrounding portions are formed to extend continuously around the semiconductor layers in plan view.

In the aforementioned aspect, particularly, it is preferable that the scanning lines further include the vertical protrusions protruding from the main line portions in the direction perpendicular to the substrate at the positions which are separated from the channel regions by a predetermined distance in the second direction.

According to the above aspect, because the main line portions include the vertical protrusion protruding in the direction perpendicular to the substrate, the channel regions are three-dimensionally covered by the main line portions that include the vertical protrusions. As a result, the light-shielding performance can be increased. Particularly, when a so-called top gate type in which the scanning lines are located at the upper sides of the channel regions, the construction that the channel regions are three-dimensionally covered by the main line portions including the vertical protrusions protruding from the upper sides is obtained. In addition, the predetermined distance associated with the surrounding portions and the predetermined distance associated with the vertical protrusions may be equal to or different from each other.

In addition, in the aspect that the aforementioned surrounding portions are provided, it is preferable that the scanning lines further include vertical protrusions protruding from the surrounding portions in the direction perpendicular to the substrate.

According to the above aspect, since the channel regions can be three-dimensionally covered by the vertical protrusions of the main line portions and/or the vertical protrusion of the surrounding portions, it is possible to further enhance the light-shielding performance. Particularly, in case of a so-called "top gate type" in which the scanning lines are located at the upper side of the channel regions, the construction that the channel regions are three-dimensionally covered by the main line portions and the surrounding portions including the vertical protrusions from the upper sides is obtained. In addition, these vertical protrusions may protrude consecutively or separately.

In another aspect of the electro-optical device of the present invention, the thin film transistors include semiconductor layers having channel regions which extend in the first direction, and the scanning lines include main line portions including gate electrodes of the thin film transistors which face the channel regions with gate insulating films interposed therebetween and extending in the second direction which intersects the first direction in plan view, and vertical protrusions which protrude downward from the main line portions at positions which are separated from the channel region by a predetermined distance in the second direction in plan view.

According to the above aspect, the scanning lines include the vertical protrusions which protrude downwardly from the main line portions at positions which are separated from the channel region by a predetermined distance in the second direction in plan view. Therefore, the incident light and the returning light which travel to the surface of the substrate and the slanted light, such as the inside-reflected light and the multiple-reflected light based on the incident light and the returning light can be three-dimensionally reduced or prevented from entering into the channel regions and the channel adjacent regions particularly by the protrusions as well as by the main body parts which include the gate electrodes among the scanning lines, and the channel regions and the channel adjacent regions can be three-dimensionally shielded by the main line portions and the protrusions at positions in the vicinity of the channel regions or the channel adjacent regions, it is possible to further effectively perform the light-shielding.

As a result, in accordance with the aspect, since the light-resistant property can increase, it is possible to effectively control the switching of the pixel electrodes by the thin film transistors light leakage current which is reduced under such a severe condition that strong incident light or returning light enters, and finally, to display images with high brightness and high contrast.

In the aspect that the aforementioned vertical protrusions are provided, particularly, it is preferable that lower light-shielding films that at least cover the channel regions from the lower side can be further provided and the vertical protrusions have front ends which are contacted to the lower light-shielding films.

In accordance with the construction, the construction that the channel adjacent regions or the channel regions are interposed between the lower light-shielding films interlayer distance of which is relatively short and the main body parts or the surrounding portions which function as light-shielding films can be obtained. In addition, the space between the lower light-shielding films and the main body parts and the surrounding portions of the scanning lines, where the channel adjacent regions or the channel regions exist, becomes a partially closed space by the protrusions. For the reason, it is possible to obtain very high light-shielding performance on the slanted light which is slanted in any direction.

Furthermore, in accordance with the aspect, for example, it is possible that the scanning lines and the gate electrodes of the thin film transistors are not formed of the same layer, but the gate electrodes and the scanning lines are formed in different layers, and some of the scanning lines are used for the lower light-shielding films in such aspect. Namely, in this case, the lower light-shielding films have the additional function as the scanning lines. In addition, as another aspect, it is possible that the gate electrodes and the scanning lines are formed in the same layer, while the lower light-shielding films have the function as the scanning lines. In this case, two scanning lines are provided parallel to any one of thin film transistors and redundancy structure is provided to the scanning lines. By doing so, even though any one of scanning lines has a failure, such as disconnection, the other scanning line can be used, so that an advantage of further increasing the reliability can be obtained.

In addition, in the above case that the lower light-shielding films have the additional function as scanning lines, it is necessary that the lower light-shielding films are formed in a stripe shape to correspond to the rows of the thin film transistors arranged in a matrix.

On the other hand, it is preferable that the lower light-shielding films, which at least cover the channel regions from the lower side, be further provided, and the vertical protrusions do not contact the lower light-shielding films.

In accordance with the construction, the construction that the channel adjacent regions or the channel regions are interposed between the lower light-shielding films interlayer, the distance of which is relatively short, and the main body parts or the surrounding portions, which function as light-shielding films, can be obtained. In addition, the space between the lower light-shielding films and the main body parts and the surrounding portions of the scanning lines, where the channel adjacent regions or the channel regions exist, becomes a partially closed space by the protrusions. For such a reason, it is possible to obtain very high light-shielding performance on the slanted light which is slanted in any direction.

In addition, in a case wherein the construction in which the lower light-shielding films and the scanning lines do not contact with each other is employed, bad effect due to not the electrical conductivity but the potential variation of the lower light-shielding films, for example, the bad effect on the thin film transistors can be reduced or prevented in advance.

In another aspect of the electro-optical device according to the present invention, the thin film transistors include semiconductor layers having channel regions which extend in the first direction, the scanning lines include main line portions including gate electrodes of the thin film transistors which face the channel regions with gate insulating films interposed therebetween and extending in the second direction which intersects the first direction in plan view, and the main line portions include inside-groove parts which are provided inside grooves which are engraved in the substrate and cover at least a part of the channel regions from the sides.

According to the above aspect, the scanning lines include the main line portions which extend in the second direction in plan view. Herein, particularly, the inside-groove parts which are provided inside groove among the main line portions at least partially cover the channel regions from the sides. Therefore, the incident light, which travels at an angle with respect to the surface of the substrate, the returning light, which particularly travels at an angle with respect to the rear surface, and the slanted light, such as the inside-reflected light and the multiple-reflected light based on the incident light and the returning light can be partially prevented from entering into the channel regions and the channel adjacent regions, due to light absorption and reflection by the inside-groove parts. Like this, by increasing the light-resistant property, it is possible to efficiently control the switching of the pixel electrodes by the thin film transistors light leakage current of which is reduced under such a severe condition that strong incident light or returning light enters, and thus, it is possible to display images with high brightness and high contrast.

In addition, since the main line portions of the scanning lines include the inside-groove parts, by increasing the cross sectional areas of the inside-groove parts at the cross section perpendicular to the second direction and the cross sectional areas of the outside-groove parts which are located outside the grooves, it is possible to reduce the wire resistance of the scanning lines. Like this, by reducing the wire resistance of the scanning lines, it is possible to reduce the occurrence of the crosstalk or flicker, etc., due to the signal delay of the scanning signals, and as a result, finally, it is possible to display images with high quality, while facilitating the high accuracy and miniaturization of the pixel pitch in the electro-optical device. As a result, it is possible to display images with high brightness and high quality in accordance with the present invention.

In addition, in the present invention, the grooves in which the main line portions of the scanning lines are at least partially provided may be directly engraved in the substrate like the above case, or may be engraved in the base insulating films which are laminated on the substrate.

In another aspect of the electro-optical device of the present invention, the thin film transistors include semiconductor layers having channel regions which extend in the first direction. The scanning lines include main line portions including gate electrodes of the thin film transistors which face the channel regions with gate insulating films interposed therebetween and extending in the second direction which intersects the first direction in plan view. The main line portions include inside-groove parts which extend in the second direction and are provided inside grooves which are engraved in the substrate and outside-groove parts which extend in the second direction and are provided outsides the grooves.

According to the above aspect, the scanning lines include the main line portions which extend in the second direction in plan view. Herein, particularly, since the main line portions include the inside-groove parts and the outside-groove parts which extend in the second direction, respectively, it is possible to reduce the wire resistance of the scanning lines in accordance with the total area of the inside-groove parts and the outside-groove parts on the cross section perpendicular to the second direction. For example, in consideration of a certain restriction in the allowable step difference on the surface of the substrate which defines the thickness of the layers of the electro-optical materials, such as liquid crystal in relation to the operational failure of the electro-optical materials, such as disorder of the liquid crystal, in comparison with the related art scanning lines which are formed on the flat surface or the scanning lines which are completely buried within the grooves, the construction of the present invention in which the cross sectional area of the scanning lines can increase over the total thickness in the laminated structure on the substrate is very advantageous in practice.

Like this, by reducing the wire resistance of the scanning lines, it is possible to reduce the occurrence of the cross talk or flicker, etc., due to the signal delay of the scanning signals, and as a result, and finally, it is possible to display images with high quality while facilitating the high accuracy and miniaturization of the pixel pitch in the electro-optical device.

In addition, in the present invention, the groove in which the main line portions of the scanning lines are at least partially provided may be directly engraved in the substrate like the above case, or may be engraved in the base insulating films which are laminated on the substrate.

As described above, the light-shielding can be performed on the semiconductor layer by particular constituents, for example, vertical protrusions, surrounding portions, etc., being provided to the scanning lines as described above, particularly, it is preferable that the scanning lines include light-shielding films containing metals or alloys.

According to the above aspect, the scanning lines include the light-shielding films which are made of metals or alloys, and more specifically, for example, a metal single substance, a metal alloy, a metal silicide, a poly silicide including at least one of high melting point metals such as Ti (titan), Cr (chromium), W (tungsten), Ta (tantalum), and Mo (molybdenum), Pb (lead), etc., or laminated structure thereof. Therefore, by the main body parts and the protrusions made of these light-shielding films, it is possible to further enhance the light-shielding performance over the slanted light in the channel regions or the channel adjacent regions.

However, even in a case where the scanning lines are formed of not such light-shielding films but polysilicon films, etc., the light-shielding performance can be obtained by the light-absorbing property.

In another aspect of an electro-optical device according to the present invention, one of a pair of electrodes constituting each of the storage capacitors constitutes a part of a capacitive line formed along the second direction, and the capacitive line is made of a multi-layered film including a low-resistive film.

According to such aspect, first, one of a pair of electrodes (hereinafter, referred to as "one side electrode") constituting storage capacitor constitutes a part of capacitive line formed along a second direction, that is, formation direction of scanning lines. By doing so, for example, in order to hold the one side electrode a constant potential, each capacitive line may be connected to constant potential source without providing individually conductive materials for holding a constant potential. Thus, according to the present exemplary embodiment, it is possible to facilitate simplification of the manufacturing process or low manufacturing cost.

Also, in the present aspect, particularly, the capacitive lines are formed of multi-layered films including low-resistive film. In such configuration, it is possible that the capacitive line carries out the function as constant-potential side capacitive electrode of corresponding capacitive line and other functions. Particularly, because corresponding multi-layered film includes low-resistive film, that is, lower resistive material than related art polysilicon or WSi, for example, metal simple substance such as aluminum, copper, chromium, or materials including them, or the like, it is possible to accomplish high conductivity. And, due to the high conductivity accomplishment, narrowness of the capacitive line, that is, narrowness of the storage capacitor can be obtained in the present aspect without specific restriction. Thus, the present aspect greatly contributes to facilitate enhancement of aperture ratio. In other words, it is possible to reduce or prevent cross talks or sticking due to high resistivity which originated from narrowness of capacitive line in a the related art.

Also, because the capacitive line of the present aspect is formed of multi-layered film, including low-resistive film described above, it is possible to add films formed of other materials for realizing light-shielding property reduce or prevent light-incidence onto thin film transistors to the low-resistive film as constituents of the capacitive line.

In addition, when the capacitive line of the present invention is formed of multi-layered films, it is possible to stabilize function as a storage capacitor. That is, for example, considering only low resistance described above, it is sufficient to form the capacitive line using a single layer of such material. But, the storage capacitor may insufficiently function as a condenser. However, in an aspect of the present invention, as described above, the capacitive line is formed of double or more layered films, although the first layer is formed compensatingly of a material for specific function, because other layers can be formed of materials for functioning as a storage capacitor, the above-described problems are addressed.

Also, in the present invention, because it is possible to facilitate multiple functions described above in the capacitive lines, degree of design freedom for an electro-optical device can also be enhanced.

In another an aspect of electro-optical device according to the present invention, the capacitive line includes an upper layer formed of the low-resistive film and a lower layer having light-absorption property.

According to such aspect, the capacitive line can be facilitated to behave like the multiple functions described below. First, because an upper layer of the capacitive line includes the low-resistive film, for example, when light is incident on the upper layer, it is possible to previously reduce or prevent the light, which is reflected on the surface of the low-resistive film, from directly entering the thin film transistor. Such a possibility is based on a fact that the corresponding materials have generally high optical reflectivity.

On the other hand, because the capacitive line is formed of light-absorbable material, such as polysilicon, it is possible to previously reduce or prevent so-called dim light, which is obtained as a result of being incident on the electro-optical device and then being reflected from the surface of the low-resistive film or a bottom surface of the data line, from entering onto a thin film transistor. Namely, because whole or a part of such dim light is absorbed into the lower layer of the capacitive line, it is possible to reduce the possibility that the dim light may reach the thin film transistor.

Also, in an aspect of the present invention, because it is premised that the capacitive line is "formed in the shape of multi-layered film", for example, although aluminum is positioned on the capacitive line and polysilicon is positioned under the capacitive line, it is needless to say that a film of other material can be positioned above the layer of aluminum or below the layer of polysilicon, also that films of other material can be positioned between the layers of aluminum and polysilicon. Also, it is of course acceptable that aluminum, polysilicon, and aluminum are structured from the top in order.

In another aspect of an electro-optical device according to the present invention, the very low-resistive film is made of aluminum.

According to such an aspect, because aluminum is a low-resistive material, the above-described effect is more reliably obtained. In addition, resistance of aluminum is about $1/100$ of that of polysilicon or WSi.

Further, according to the present configuration that the capacitive line includes aluminum, it is possible to obtain the following working effect. In the related art, because the capacitive line is formed of the polysilicon simple substance or WSi, bent property of such material causes great stress in an interlayer insulating film formed on the capacitive line. But, there is no such problem in the present invention. That is, in the related art, because the stress causes a restriction about thickness of the interlayer insulating film, if the thickness thereof is set so thin, the film is sometimes broken due to the corresponding stress. In the present aspect, it is possible to form thinner interlayer insulating film than that of the related art. As a result, it is possible to facilitate miniaturization of an electro-optical device as a whole.

In an aspect of an electro-optical device according to the present invention, the pixel electrode is electrically connected to different layers in the laminated structure through a titanium simple substance, a tungsten simple substance, a compound of titanium or tungsten, or a stack of them.

According to such an aspect, it is possible to electrically connect the different layers (i.e., at least one of a pair of electrodes constituting storage capacitor, or relay layer described below) in the laminated structure with the pixel electrode preferably. And, because the pixel electrode is formed of transparent conductive material, such as ITO (Indium Tin Oxide), IZO (Indium Zinc Oxide), or the like, if connected to aluminum, electrical erosion is produced. As a result, preferable electrical connection is not realized because of disconnection of aluminum or insulation due to formation of alumina. But, in the present aspect, because the pixel electrode is electrically connected to different layers in the laminated structure through titanium simple substance, a tungsten simple substance, a compound of titanium or tungsten, or a stack of them, the above-described inconvenience does not occur.

In such an aspect, an interlayer insulating film arranged as a base of the pixel electrode constitutes a part of the laminated structure. A contact hole is formed in the interlayer insulating film to electrically connect with the pixel electrode, and a film including a titanium simple substance, a tungsten simple substance, a compound of titanium or tungsten, or a stack of them is preferably formed on at least inside surface of the contact hole.

According to such configuration, first, without worry about the above-described electrical erosion, it is possible to electrically connect the pixel electrode with the other layers. Also, in the present configuration, because a contact hole is interposed between the pixel electrode and the other layers, it is possible to facilitate an enhancement of a proper arrangement for the layers in the laminated structure or degree of layout freedom. In other words, as each component of the laminated structure is suitably arranged, and more concretely, is arranged within light-shielding region so that broadening of optical-transmittance region, namely, the above-described object can also be accomplished more preferably, it greatly contributes to realization and holding of high aperture ratio.

Further, in the present configuration, because a film including titanium simple substance, a tungsten simple substance, a compound of titanium or tungsten, or a stack of them is formed on at least an inside surface of the contact hole, it is possible to previously reduce or prevent light leakage due to the contact hole. That is, as a result of absorbing or reflecting light, it is possible to reduce or prevent the light from traveling through void part of the contact hole. As a result, light leakage on image hardly happens. Also, based on the same reason, it is possible to enhance light-resistance of the thin film transistor and the semiconductor layer. As a result, when light is incident on the semiconductor layer, it is possible to reduce or prevent light leakage current, and thereby, previously reduce or prevent flicker on image. As described above, according to the present configuration, it is possible to display higher quality image.

In another aspect of the electro-optical device according to the present invention, each of the data lines is formed of the same film as one of a pair of electrodes which constitute each of the storage capacitors.

According to the above aspect, each data line and one electrode in a pair of electrodes which constitute each of the storage capacitors are made of the same film, in other words, formed on the same layer, or formed in the same manufacturing process. By doing so, it is not necessary to provide both of each of the data lines and one electrode on separate layers and to separate them by interlayer insulating films. Thus, it is possible to avoid a highly laminated structure. At this point, this aspect of the present invention is very advantageous in that the laminated structure includes the shielding layers formed between the data lines and the pixel electrodes, and thus, a highly laminated structure which has an altitude increase is expected. The reason for such an advantage is that, excessively multi-layered structure obstructs easy manufacturing or high manufacturing yield. In addition, even though the data lines and the one electrode of a pair of the electrodes are formed at the same time, by an appropriate patterning process on the aforementioned films, it is possible to facilitate the insulation between them, and no particular problem occurs with respect to this point.

In addition, conversely, as apparent from the description of the aspect, in the present invention, it is not always necessary to form each of the data lines and the one electrode of a pair of electrodes which constitute each of the storage capacitors as the same film. In other words, they may be separately formed in the different layers.

In another aspect of the electro-optical device according to the present invention, the electro-optical device further includes relay layers, as parts of a laminated structure, to electrically connect each of the pixel electrodes to at least one of a pair of electrodes which constitute each of the storage capacitors.

According to the above aspect, the one electrode of a pair of electrodes of each of the storage capacitor and the pixel electrodes which constitute some portions of the laminated structure, respectively, are electrically connected to the relay layer which constitutes some portions of the laminated structure. Specifically, such connection may be performed through contact holes. By doing so, for example, the relay layers according to the present invention are formed of a two-layered structure, while the upper layer is made of a material which is very compatible with ITO as an example of a transparent conductive material which is generally used as a material of the pixel electrode and the lower layer is made of a material which is compatible with one electrode of a pair of electrodes which constitute each of the storage capacitor. Like this, since the relay layer can employ such a flexible construction, it is possible to further suitably implement the application of voltage to the pixel electrodes or the potential holding in the pixel electrodes.

Also, in relation to proper arrangement of the pixel electrode and the storage capacitor, it is desirable to provide such "relay layer". That is, according to the present aspect, because relay layers and storage capacitors can be arranged so as to broaden light-transparent region as much as possible, very higher aperture ratio can be obtained.

In the aspect, particularly, it is preferable that the relay layers include an aluminum film and a nitride film.

In accordance with the construction, in a case wherein the pixel electrodes include, for example, ITO, if the ITO and the aluminum are directly contacted, electrical erosion occurs between them, and thus, the disconnection of the aluminum or the insulation due to occurrence of alumina occurs, so that it is not desirable. Therefore, in the above aspect, the ITO does not directly contact the aluminum, but the ITO contacts a nitride film, for example, a titanium nitride film, so that it is possible to implement electrical connection to the storage capacitors as well as the pixel electrodes and the relay layer. Like this, the construction provides an example of the aforementioned "well-compatible material".

Furthermore, since the nitride film, such as a silicon nitride film or a silicon oxide film, has an excellent function of reducing or preventing water from permeating or diffusing, it is possible to reduce or prevent water from permeating the semiconductor layers which constitute the thin film transistors in advance. In the above aspect, since the relay layers include the nitride films, it is possible to obtain the aforementioned functions, and thus, it is possible to minimize the occurrence of the problem in that the threshold voltage of the thin film transistors greatly increase.

Furthermore, particularly, in an aspect that the relay layers are provided, it is preferable that the shielding layers be formed of the same film as the relay layers.

In the construction according to the above aspect, since the relay layers and the shielding layers are formed of the same film, both constituents can be formed at the same time, so that it is possible to facilitate simplification of the manufacturing process or to lower manufacturing cost as much.

In another aspect, in which the construction according to the above aspect combines with the aforementioned aspect in that the data lines and the one electrode of a pair of electrodes which constitute each of the storage capacitor are formed of the same film, the arrangement of the data lines, the storage capacitors, the relay layers, and the pixel electrodes, particularly, the laminating order, etc., becomes preferable, so that it is possible to further effectively obtain the aforementioned functions and effects.

Further, particularly, in another aspect in which the construction according to the above aspect combines with the construction that the relay layers include the nitride film, the shielding layers also include the nitride films. Therefore, it is possible to further obtain the water permeation reducing or preventing function on the semiconductor layers of the thin film transistors over the surface of the substrate as described above. Accordingly, it is possible to further effectively obtain the function and effect of the long-term maintenance of the thin film transistor.

In addition, as is apparent from the description of the above aspect, in the present invention, it is not always necessary to form the shielding layers and the relay layers as the same film. In other words, they may be separately formed in the different layers.

In another aspect of the electro-optical device according to the present invention, at least a part of the scanning line, the data line, a pair of electrodes of the storage capacitor, and the shield layer is formed of light-shielding material, and the portion is in the laminated structure and constitutes an embedded light-shielding film.

According to such an aspect, each component constituting the stacked structure on a substrate is formed of light-shielding material to form light-shielding film defining light-transparent region. As a result, because "an embedded light-shielding film" is provided on the substrate, light leakage current is generated by incident light on a semiconductor layer of a thin film transistor so that flicker on image can be previously prevented. That is, it is possible to enhance light-resistant property of the thin film transistor to the semiconductor layer. In addition, when the thin film transistor is formed in closest or closer layer to the substrate, because the scanning line, the data line, the storage capacitor, and the shield layer are formed above the thin film transistor, a light-shielding film including them can be called "upper light-shielding film".

Further, "light-shielding material" in the present aspect, for example, is made of metal simple substance including at least one of high-temperature metal such as Ti (titan), Cr (chromium), W (tungsten), Ta (tantalum), and Mo (molybdenum), etc., a metal alloy, a metal silicide, a poly silicide, stacked structure thereof, or the like. Also, such "light-shielding material" may contain aluminum (Al).

In addition, in the present aspect, particularly, although all of components preferably constitute "embedded light-shielding film", more preferably, at least two components extending in two directions intersecting each other constitute the "embedded light-shielding film" as a set. For example, when capacitive line is formed in a second direction where the scanning line extends and a part of the capacitive line becomes one of a pair of electrodes constituting the storage capacitor, it is desirable that the corresponding capacitive line and the data line are made of light-shielding material and constitute the "embedded light-shielding film". As a result, because the "embedded light-shielding film" has a shape of a lattice, it is possible to preferably arrange the pixel electrodes in a conventional matrix.

In another aspect of an electro-optical device according to the present invention, a light-shielding film provided in the light-shielding region is further included, and the light-shielding film includes a barrier layer including a metal layer made of high-melting-point temperature metal simple substance or metal compound, and an oxygen-free and high-melting-point temperature metal or a metal compound stacked on at least one side of the metal layer.

According to the present aspect, the following working effect can be obtained.

That is, although the light-shielding film is made of light-shielding material including Ti, Cr, W, or the like described above, in the related art, it has been proposed Ti having relatively excellent light-shielding property is used to form the light-shielding film. But, after forming the light-shielding film using Ti, when an insulating film or a thin film transistor is formed on the light-shielding film, if high-temperature process, such as annealing process of 500 degrees or more may be performed, chemical reaction is produced between the light-shielding film and an insulating film, such as SiO2 including an oxygen element, so that an oxide film can sometimes be formed. And, if such oxide film is formed, because the light-shielding property of Ti may decrease, although the relatively excellent Ti may be used, it is sometimes impossible to obtain sufficient light-shielding property.

But, in the present aspect, although the high-temperature process is performed after forming a light-shielding film, by an insulating film, such as $SiO_2$ including an oxygen element and a barrier layer made of an oxygen-free and high-melting-point temperature metal or a metal compound of the light-shielding film, it is possible to reduce or prevent oxidation of the metal layer of the light-shielding film, and thereby to assure a light-shielding property of the light-shielding film.

Therefore, according to the present aspect, although a light-shielding film is formed to be narrow, it can be expected to excellently execute a light-shielding property. In other words, in the present aspect, it is needless to broaden the light-shielding film so as to reduce or prevent light incidence onto the thin film transistor or the semiconductor. Thus, the present aspect can play a big role in obtaining higher aperture ratio as one of the main objects of the present invention.

Also, the light-shielding film can be formed thinner than that of a related art light-shielding film using single WSi. As a result, it is possible to reduce the height difference between a region where the light-shielding film is formed and a region where the light-shielding film is not formed. For example, the metal layer may have a thickness of 30 to 50 nm, and the barrier layer may have a thickness of 10 to 100 nm.

In addition, as described above, the "light-shielding film" in the present aspect may be an "embedded light-shielding film" of the laminated structure, formed of a data line, at least one of a pair of electrodes constituting a storage capacitor, or a shielding layer and the like or a "lower light-shielding film" formed on the substrate or under the thin film transistor, or further, if necessary, "light-shielding film", which is formed on a counter substrate arranged to face the substrate where the laminated structure is formed.

Also, as material for "barrier layer" including oxygen-free and high-melting-point temperature metal or a metal compound, specifically, one kind of nitrogenous compound, silicon compound, tungsten compound, tungsten, and silicon may be preferably used. More specifically, WSi (tungsten silicide) may be preferably used. On the other hand, specifically, titanium is preferably used as material for a "metal layer of high-melting-point temperature metal simple substance or metal compound" according to the present aspect.

In such an aspect, particularly, a metal layer of the light-shielding film includes a metal layer having a light-shielding property and a metal layer having a light-absorption property, and the light-absorption metal layer faces the thin film transistor.

According to such a configuration, the metal layer of the light-shielding film reduces or prevents light incidence onto the thin film transistor, and the light-absorption metal layer at a side where the thin film transistor is provided absorbs the light so that inner reflection can be reduced or prevented.

In an aspect where such light-shielding film includes a metal layer and barrier layers, the metal layer is also interposed between the barrier layers.

According to such a configuration, in manufacturing an electro-optical device, although high-temperature process may be performed, oxidation of the metal layer in the barrier layer can be reduced or prevented so that original light-shielding property of the metal layer can be held.

In an aspect where such light-shielding film includes such a metal layer and barrier layers, the light-shielding film is held a constant potential.

According to such a configuration, because the light-shielding film is held a constant potential, it is possible to reduce or prevent noise in the thin film transistor.

However, in the present invention, although each aspect may be performed as described above, it is possible to unrestrictedly combine one aspect with another aspect, independent of quotation format of each claim written in claims. But, in accordance with the attribution of aspects, there may be inconsistency. For example, an aspect where titanium film is formed on an inside surface of a contact hole so as to electrically connect with a pixel electrode may be combined with an aspect where a light-shielding film includes a metal layer and a barrier layer. It is also possible to implement an electro-optical device including three and more aspects.

In order to address the aforementioned, the electronic apparatus of the present invention includes the aforementioned electro-optical device of the present invention. Moreover, various aspects are included.

Another electro-optical device of the present invention includes, on a substrate, data lines extending in a first direction, scanning lines extending in a second direction and intersecting the data lines, pixel electrodes and thin film transistors disposed so as to correspond to intersection regions of the data lines and the scanning lines, storage capacitors electrically connected to the thin film transistors and the pixel electrodes, and light-shielding films arranged between the data lines and the pixel electrodes. And, the thin film transistors includes semiconductor layers having channel regions which extend in a longitudinal direction and channel adjacent regions which extend further from the channel regions in the longitudinal direction, and the scanning lines include light-shielding parts disposed at sides of the channel regions.

According to another electro-optical device of the present invention, by providing light-shielding films between the data lines and the pixel electrodes, light-shielding property can be much enhanced.

In accordance with the electronic apparatus of the present invention, since the electronic apparatus includes the electro optical apparatus of the present invention, it is possible to implement various types of electronic apparatuses capable of displaying images with high quality, such as a projection type display apparatus, a liquid crystal television set, a mobile phone, an electronic diary, a word processor, a viewfinder type or monitor-direct-viewing type video tape recorder, a workstation, a television telephone, a POS terminal, a touch panel, and so on where light incidence onto the semiconductor layer of the thin film transistor is reduced or prevented, and flicker on image due to light leakage current hardly happens.

These functions and the other advantages of the present invention will be apparent by the exemplary embodiments described later.

DETAILED DESCRIPTION OF PREFERRED EMBODIMENTS

Now, the preferred embodiments of the present invention will be described with reference to the drawings. The following exemplary embodiment is an electro-optical device according to the present invention which is applied to a liquid crystal apparatus.

First Exemplary Embodiment

Figure 1:
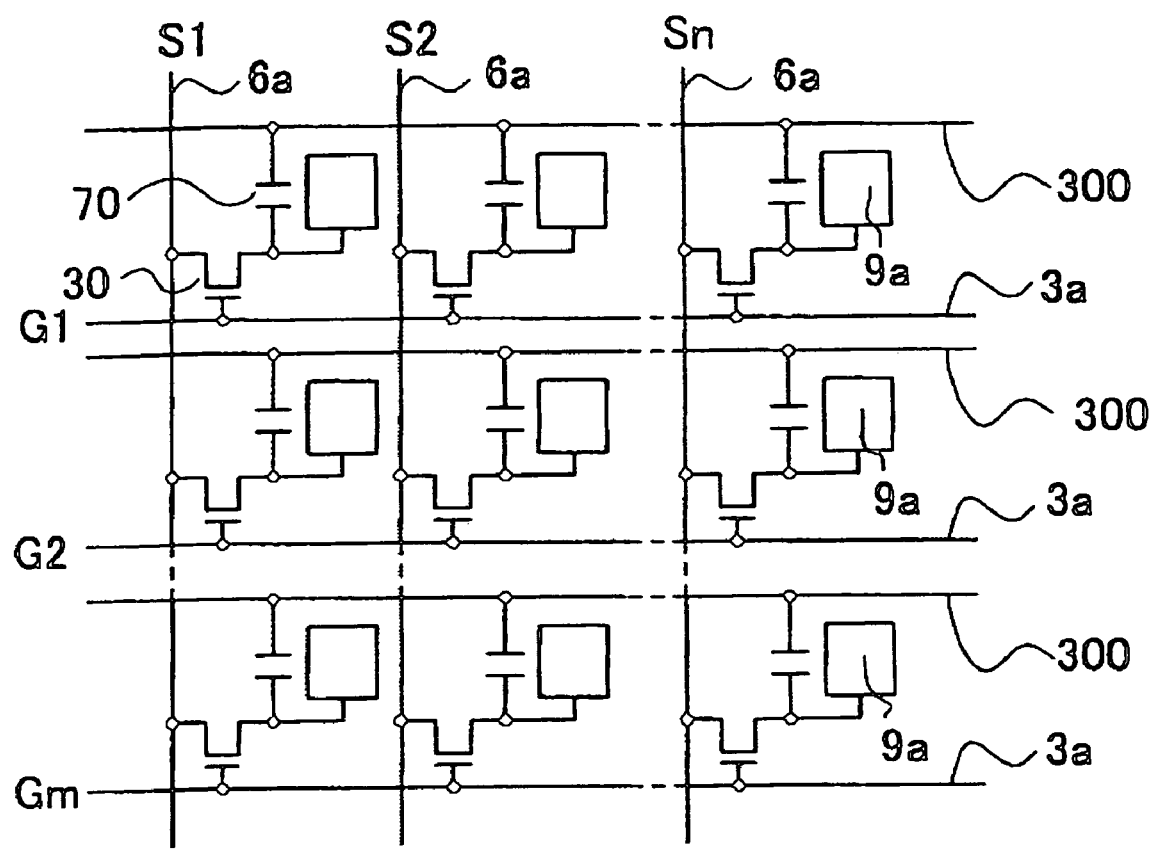
FIG. 1 a circuit schematic illustrating an equivalent circuit of various elements and wiring lines which are provided in a plurality of pixels having a matrix shape which constitute image display regions in an electro-optical device according to the first exemplary embodiment of the present invention.
Figure 2:
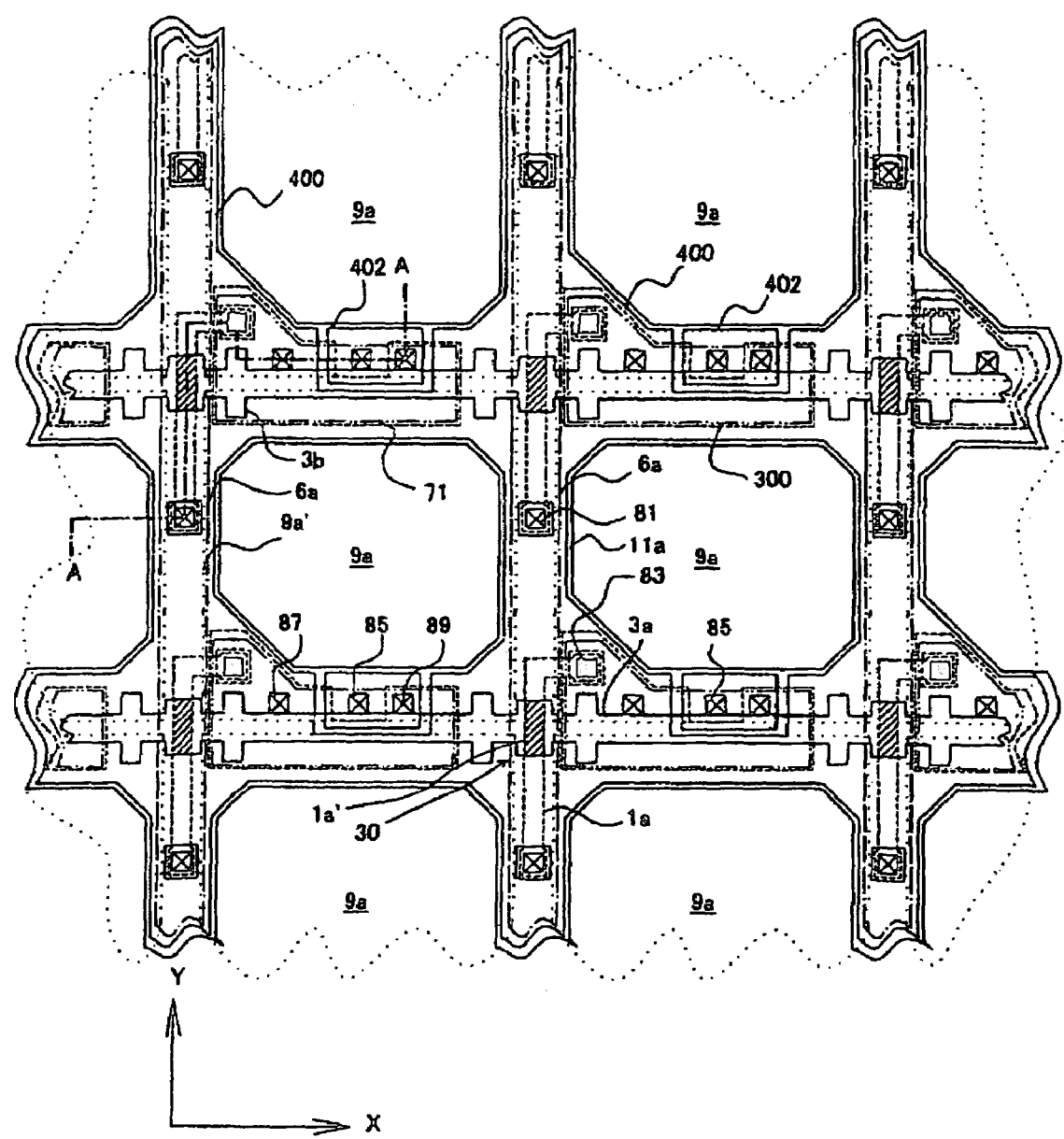
FIG. 2 is a plan view illustrating a plurality of pixel groups which are adjacent to each other on a TFT array substrate on which data lines, scanning lines, pixel electrodes, etc. are formed in the electro-optical device according to the first exemplary embodiment of the present invention.
Figure 3:
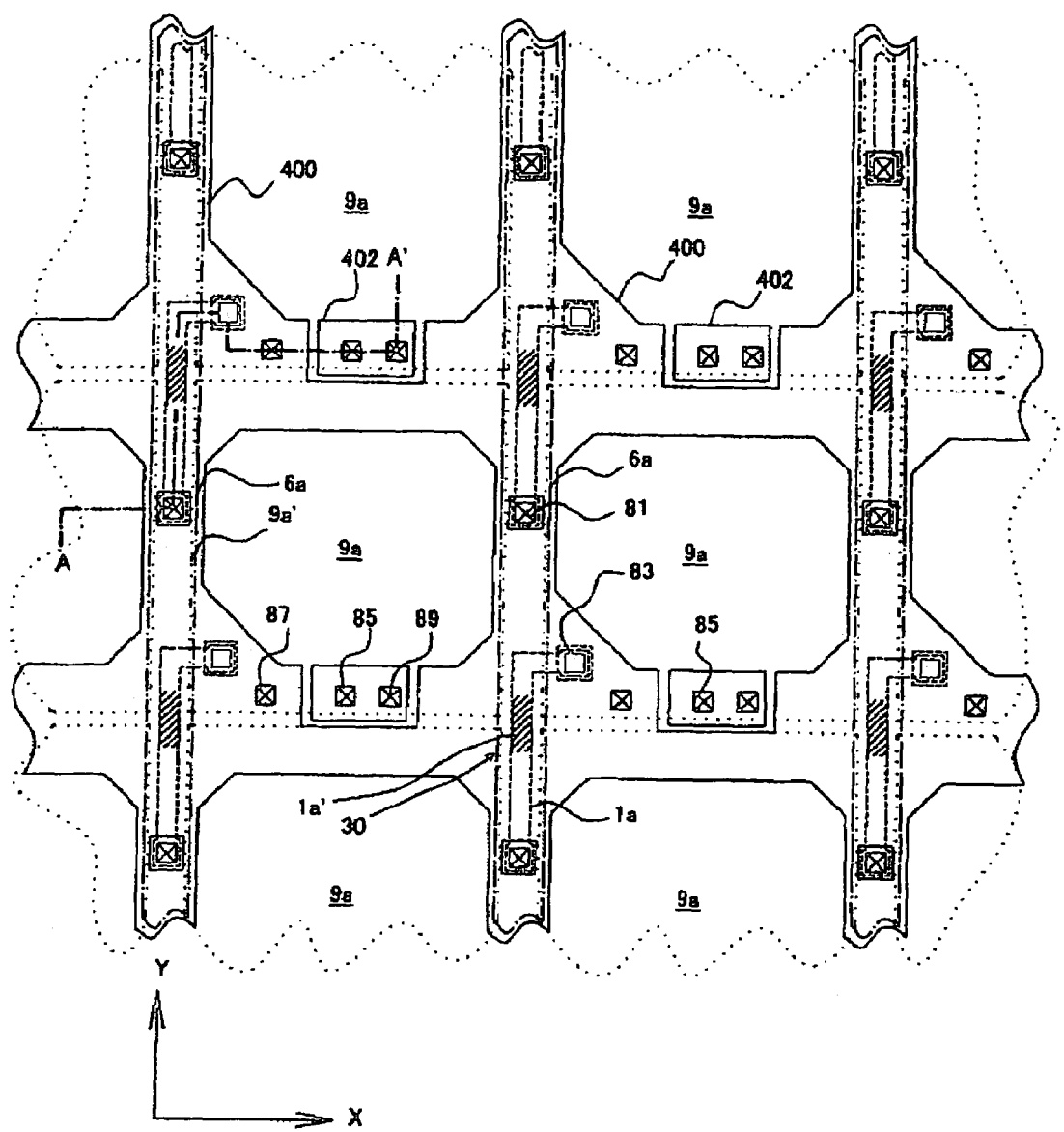
FIG. 3 is a plan view illustrating the only principal parts extracted from FIG. 2.
Figure 4:
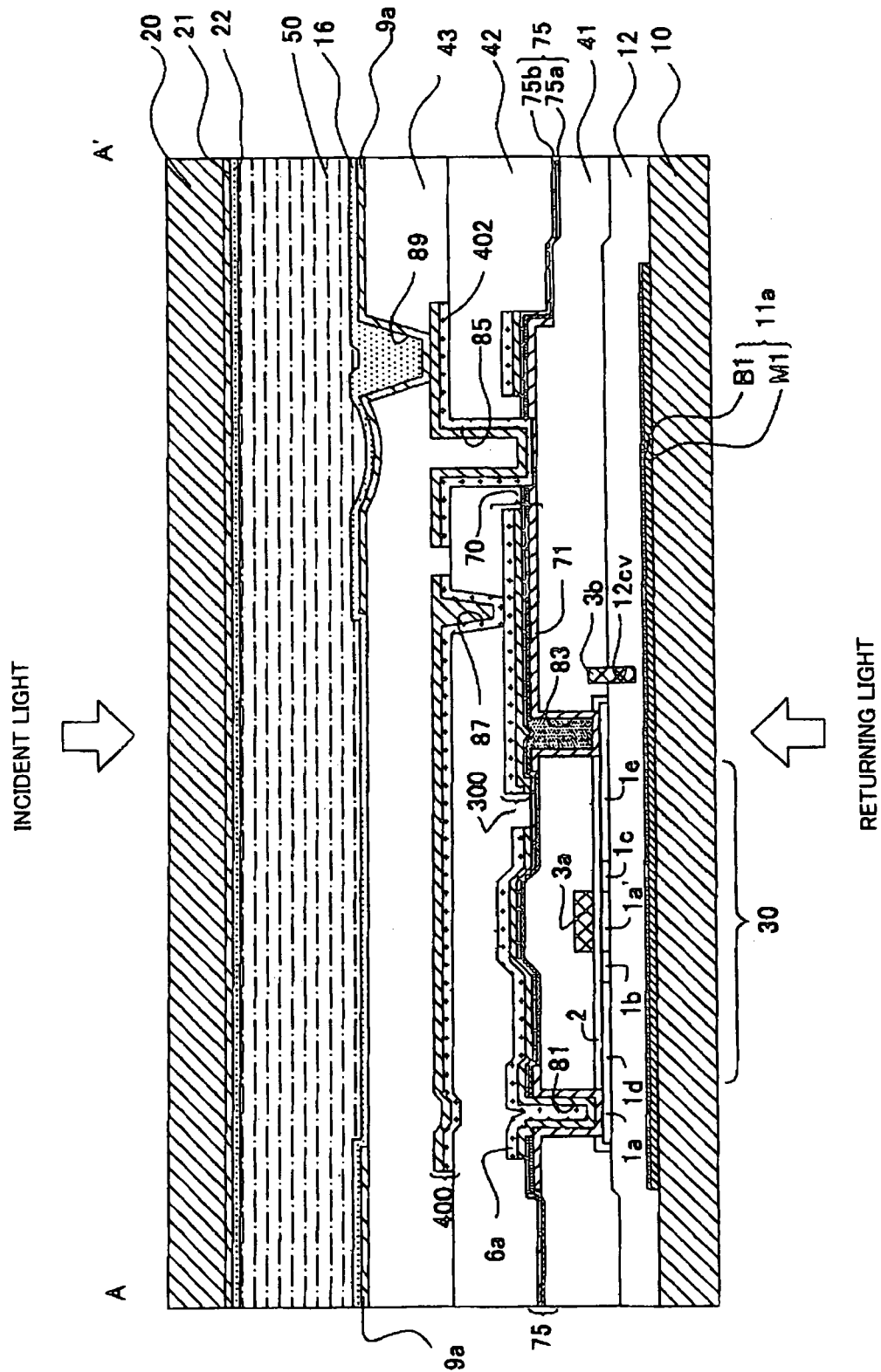
FIG. 4 is a cross sectional view taken along the plane A–A' in FIG. 2.

First, the constitution of the electro-optical device in the first exemplary embodiment of the present invention will be described with reference to FIGS. 1 to 4. Herein, FIG. 1 is a circuit schematic illustrating an equivalent circuit of various elements and wiring lines which are provided in a plurality of pixels having a matrix shape which constitute image display regions in the electro-optical device. FIG. 2 is a plan view illustrating a plurality of pixel groups which are adjacent to each other on a TFT array substrate on which data lines, scanning lines, pixel electrodes, etc., are formed in the electro-optical device. In addition, FIG. 3 is a plan view illustrating the only principal parts extracted from FIG. 2, specifically, the arrangement of the data lines, shielding layers, and pixel electrodes. FIG. 4 is a cross sectional view taken along the plane A–A' in FIG. 2. In FIG. 4, each layer and each member are shown in different scales in order to perceive each layer and each part in sizes recognizable in the figure.

In FIG. 1, in a plurality of the pixels which are arranged in a matrix and constitute image display regions of the electro-optical device according to the exemplary embodiment, each of pixel electrodes 9a and each of TFTs 30 to control the switching of each of the pixel electrodes 9a are formed and each of data lines 6a to which image signals are applied is electrically connected to sources of the TFTs 30. The image signals S1, S2, . . . , Sn which are written into the data lines 6a may be line sequentially applied in this order and, otherwise, may be applied to every group of a plurality of data lines 6a adjacent to each other.

In addition, scanning lines 3a are electrically connected to gates of the TFTs 30 and scanning signals G1, G2, . . . , Gm are line sequentially applied as pulses to the scanning lines 3a in this order at a predetermined timing. The pixel electrodes 9a are electrically connected to the drains of the TFTs 30 and image signals S1, S2, . . . , Sn which are applied from the data lines 6a are written at a predetermined timing by closing the switches of the TFTs 30 which are "switching elements" for a predetermined period.

The predetermined levels of the image signals S1, S2, . . . , Sn, which are written into the liquid crystal through pixel electrodes 9a, as examples of the electro-optical materials, are held for a predetermined period between pixel electrodes and the counter electrodes which are formed on the counter substrate. The liquid crystal modulates light by varying the alignment or order of molecule group in accordance with the applied voltage levels to display the gray scale. If in a normally white mode, the transmittance ratio to the incident light reduces in accordance with voltages applied to each pixel unit, and if in a normally black mode, the transmittance ratio to the incident light increases in accordance with voltages which are applied to each pixel unit, totally, light having contrast according to image signals is emitted from the electro-optical device.

Herein, in order to reduce or prevent leakage of the held image signals, storage capacitors 70 are added parallel to the liquid crystal capacitances which are formed between the pixel electrodes 9a and the counter electrodes. The storage capacitors 70 are provided parallel to the scanning lines 3a and each of the storage capacitors include a fixed-potential-side capacitor electrode and a capacitor electrode 300 which is fixed to a constant potential.

Now, the real construction of the electro-optical device to which the aforementioned circuit operation is realized by the data lines 6a, the scanning lines 3a, and the TFTs 30 will be described with reference to FIGS. 2 to 4.

First, in FIG. 2, a plurality of the pixel electrodes 9a is provided in a matrix on the TFT array substrate 10 (the contours of the pixel electrodes are represented by the dot line portions 9a') and the data lines 6a and the scanning lines 3a are provided along the perpendicular and horizontal boundaries of the pixel electrodes 9a, respectively. The data lines 6a are formed in a laminated structure including aluminum film, etc., as described later, and the scanning lines 3a are made of conductive polysilicon film. The scanning lines 3a are provided to face the channel regions 1a' which are marked by the forward slanting line regions on the drawing within the semiconductor layers 1a. The scanning lines 3a function as gate electrodes. That is, the pixel switching TFTs 30, in which the main line portions of the scanning lines 3a as the gate electrodes face the channel regions 1a', are formed in the portions where the scanning lines 3a intersect the data lines 6a.

Next, the electro-optical device includes TFT array substrate 10 and counter substrate 20 which is provided to face the TFT array substrate 10, as shown in FIG. 4, which is a cross sectional view taken along the line plane A–A' of FIG. 2. The TFT array substrate 10 is made of, for example, a quartz substrate, a glass substrate, or a silicon substrate, and the counter substrate 20 is made of, for example, a glass substrate or a quartz substrate.

As shown in FIG. 4, the aforementioned pixel electrode 9a is provided at the TFT array substrate 10, and an alignment film 16 on which a predetermined alignment process, such as a rubbing process, is carried out is provided above the pixel electrode. The pixel electrode 9a is made of, for example, a transparent conductive film, such as an ITO film. On the other hand, the counter electrode 21 is provided over the entire surface of the counter substrate 20, and, an alignment film 22 on which a predetermined alignment process, such as a rubbing process, is carried out is provided below the counter electrodes. The counter electrode 21 is made of, for example, a transparent conductive film, such as an ITO film similar to the aforementioned pixel electrodes 9a, and the aforementioned alignment films 16 and 22 are made of, for example, a transparent organic film, such as a polyimide film. Between the TFT array substrate 10 and the counter substrate 20 which are provided to face like this, liquid crystal layer 50 is formed by sealing electro-optical materials, such as liquid crystal, within a space which is surrounded with a sealing material which is described later (see FIGS. 25 and 26). The liquid crystal layer 50 is aligned by the alignment films 16 and 22 in a state where an electric field is not applied from the pixel electrode 9a. The liquid crystal layer 50 is made of, for example, one nematic liquid crystal or a mixture of various kinds of nematic liquid crystals. The sealing material is an adhesive agent formed of, for example, photo-curing resin or thermosetting resin for connecting the TFT substrate 10 and the counter substrate 20 at their peripherals. Spacers, such as glass fiber or glass beads to separate both substrates from each other by a predetermined distance are mixed with the adhesive agent.

On the other hand, on the TFT array substrate 10, besides the aforementioned pixel electrodes 9a and the alignment film 16, various constituents including them are provided in a laminated structure. As shown in FIG. 4, the laminated structure includes, in the following order from the bottom, a first layer having lower light-shielding film 11a, a second layer having the TFT 30 and the scanning line 3a, a third layer having the storage capacitor 70 and data line 6a, a fourth layer having shielding layer 400, and a fifth layer (the uppermost layer) having the aforementioned pixel electrode 9a and the alignment film 16. In addition, a base insulating film 12 is provided between the first layer and the second layer, a first interlayer insulating film 41 is provided between the second layer and the third layer, a second interlayer insulating film 42 is provided between the third layer and the fourth layer, and a third interlayer insulating film 43 is provided between the fourth layer and the fifth layer in order to reduce or prevent short circuit among the aforementioned elements. In addition, contact holes to electrically connect heavily doped source regions 1d within the semiconductor layer 1a of the TFTs 30 with the data lines 6a are also provided in the various insulating films 12, 41, 42, and 43. Now, these elements will be described in the aforementioned order from the bottom.

First, the lower light-shielding film 11a is provided at the first layer. The lower light-shielding film 11a is patterned in lattice in plan view so that opening regions for pixels are defined (see FIG. 2). Regions, which are protruded so as to round corners of the pixel electrodes 9a, are formed in the regions of the lower light-shielding films 11a corresponding to intersections of scanning lines 3a and the data lines 6a.

And, in the present exemplary embodiment, such lower light shielding film 11a has a double-layer structure including a metal layer M1 formed below the film 11a and a barrier layer B1 to prevent oxidation of the metal layer M1 above the film 11a. As a result, of the laminated structure, although high-temperature process (e.g., annealing process for forming a TFT 30 described below) is performed when the elements are formed above the lower light shielding film 11a, because the barrier layer B1 is provided above the film 11a, it is possible to reduce or prevent in advance the metal layer M1 from oxidizing. Also, the double-layer structure of the lower light shielding film 11a including a metal layer M1 and a barrier layer B1 will be again described in detail with reference to FIG. 17. In addition, in order to reduce or prevent the potential variation from having a bad effect on the TFTs 30, it is preferable that the lower light-shielding film 11a extend from the image display regions to peripherals thereof to be connected to a constant potential source.

Next, the TFTs 30 and the scanning lines 3a are provided on the second layer. The TFTs 30 have a LDD (lightly doped drain) structures as shown in FIG. 4 and include the scanning lines 3a which function as a gate electrode as described above, the channel regions 1a' of the semiconductor layer 1a made of a polysilicon film where channels are formed by electric fields from the scanning lines 3a, insulating films 2 having gate insulating films which insulate the scanning lines 3a from the semiconductor layer 1a, lightly doped source regions 1b, lightly doped drain regions 1c, heavily doped source regions 1d, and heavily doped drain regions 1e in the semiconductor layer 1a.

Furthermore, although it is preferable that the TFTs 30 have the LDD structure as shown in FIG. 4, the TFTs may have an offset structure where impurity implantation is not performed to the lightly doped source regions 1b and the lightly doped drain regions 1c. Otherwise the TFTs may be a self-aligned type TFT in which impurities are implanted heavily by using the gate electrodes which are formed to be some portions of the scanning lines 3a as masks and then the heavily doped source regions and the heavily doped drain regions are formed in a self-aligned manner. In addition, in the present exemplary embodiment, although the single gate structure in which the only one gate electrode of the pixel switching TFT 30 is provided between the heavily doped source regions 1d and the heavily doped drain regions 1e is used, two or more gate electrodes may be provided between them. Likewise, if the TFT is constructed in dual gates, triple gates, or more, the leakage current at the connection portions of the channel and source regions and the drain regions can be reduced or prevented so that it is possible to reduce current in the OFF state. In addition, the semiconductor layer 1a which constructs the TFTs 30 may be a non-single crystalline layer or a single crystalline layer. Suitable methods, such as an attaching method may be used for the formation of the single crystalline layer. In particular, by forming the semiconductor layer 1a with the single crystalline layer, it is possible to obtain high performance of peripheral circuits.

The base insulating film 12 which is made of, for example, a silicon oxide film, is provided above the aforementioned lower light-shielding films 11a and below the TFTs 30. Other than the function of insulating the interlayers from the lower light-shielding films 11a to the TFTs 30, the base insulating film 12 has a function of reducing or preventing the properties of the pixel switching TFTs 30 from varying due to the roughness which is generated at the time of polishing the surface of the TFT array substrate 10 or contaminants which remain after the cleaning by being formed on the entire surface of the TFT array substrate 10.

Furthermore, in the present exemplary embodiment, particularly, in the base insulating film 12, grooves 12cv (grooves formed in a contact hole shape) having a width the same as or longer than the channel length of the semiconductor layer 1a which extends along the below-described data lines 6a are engraved in both sides of the semiconductor layer 1a in plan view. The scanning lines 3a which are laminated corresponding to the grooves 12cv have concave parts formed at lower sides thereof (these are not shown to avoid complexity in FIG. 2. See FIG. 5). In addition, by forming the scanning lines 3a so as to bury the entire grooves 12cv, horizontal protrusions 3b (including "vertical protrusions" in an aspect of the present invention) which are formed in one body with the scanning line 3a are provided to extend to the scanning line 3a. According to such a structure, the semiconductor layer 1a of the TFT 30 is covered from the sides in plan view, as shown in FIG. 2, so that it is possible to suppress the incident of the light from at least this part. In addition, the horizontal protrusions 3b may be formed at only one side of the semiconductor layer 1a. In addition, the grooves 12cv, and the scanning line 3a and the horizontal protrusions 3b which are laminated thereon will be described later in details again with reference to FIG. 5.

Following the aforementioned second layer, on the third layer, a storage capacitor 70 and the data line 6a are provided. The storage capacitor 70 is formed in an arrangement in which a first relay layer 71 as a pixel-potential-side capacitor electrode, which is electrically connected to the heavily doped drain region 1e of the TFT 30 and the pixel electrode 9a, faces the capacitor electrode 300 as a fixed-potential-side capacitor electrode through the dielectric film 75. It is possible to greatly enhance the potential holding property of the pixel electrodes 9a by the storage capacitor 70. In addition, the storage capacitors 70 according to the exemplary embodiment are formed so as not to reach a light transmitting region corresponding almost to a region for forming the pixel electrode 9a, as shown in the plan view of FIG. 2, and in other words, the storage capacitor 70 is formed so as to be accommodated into the light-shielding region. Namely, the storage capacitor 70 is formed on a region which overlaps the scanning lines 3a between the adjacent data lines 6a and a region in which the lower light-shielding film 1a rounds the corners of the pixel electrode 9a at corner portions where the scanning line 3a intersects the data line 6a. By doing so, the pixel aperture ratio of the entire electro-optical device is maintained to be relatively large so that it is possible to display brighter images.

More specifically, the first relay layer 71 is made of, for example, a conductive polysilicon film and functions as a pixel-potential-side capacitor electrode. However, the first relay layer 71 may be constructed in a single layer film or a multi-layered film including metals or alloys thereof. In case of the multi-layered film, it is preferable that the lower layers be constructed with the conductive polysilicon film having light-reflecting property and the upper layers be constructed with metals having a light-absorbing property or alloys thereof. In addition to the function as the pixel-potential-side capacitor electrode, the first relay layer 71 has a function for relay-connecting the pixel electrode 9a with the heavily doped drain region 1e of the TFT 30 through contact holes 83, 85, and 89. The first relay layer 71 is formed to have almost the same shape as the plane shape of the capacitor electrode 300 described later as shown in FIG. 2.

The capacitor electrode 300 functions as a fixed-potential-side capacitor electrode of the storage capacitor 70. In the first exemplary embodiment, in order to keep the capacitor electrode 300 to be a fixed potential, the capacitor electrode is electrically connected through the contact hole 87 to the shielding layer 400 which is a fixed potential.

However, as described later, in another exemplary embodiment, where the capacitor electrode 300 and the data line 6a are formed on the separate layer, it is preferable that the capacitor electrode 300 be, for example, be provided to extend from the image display region 10a on which the pixel electrode 9a is provided on the periphery thereof and the capacitor electrode 300 be held to a fixed potential by electrically connecting to the constant potential source. In other words, "the constant potential source" referred herein may be a constant potential source, such as a positive power source or a negative power source supplied to a data line driving circuit 101 or a constant potential source supplied to the counter electrodes 21 of the counter substrate 20.

Moreover, in particular, in this exemplary embodiment, the data lines 6a are made of the same films as the capacitor electrodes 300. Herein, "the same films" stand for the same layers or layers which are formed at the same time in manufacturing process steps. However, the capacitor electrodes 300 and the data lines 6a are not continuously formed in plan view but divided therebetween based on the patterning.

Specifically, as shown in FIG. 2, the capacitor electrodes 300 are formed to overlap the regions forming the scanning lines 3a, that is, to be divided along the X direction in the drawing, and the data lines 6a are formed to overlap the semiconductor layer 1a in the longitudinal direction thereof, that is, to extend in the Y direction in the drawing. More specifically, the capacitor electrodes 300 include main line portions which extend along the scanning lines 3a, and protrusions (parts shown as approximate a trapezoid shape in the drawing) protruded upwardly in the drawing along the semiconductor layer 1a in the regions which are adjacent to the semiconductor layer 1a in FIG. 2, and necking parts having slightly necking shapes corresponding to the below-described contact holes 85. The protrusions contribute greatly to the increase of the regions forming storage capacitors 70.

On the other hand, the data lines 6a include main line portions which extend linearly along the Y direction in FIG. 2. In addition, the heavily doped drain regions 1e, which are at the upper end in FIG. 2 of the semiconductor layer 1a, have a shape wherein the regions curve toward the right side perpendicularly, that is, at 90 degrees in order to overlap the regions of the protrusions of the storage capacitors 70, thereby electrically connecting the semiconductor layer 1a with the storage capacitors 70 (see FIG. 4).

In addition, the capacitor electrode 300 and the data line 6a are formed of films having a two-layered structure, as shown in FIG. 4, in which the lower layer is made of conductive polysilicon and the upper layer is made of aluminum. Although the data line 6a is electrically connected to the semiconductor layer 1a of the TFT 30 through the contact hole 81 which passes through the opening portion of the below-described dielectric film 75, the data line 6a has the aforementioned two-layered structure and the aforementioned first relay layer 71 is constructed with a conductive polysilicon film so that the electrical connection between the data lines 6a and the semiconductor layer 1a can be directly implemented by the conductive polysilicon film. Namely, a polysilicon film of first relay layer, a polysilicon film below the data line 6a, and an aluminum film above the data line are formed in this order from the bottom. Therefore, it is possible to maintain a good electrical connection between them.

Since the capacitor electrode 300 and the data line 6a include aluminum having relatively excellent light reflective property and also polysilicon having relatively excellent light absorbing property, the capacitor electrode 300 and the data line 6a can function as light-shielding layers. In other words, the capacitor electrode 300 and the data line 6a are able to block the progress of the incident light (see FIG. 4) for the semiconductor layer 1a at the upper side thereof.

The dielectric film 75 is constructed with a silicon oxide film such as a HTO (high temperature oxide) film, and a LTO (low temperature oxide) film, etc., or a silicon nitride film having relatively thin thickness, for example, about 5 to 200 nm. In view of increasing the storage capacitor 70, the thinner films are preferable as long as sufficient reliabilities of the films are obtained. In addition, particularly in the exemplary embodiment, the dielectric film 75 has a two-layered film structure, as shown in FIG. 4, in which the lower layer is a silicon oxide film 75a and the upper layer is a silicon nitride film 75b, and is formed over the entire surface of the TFT array substrate 10. In addition, the other example of the dielectric film 75 may be constructed in a manner such that the lower silicon oxide film 75a is formed over the entire surface of the TFT array substrate 10, and the upper silicon nitride film 75b is patterned to be accommodated within light-shielding regions (non-opening regions), so that the silicon nitride film having colorability can reduce or prevent the decrease of the transmittance ratio. By doing so, since the silicon nitride film 75b having a relatively large dielectric constant exists, it is possible to increase the capacitance value of the storage capacitors 70, and also, since the silicon oxide film 75a exists, the dielectric strength of the storage capacitors 70 will never decrease. Like this, by forming the dielectric film 75 in the two-layered structure, it is possible to have two reciprocal functions and effects simultaneously. In addition, the silicon nitride film 75b reduces or prevents water from permeating the TFTs 30 in advance. By doing so, in the exemplary embodiment, the threshold voltages of the TFTs 30 never increase, so that it is possible to employ the apparatus for a relatively long time. In addition, although the dielectric film 75 has a two-layered structure in the exemplary embodiment, in some cases the dielectric film 75 may have a three-layered structure having, for example, a silicon oxide film, a silicon nitride film, and a silicon oxide film, or more-than-three-layered structure.

Furthermore, although the data line 6a and the capacitor electrode 300 are constructed in two-layered structures, they may be constructed with a polysilicon film, an aluminum film, and a titanium nitride film from the lower layer and a titanium nitride film may be used as a barrier metal at the time of opening the contact hole 87.

A first interlayer insulating film 41 is formed above the TFT 30 or the scanning line 3a and below the storage capacitor 70 or the data line 6a. The first interlayer insulating film 41 is made of, for example, a silicate glass film such as NSG (non-doped silicate glass), PSG (phosphorus silicate glass), BSG (boron silicate glass), and BPSG (boron phosphorus silicate glass), a silicon nitride film, a silicon oxide film, or preferably NSG. In addition, the contact hole 81 which electrically connects the heavily doped source region 1d of the TFT 30 with the data line 6a is opened in the first interlayer insulating film 41. Furthermore, the contact hole 83 which electrically connects the heavily doped drain region 1e of the TFT 30 with the first relay layer 71 constituting the storage capacitor 70 is opened in the first interlayer insulating film 41.

In addition, in order not to form the aforementioned dielectric film 75 on the portion for forming the contact hole 81 from the two contact holes, opening portions are formed in the dielectric film 75. The reason for such a formation is that it is necessary to facilitate the electric conduction between the lightly doped source regions 1b and the data lines 6a through the first relay layers 71 on the contact hole 81. Namely, if the opening portion is provided in the dielectric film 75, in case of performing a hydrogenation process on the semiconductor layer 1a of the TFT 30, it is possible to obtain the function and effect wherein hydrogen used in the process can easily reach the semiconductor layer 1a through the opening portion.

Furthermore, in the exemplary embodiment, the first interlayer insulating film 41 may undergo a sintering process at 1000° C., and thus, the ions which are implanted into the polysilicon film constituting the semiconductor layer 1a or the scanning line 3a may be activated.

Following the aforementioned third layer, shielding layers 400 are provided on the fourth layer. The shielding layers 400 are formed in lattice to extend in the X and Y directions of FIG. 2 in plan view as shown in FIGS. 2 and 3. The portions of the shielding layers 400 which extend in the Y direction of FIG. 2 are formed to be wider than the data lines 6a, thereby covering the data lines 6a. In addition, the portions which extend in the X direction of FIG. 2 have notched parts in the vicinity of approximately the center position of one side of each pixel electrode 9a in order to ensure regions for forming the below-described second relay layers 402.

In addition, at the corner portions of the intersections of the shielding layers 400 which extend in the X and Y directions of FIG. 2, respectively, parts which have an approximately triangle shape are provided to correspond to the protrusions of the aforementioned capacitor electrodes 300 which have an approximately trapezoid shape. The shielding layers 400 having light-shielding property may have the same width as the lower light-shielding films 11a, or shorter or wider width than the lower light-shielding films 11a.

The shielding layers 400 are provided to extend from the image display regions 10a on which the pixel electrodes 9a are provided to their peripherals, and electrically connected to the constant potential source to be at a fixed potential. In addition, "the constant potential source" referred herein may be the constant potential source, such as a positive power source or a negative power source supplied to a data line driving circuit 101, or a constant potential source supplied to the counter electrodes 21 of the counter substrate 20.

Like this, since the entire data lines 6a are covered (see FIG. 3) and the shielding layers 400 are at the fixed potential, it is possible to remove the influence of the capacitance coupling which occurs between the data lines 6a and the pixel electrodes 9a. Namely, by the electrical conduction to the data lines 6a, it is possible to reduce or prevent the variation of the potential of the pixel electrodes 9a in advance, and thus, it is possible to reduce the probability of occurrence of the display non-uniformity involved in the data lines 6a on the image. Also, in the exemplary embodiment, since the shielding layers 400 are formed in lattice, it is possible to suppress the unnecessary capacitance couplings at the portions to which the scanning lines 3a extend. In addition, by the aforementioned portions of the triangle shape of the shielding layers 400, it is possible to reduce or prevent the influence of the capacitance coupling which occurs between capacitor electrodes 300 and the pixel electrodes 9a, and by doing so, it is possible to obtain the substantially same functions and effects described above.

In addition, on the fourth layer, second relay layers 402 which are one example of "relay layers" referred in an aspect of the present invention are formed of the same film as the shielding layers 400. The second relay layers 402 have a function of relaying electrical connections between the pixel electrodes 9a and the first relay layers 71 which constitute the storage capacitors 70 through the below-described contact holes 89. In addition, the shielding layers 400 and the second relay layers 402 are not continuously formed in plan view but divided based on the patterning, which is similar to the aforementioned capacitor electrodes 300 and the data lines 6a.

On the other hand, the shielding layers 400 and the second relay layers 402 have a two-layered structure in which the lower layer is made of aluminum and the upper layer is made of titanium nitride. By doing so, in the second relay layers 402, the lower layer of aluminum is connected to the first relay layers 71 which constitute the storage capacitors 70 and the upper layer of titanium nitride is connected to the pixel electrodes 9a which are made of ITO, etc. In this case, particularly, the latter connection can be performed well. In a case that the aluminum and the ITO are directly contacted, electrical erosion occurs between them, and thus, the disconnection of the aluminum or the insulation due to occurrence of alumina occurs, so that it is not possible to implement desirable electrical connection. In addition, the titanium nitride functions as a barrier metal to prevent penetration at the time of opening the contact holes 89. Like this, in the exemplary embodiment, since it is possible to implement a good electrical connection between the second relay layers 402 and the pixel electrodes 9a, it is possible to keep the voltage application property of the pixel electrodes 9a and the potential holding property of the pixel electrodes 9a in a good state.

In addition, since the shielding layers 400 and the second relay layers 402 include aluminum having relatively good light reflective property and also titanium nitride having relatively good light absorbing property, the shielding layers 400 and the second relay layers 402 can function as light-shielding layers. In other words, the shielding layers 400 and the second relay layers 402 are able to block the travel of the incident light (see FIG. 2) to the semiconductor layer 1a at the upper side thereof. These are similar to the capacitor electrodes 300 and the data lines 6a as described above. In the exemplary embodiment, the shielding layers 400, the second relay layers 402, the capacitor electrodes 300, and the data lines 6a constitute some portions of the staked structure which is formed on the TFT array substrate 10 and also functions as the upper light-shielding film which blocks the light incident from the upper side to the TFTs 30, (as "an embedded light-shielding film" in consideration of constituting "some portions of the laminated structure").

In addition, according to the concept of the "upper light-shielding film" or the "embedded light-shielding film," the scanning lines 3a or the first relay layers 71 can be also included. Essentially, the "upper light-shielding film" or the "embedded light-shielding film" is to be understood in its broadest meaning, and all the structures made of opaque materials constructed on the TFT array substrate 10 can be referred to as the "upper light-shielding film" or the "embedded light-shielding film".

A second interlayer insulating film 42 is formed above the data line 6a and below the shielding layer 400. The second interlayer insulating film 42 is made of, for example, a silicate glass film such as NSG, PSG, BSG, and BPSG, a silicon nitride film, a silicon oxide film, or preferably NSG. The contact hole 87 which electrically connects the shielding layer 400 and the capacitor electrode 300 and the contact hole 85 which electrically connects the second relay layer 402 with the first relay layer 71 are opened in the second interlayer insulating film 42. Also, in the first exemplary embodiment, the second relay layer 402 is formed, so that the pixel electrode 9a is electrically connected to the TFT 30 through three contact holes 83, 85, and 89, that is, three interlayer insulating films 41, 42, and 43. By doing so, when relatively short and small contact holes are connected to facilitate an electrical connection between the pixel electrode 9a and the TFT 30, compared with relatively long and big contact holes, there is an advantage that an electro-optical device can be manufactured with simple fabrication of the short and small contact holes, lower cost, and high reliability.

Furthermore, since the second interlayer insulating film 42 does not undergo the sintering process which is described above with respect to the first interlayer insulating film 41, it is preferable to lessen the stress which occurs in the vicinity of the boundary surface of the capacitor electrode 300.

Finally, on the fifth layer, the pixel electrode 9a is formed in a matrix as described above and the alignment film 16 is formed on the pixel electrode 9a. The pixel electrode 9a may have the shape that their corner portions are cut. In addition, a third interlayer insulating film 43 is formed below the pixel electrode 9a. The third interlayer insulating film 43 is made of, for example, a silicate glass film such as NSG, PSG, BSG, and BPSG, a silicon nitride film, a silicon oxide film, or preferably BPSG. The contact hole 89, which electrically connects the pixel electrode 9a with the second relay layer 402, is opened on the third interlayer insulating film 43. In addition, particularly, in the exemplary embodiment, the surface of the third interlayer insulating film 43 is planarized by CMP (chemical mechanical polishing) process, etc., so that it is possible to reduce the disorder of the liquid crystal layer 50 due to the step difference in the various wiring lines or elements which exist at the lower portions of the third interlayer insulating film 43. However, other than the aforementioned planarization process on the third interlayer insulating film 43, grooves may be engraved on at least one of the TFT array substrate 10, the base insulating film 12, the first interlayer insulating film 41, and the second interlayer insulating film 42 and the wiring lines such as data lines 6a or the TFTs 30 are buried therein, thereby performing the planarization process. Furthermore, the planarization process may be performed not on the third interlayer insulating film 43 but only through the aforementioned grooves.

Constitution of Light-Shielding Against TFT

Now, the constitution of light-shielding for the TFTs 30, more specifically, the structure associated with scanning lines 3a including the gate electrodes of the TFTs 30 or the grooves 12cv of the base insulating film 12 or the lower light-shielding film 11a will be described.

1: Light-shielding in accordance with an example in which grooves 12cv formed in a base insulating film 12 and horizontal protrusions 3b extended from scanning lines 3a are will now be described.

Figure 5:
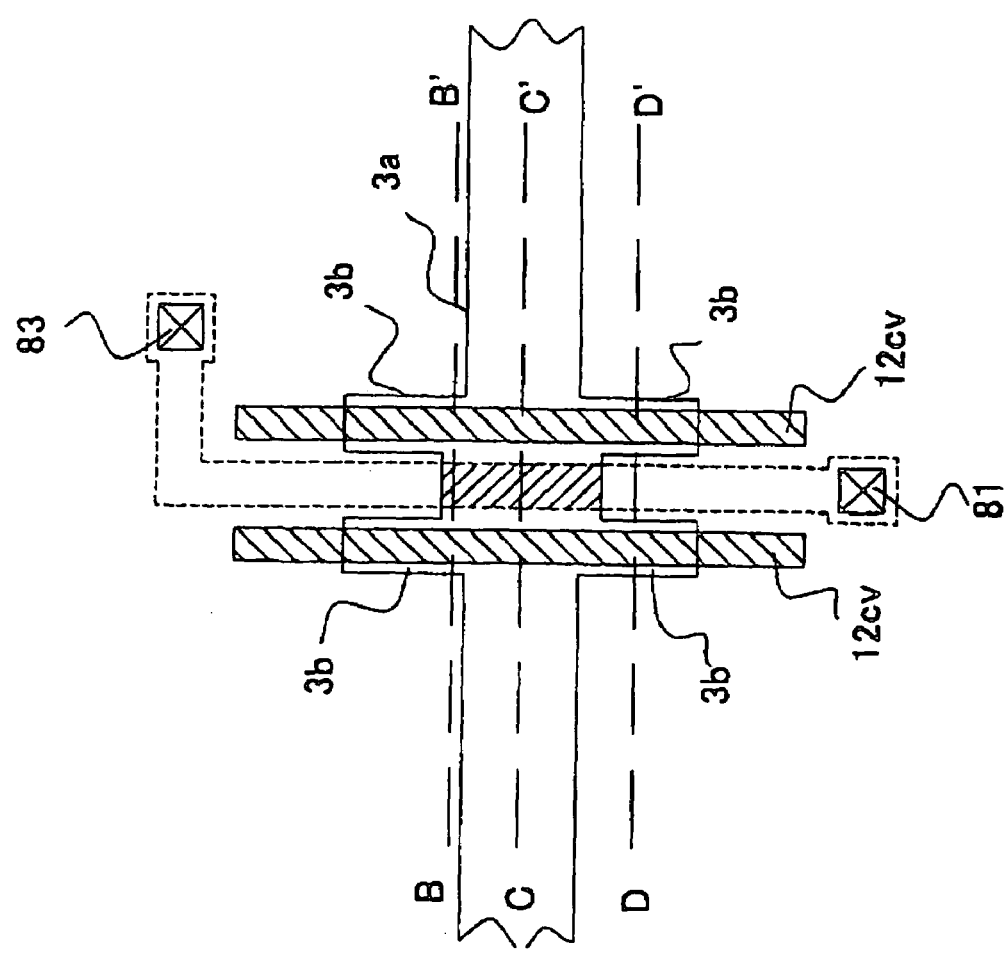
FIG. 5 is a plan view illustrating horizontal protrusions of the scanning lines 3a and grooves which are formed by carving base insulating films together with a semiconductor layer extracted from FIG. 2.
Figure 6:
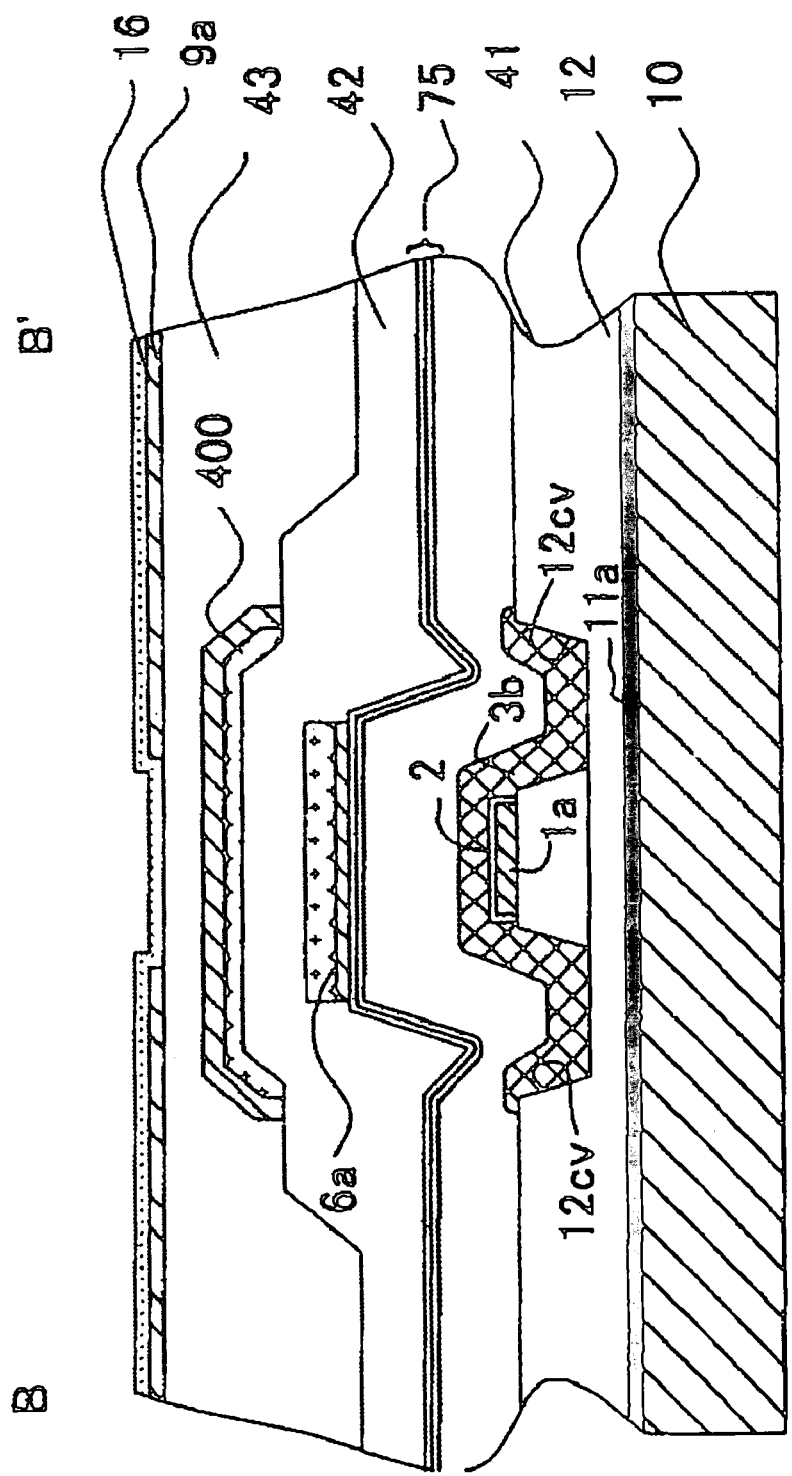
FIG. 6 is a cross sectional view taken along the plane B–B' in FIG. 5.
Figure 7:
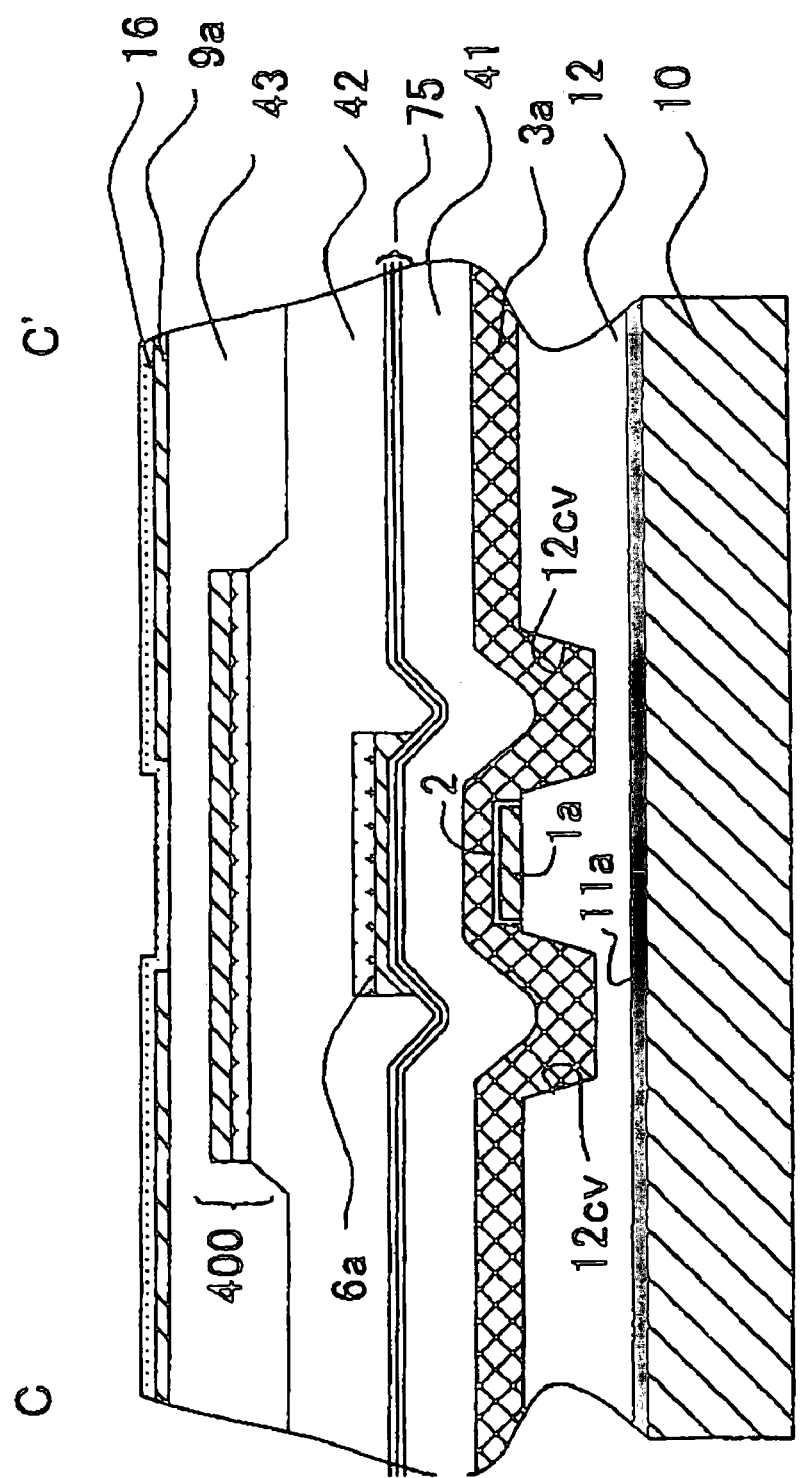
FIG. 7 is a cross sectional view taken along the plane C–C' in FIG. 5.
Figure 8:
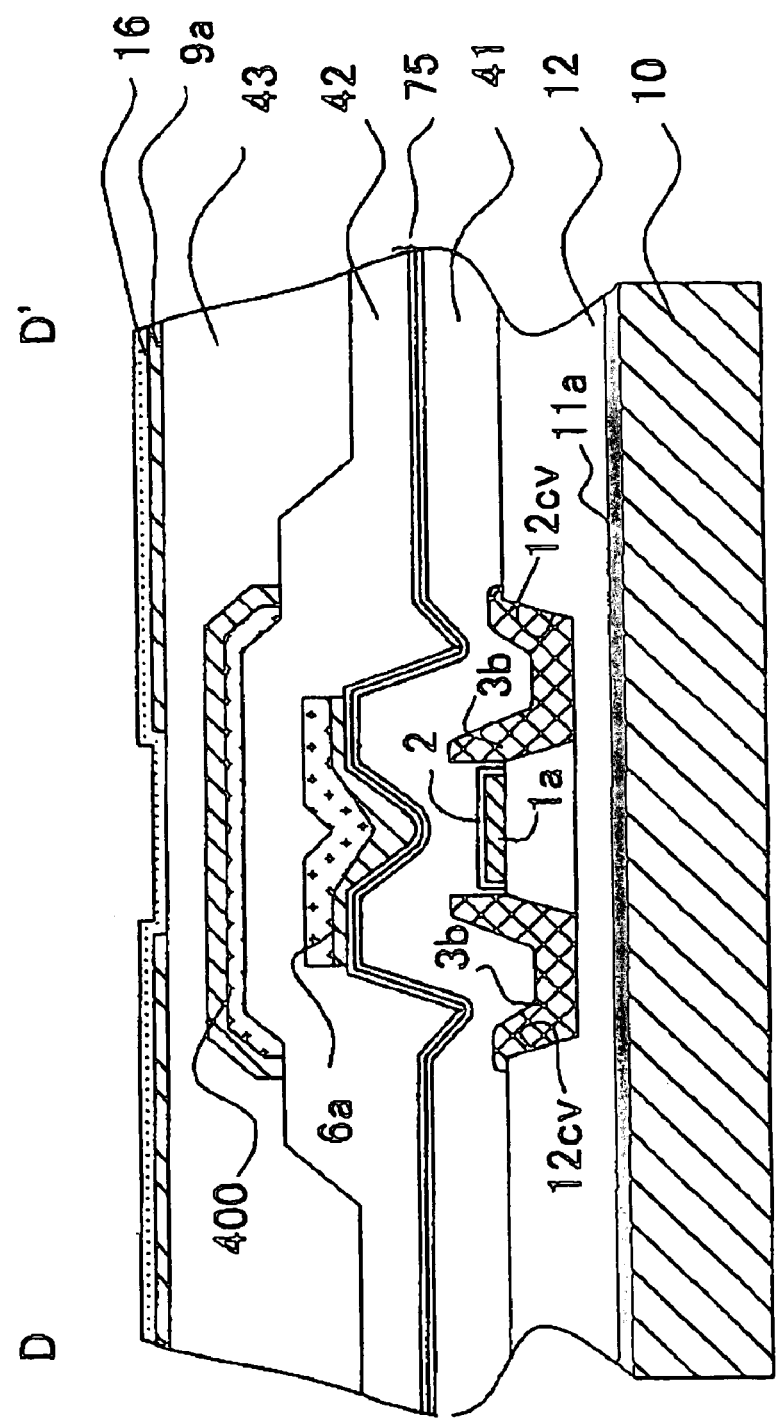
FIG. 8 is a cross sectional view taken along the plane D–D' in FIG. 5.

First, the construction, functions, and effects of the scanning lines 3a and the horizontal protrusions 3b and the construction, functions, and effects of the grooves 12cv which are engraved into the base insulating film 12 will be described in detail with reference to FIGS. 5 to 8. FIG. 5 is a plan view illustrating horizontal protrusions 3b of the scanning line 3a and the grooves 12cv which are engraved in the base insulating film 12 together with a semiconductor layer 1a extracted from FIG. 2. FIG. 6 is a cross sectional view taken along the plane B–B' in FIG. 5, and FIG. 7 is a cross sectional view taken along the plane C–C' in FIG. 5. In addition, FIG. 8 is a cross sectional view taken along the plane D–D' in FIG. 5.

As shown in FIGS. 5 to 8, the grooves 12cv are engraved in the base insulating film 12 along the data lines 6a at both sides of the semiconductor layer 1a. Inside the grooves 12cv, the horizontal protrusions 3b of the scanning line 3a are partially buried, and the first relay layer 71 and the capacitor electrode 300 are partially recessed corresponding to the grooves 12cv through the first interlayer insulating film 41. By doing so, the horizontal protrusions 3b of the scanning line 3a and the capacitor electrode 300, etc., have concave parts formed at the lower sides corresponding to the grooves 12cv on the each cross sectional view shown in FIGS. 6 to 8. In the construction, since the horizontal protrusions 3b are buried inside the grooves 12cv, the horizontal protrusions 3b have also a function as vertical protrusions in the depth direction of the grooves 12cv.

In accordance with the construction, first, since the horizontal protrusions 3b are provided in the scanning lines 3a, which are made of polysilicon, the incident light and the returning light which travel at an angle with respect to the surface of the TFT array substrate 10 and the slanted light, such as the inside-reflected light and the multiple-reflected light based on the incident light and the returning light can be at least partially prevented from entering into the channel region 1a' and its adjacent regions, that is, the lightly doped source region 1b and the lightly doped drain region 1c, by mainly absorbing light and partially reflecting light by the horizontal protrusions 3b as well as the main body portion which functions as the gate electrode among the scanning line 3a. At this time, since the light-shielding is performed by the horizontal protrusions 3b near the semiconductor layer 1a and the main body portion of the scanning line 3a, it is possible to effectively perform the light-shielding.

Second, since the scanning line 3a (including horizontal protrusions 3b, which functions as light-shielding films covering the semiconductor layer 1a from the upper side, the first relay layer 71, and the capacitor electrode 300 have concave parts formed at the lower sides thereof corresponding to the grooves 12cv, respectively, in comparison to the case that the upper light-shielding films are flat, the incident light which travels at an angle with respect to the surface of the substrate and the slanted light, such as the inside-reflected light and the multiple-reflected light based on the incident light and the returning light, can be reduced or prevented more effectively from entering from the slanted upper side finally into the channel region 1a' and the adjacent region thereof by the upper light-shielding film. Namely, since the tendency of diffusion of the slanted light from the upper sides increase along the grooves 12cv due to the upper surface portion of the upper light-shielding film having concave shape at the lower side thereof (or convex shape at the upper side thereof), it is finally possible to reduce the light amount that enters into the channel region 1a' and the adjacent region from the slanted upper side. In addition, for the same reason, the lower light-shielding film 11a may be formed to have concave shapes at the upper side, that is, convex shapes at the lower side contrary to the unevenness of the aforementioned upper light-shielding film.

Herein, in the exemplary embodiment, the light shielding is performed against the TFTs 30 at upper and lower sides thereof by various light-shielding films as shown in FIGS. 2 and 4. Namely, the capacitor electrodes 300 and the shielding layers 400, etc., function as the upper light-shielding films for the incident light entering from the upper side of the electro-optical device, that is, from the incident side of the incident light. On the other hand, the lower light-shielding films 11a, literally, function as the lower light-shielding films for the returning light entering from the lower side of the electro-optical device, that is, from the emitting side of the incident light. Therefore, it is considered that it is not necessary to provide the horizontal protrusions 3b in the scanning lines 3a or to provide any additional special shape to the capacitor electrodes 300, etc., which are to be the upper light-shielding films by the grooves 12cv. However, the incident light includes the slanted light entering in the slanted direction to the substrate 10. For the reason, the slanted light is reflected on the upper surface of the substrate 10 or the upper surface of the lower light-shielding films 11a, on the lower surface of the upper light-shielding film, or on the other boundary surfaces within the electro-optical device, so that the inside-reflected light and the multiple-reflected light are generated. Therefore, although various light-shielding films are provided at the upper and lower sides of the TFTs 30, some slanted light enters into the gaps between both sides. As a result, in the exemplary embodiment, it is possible to obtain good light-shielding effect by the horizontal protrusions 3b or the concave parts corresponding to the grooves 12cv which perform the light-shielding on the sides of the semiconductor layer 1a.

Like this, according to the electro-optical device of the exemplary embodiment, since the light-resistant property can be enhanced by providing the horizontal protrusions 3b and the grooves 12cv, it is possible to efficiently control the switching of the pixel electrodes 9a by the TFTs 30 with their light leakage current reduced under such a severe condition that strong incident light or returning light enters, and thus, finally, it is possible to display image having high brightness and high contrast.

In addition, in the exemplary embodiment, since the upper light-shielding films are formed of some portions of the scanning lines 3a including the horizontal protrusions 3b, the capacitor electrodes 300, and the shielding layers 400, it is possible to facilitate the simplification of the laminated structure and the manufacturing process in the whole TFT array substrate 10. In addition, in the exemplary embodiment, since the horizontal protrusions 3b are formed in one body with the same film as the scanning lines 3a, any additional process is not necessary to form the horizontal protrusions 3b.

Moreover, in the exemplary embodiment, the grooves 12cv do not reach the lower light-shielding films 11a, and thus, the horizontal protrusions 3b which are formed to cover the bottom surface of the grooves 12cv and the scanning line 3a which include vertical protrusions in the depth direction, do not contact with the lower light-shielding films 11a. For the reason, even though the lower light-shielding films 11a are conductive films, it is possible to reduce or prevent the potential variation from having bad effect on the scanning lines 3a in advance.

In the aforementioned exemplary embodiment, the scanning lines 3a may be constructed with light-shielding films including metals or alloys (a metal single substance, a metal alloy, a metal silicide, a poly silicide including at least one of high melting point metals such as Ti, Cr, W, Ta, and Mo, etc. or laminated structure thereof) similarly to the lower light-shielding films 11a. According to the construction, since the reflection performance is increased by the scanning lines 3a and the horizontal protrusions 3b, it is possible to further enhance the light-shielding performance of the channel regions 1a' or the channel adjacent regions for the slanted light.

In addition, although four horizontal protrusions 3b are formed for each of the channel regions 1a', the horizontal protrusions may be formed only at one side of the channel regions 1a', or only at upper or lower side thereof, thereby obtaining similar effects to some extent. For example, in a case where it is difficult to form a total of four horizontal protrusions 3b at both sides and at the upper and lower sides of the channel regions 1a' in consideration of the arrangement of wiring lines or elements in the vicinity of the semiconductor layer 1a, three or less horizontal protrusions 3b may be formed only at one side, only at upper side, or only at lower side in every channel region unless the construction has bad effect on the layout.

2: Light-shielding in accordance with an example in which horizontal protrusion 3b are substituted with surrounding portions 3c will now be explained.

Figure 9:
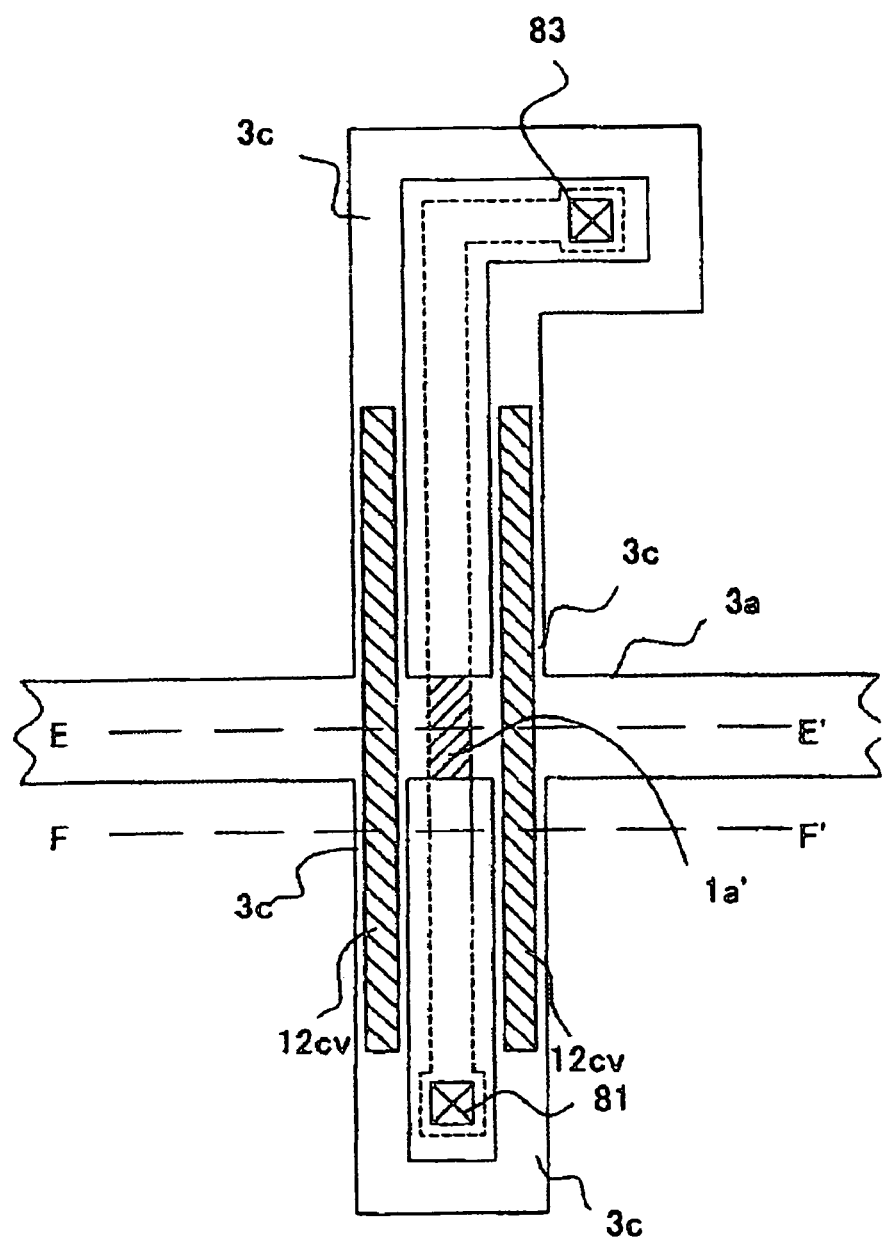
FIG. 9 is a view illustrating a configuration when the horizontal protrusion in FIG. 5 is substituted with a surrounding portion in the same purpose as FIG. 5.
Figure 10:
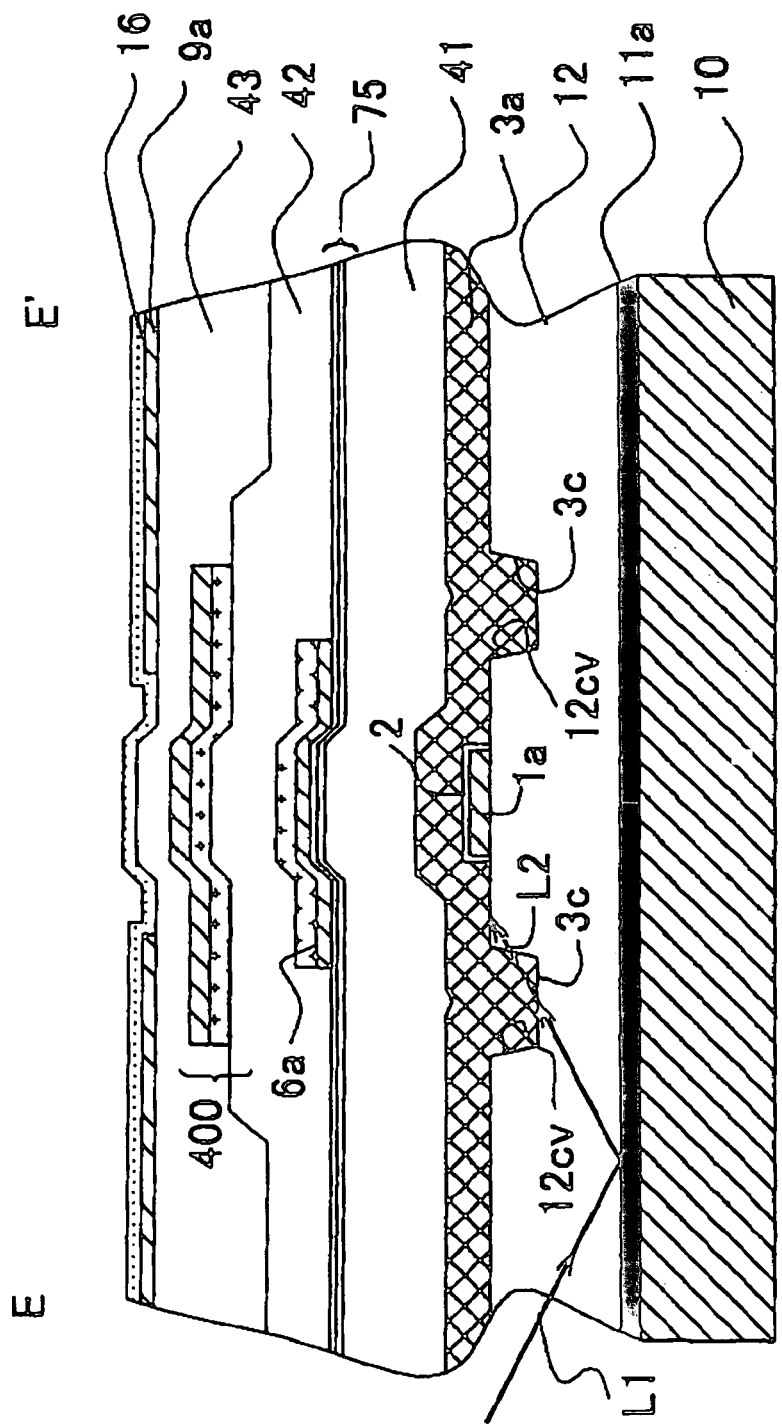
FIG. 10 is a cross sectional view taken along the plane E–E' in FIG. 9.
Figure 11:
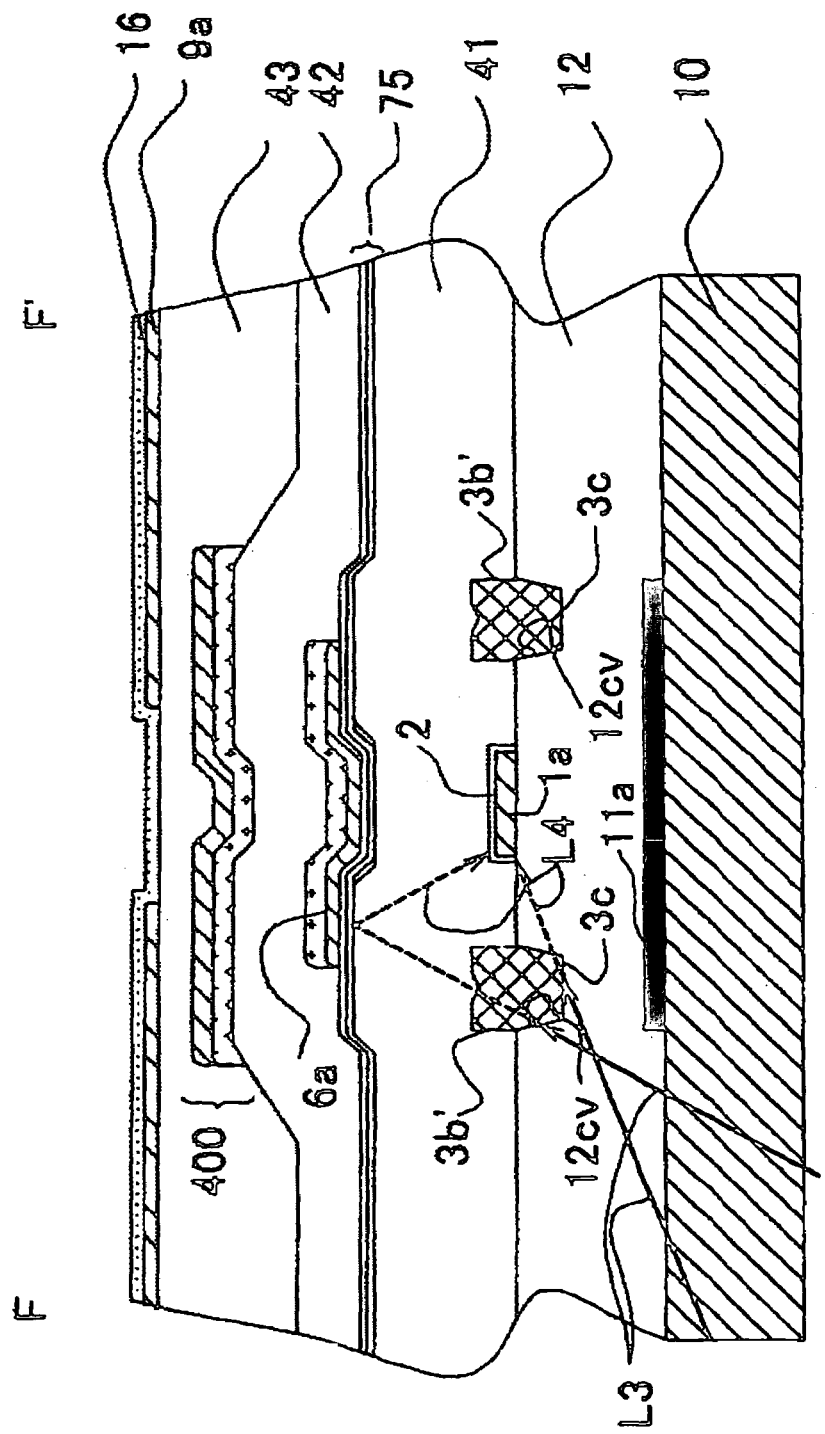
FIG. 11 is a cross sectional view taken along the plane F–F' in FIG. 9.
Figure 12:
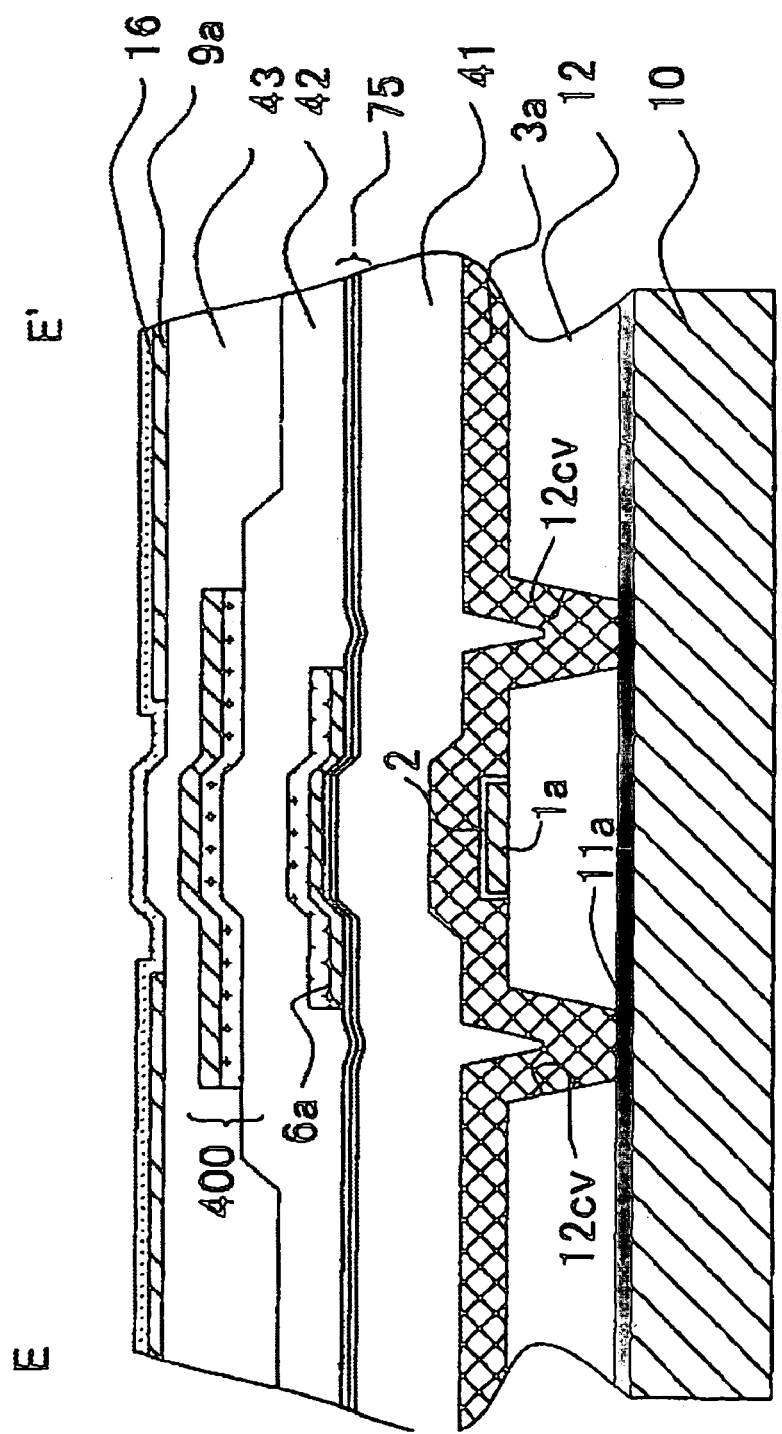
FIG. 12 is a cross sectional view taken along the plane E–E' in FIG. 9 in a modified configuration.

Second, a configuration that the surrounding portions 3c for surrounding the semiconductor layer 1a are formed for the scanning line 3a will be described with reference to FIGS. 9 to 11. Herein, FIG. 9 is a view, in the same purpose as FIG. 5, illustrating a configuration in which the horizontal protrusions 3b in FIG. 5 are substituted with surrounding portions 3c. FIG. 10 is a cross sectional view taken along the plane E–E' in FIG. 9. FIG. 11 is a cross sectional view taken along the plane F–F' in FIG. 9. FIG. 12 is a cross sectional view taken along the plane E–E' in FIG. 9 as a modified configuration.

As shown in FIGS. 9 to 11, in the exemplary embodiment, in place of the aforementioned horizontal protrusions 3b, the surrounding portions 3c are provided to extend from the main line portion of the scanning line 3a at the positions which are separated from the channel regions 1a' by a predetermined distance along the scanning line 3a in plan view so as to surround the entire semiconductor layer 1a which includes the channel regions 1a' and the contact hole opening regions, that is, the regions where the contact holes 83 and 81 are opened. The other constructions, for example, those including the surrounding portions 3c are buried inside the grooves 12cv and also having a function of vertical protrusions in the depth direction of the grooves 12cv are substantially similar to the construction in accordance with the aforementioned 1.

In addition, since the construction that the semiconductor layer 1a is interposed between the upper light-shielding films and the lower light-shielding films 11a interlayer distance of which is relatively short can be obtained, it is possible to obtain basically the very high light-shielding performance for the light perpendicular to the surface of the substrate. In addition, particularly, as shown in FIGS. 10 and 11, even in a case where the incident light and the returning light which travel at an angle with respect to the surface of the substrate and the slanted lights L1 and L3 of the inside-reflected light and the multiple-reflected light based on the incident light and the returning light occur, some portions of the lights can be reduced to the lights L2 and L4 having low light intensities due to light absorption and reflection by the surrounding portions 3c as well as the main line portions of the scanning lines 3a before the lights reach the semiconductor layer 1a. At this time, since the light shielding is performed by the surrounding portions 3c which are located at the positions where the interlayer distance from the semiconductor layer 1a is very short and also the surrounding portions 3c can shield the slanted lights L1 and L3 in any directions, it is possible to effectively perform the light-shielding.

Furthermore, in the exemplary embodiment, particularly since the semiconductor layer 1a as well as the contact hole opening regions where the contact holes 81 and 83 are opened, are surrounded, it is possible to enhance the light-shielding performance in the vicinity of the contact holes 81 and 83 where the lights in general leak easily.

In addition, in the exemplary embodiment, in place of the construction shown in FIG. 10, the vertical protrusions may contact the lower light-shielding films 11a as shown in FIG. 12. In this construction, since the semiconductor layer 1a is provided within the closed space, it is possible to further implement the good light shielding against the semiconductor layer 1a. Namely, the construction that the lower light-shielding films 11a and the scanning lines 3a contact with each other can be implemented in the aforementioned construction shown in FIGS. 5 to 8.

However, in these cases, it is described above that the bad influence, due to the potential variation of the lower light-shielding films 11a, may occur. For the reason, after comparing and considering the necessity of the light-shielding against the semiconductor layer 1a and the bad influence due to the potential variation of the lower light-shielding films 11a, it is determined whether the scanning lines 3a should contact the lower light-shielding films 11a scene by scene.

In addition, in the exemplary embodiment, the grooves 12cv may be engraved along the entire surrounding portions 3c of the scanning lines 3a, and then, the protrusions, that is, vertical protrusions, which protrude downwardly over the entire surrounding portions 3c may be formed. Moreover, in a case where the surrounding portions 3c are formed as in the exemplary embodiment, if the width of the semiconductor layer 1a in the contact hole opening regions is formed to be equal to the width of the semiconductor layer 1a in the channel regions 1a', it is possible to cover the semiconductor layer 1a by the surrounding portions 3c having rectangular shape at the positions relatively near the semiconductor layer 1a in plan view. Therefore, it is believed that the higher light-shielding effect can be obtained.

Furthermore, in the aforementioned configurations, the surrounding portions 3c are buried inside the grooves 12cv and also have a function of vertical protrusions. However, in the exemplary embodiment the surrounding portions having only horizontal parts may be formed so as to surround around the semiconductor layer 1a, and by doing so, it is expected that the associated functions and effects can be obtained. Even such a configuration is included in the scope of the present invention.

3: Light-shielding in accordance with an example in which grooves 12cva are extended along scanning line 3a will now be described.

Figure 13:
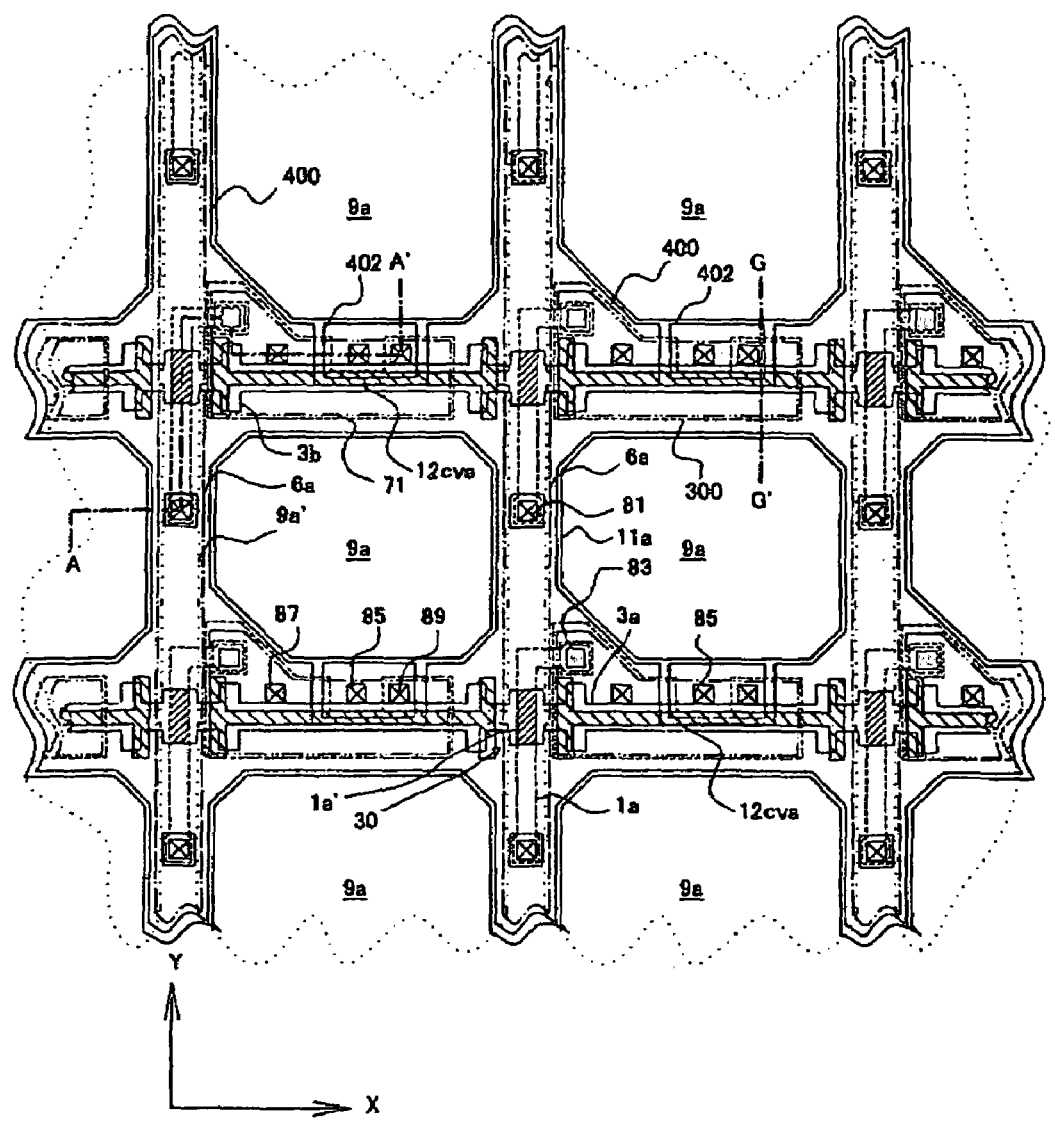
FIG. 13 is a view, in the same purpose as FIG. 2, illustrating a configuration different from FIG. 2 in that the grooves extending along the scanning line are provided in the base insulating film.
Figure 14:
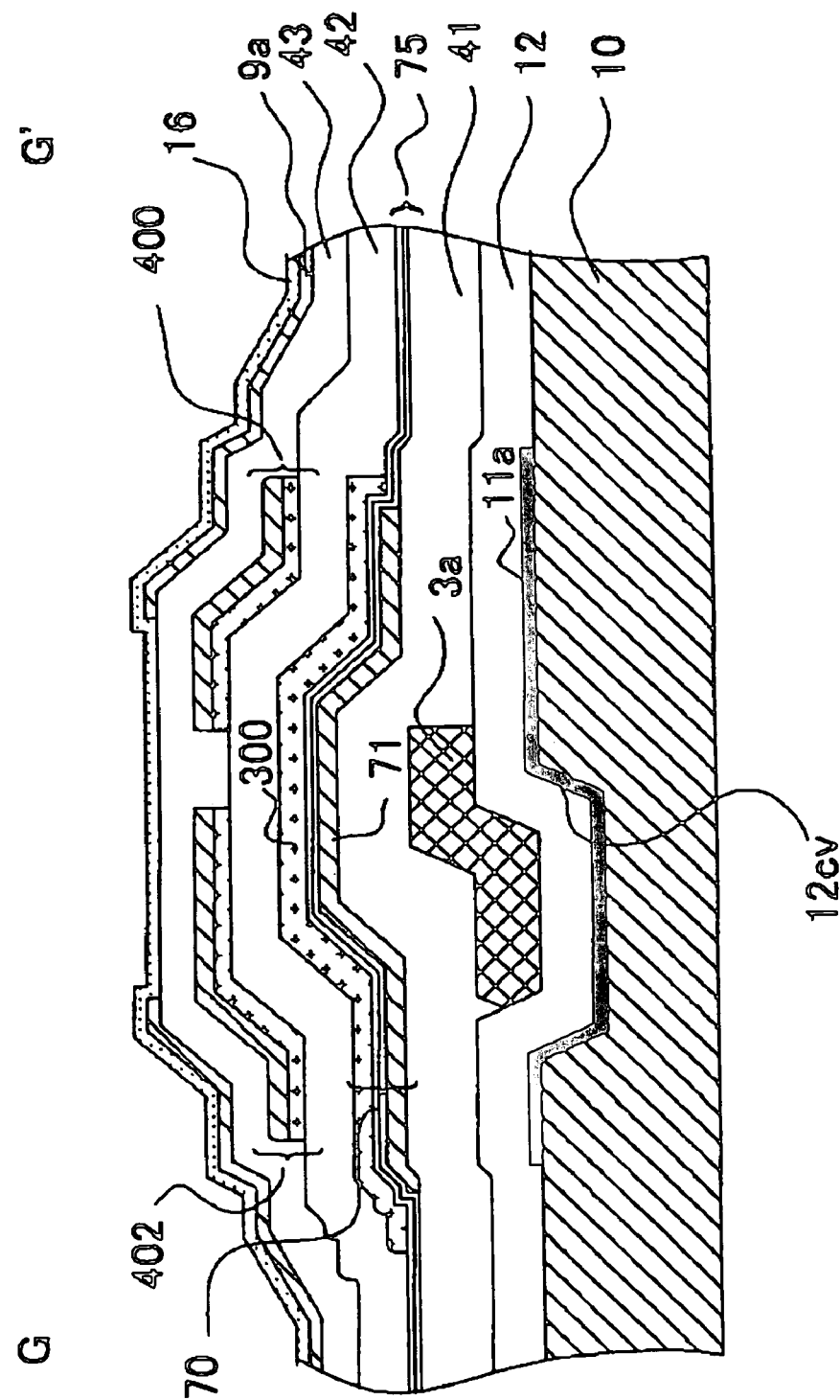
FIG. 14 is a cross sectional view taken along the plane G–G' in FIG. 5.
Figure 15:
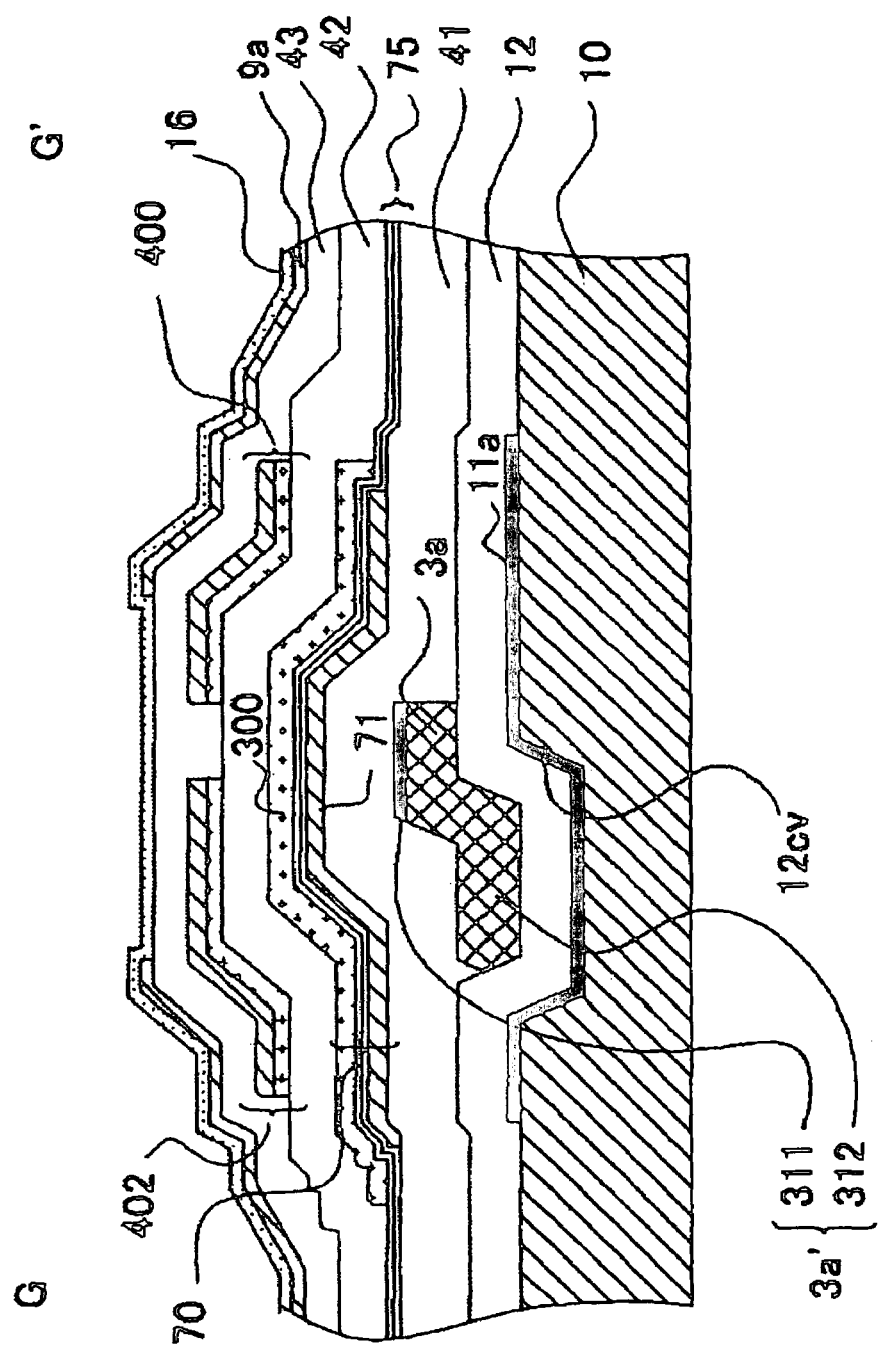
FIG. 15 is a cross sectional view taken along the plane G–G' in FIG. 13 with respect to a modified configuration of FIG. 14.

Third, the configuration in which the grooves 12cva extending along the scanning line 3a are formed and the main line portions of the scanning line 3a are partially buried inside the grooves 12cva will be described with reference to FIGS. 13 to 16. Herein, FIG. 13 is a plan view, with the same purpose as FIG. 2, illustrating a configuration which is different from FIG. 2 in that the grooves 12cva extending along the scanning line 3a are provided in the base insulating film 12, and FIG. 14 is a cross sectional view taken along the plane G–G' in FIG. 15. In addition, FIGS. 15 and 16 are cross sectional views taken along the plane G–G' in FIG. 13 with respect to modified configurations of FIG. 14.

The scanning lines 3a include inside-groove parts which are provided in the grooves 12cva which extend along the scanning lines 3a and partially cover the channel regions 1a' and the adjacent regions thereof from the sides. Therefore, even in the configuration, the incident light which travels at an angle with respect to the surface of the substrate, the returning light which particularly travels at an angle with respect to the rear surface, and the slanted light, such as the inside-reflected light and the multiple-reflected light based on the incident light and the returning light can be partially prevented from entering into the channel regions 1a' and the adjacent regions thereof by the inside-groove parts absorbing or reflecting the lights. Like this, by enhancing the light-resistant property, it is possible to efficiently control the switching of the pixel electrodes 9a by the TFTs 30 light leakage current of which is reduced under such a severe condition that strong incident light or returning light enters.

In addition, in the configuration, in place of the aforementioned construction that the scanning line 3a has a single-layered structure shown in FIG. 14, the scanning line 3a' made of a laminated substance which includes a first layer 311 made of light-shielding materials and a second layer 312 made of light-absorbing materials may be formed. In this case, the first layer 311 is made of, for example, WSi, TiSi, and the like. The second layer 312 is made of, for example, SiGe or a polysilicon film which is the same film as the semiconductor layer 1a. Even though the scanning line 3a' is formed in this manner, it is possible to enhance light-shielding performance on the channel region 1a' and the adjacent region thereof in accordance with the inside-groove part which is provided in the groove 401 of the scanning line 3a', and at the same time, it is possible to reduce the wire resistance of the scanning line. Furthermore, the second layer 312, which is made of SiGe, etc., may effectively function as the gate electrode which is provided to face the gate oxide films in the TFTs 30. In addition, the laminated order of the first layer 311 and the second layer 312 may be inverted up and down.

Figure 16:
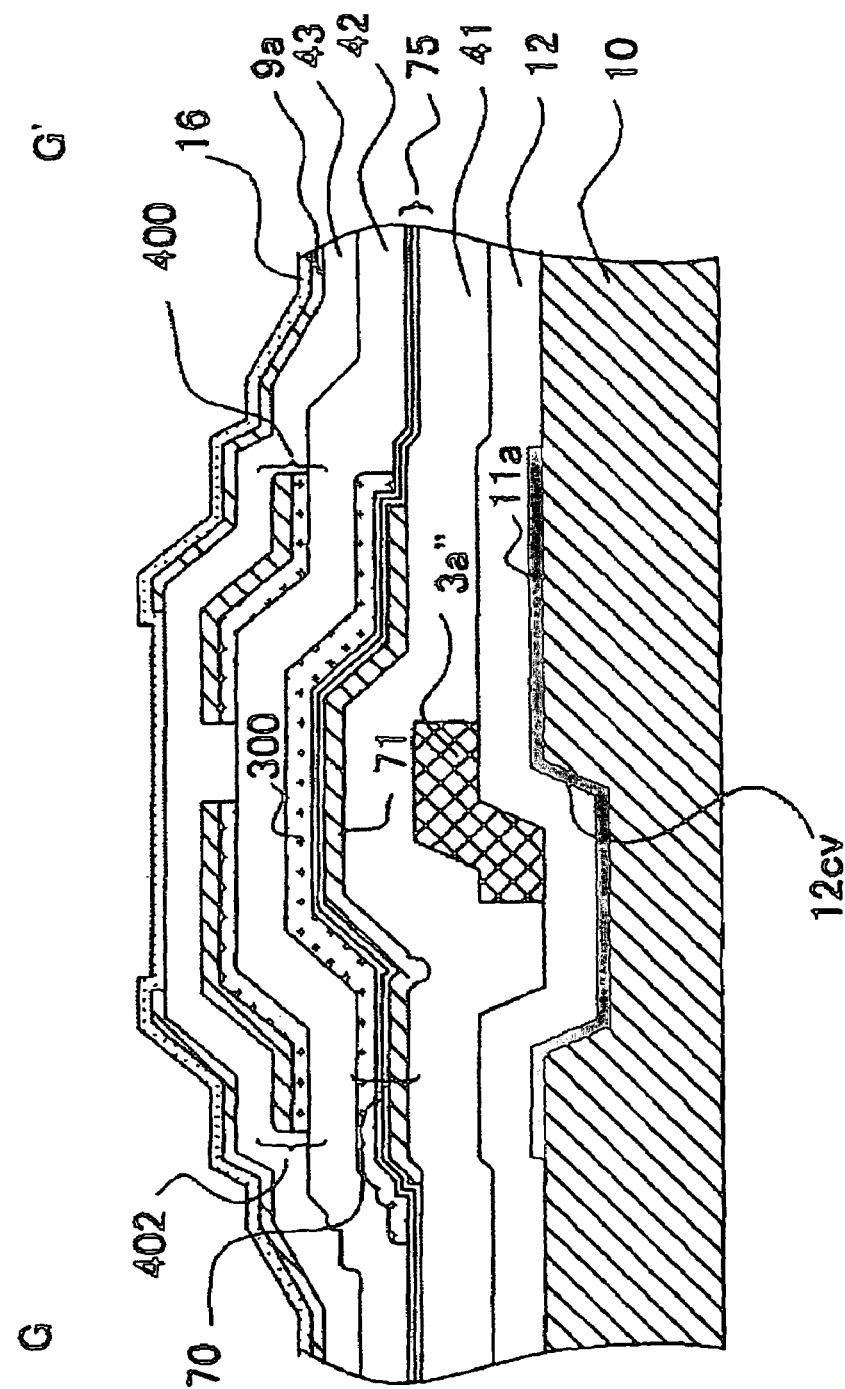
FIG. 16 is a cross sectional view taken along the plane G–G' in FIG. 13 with respect to another modified configuration of FIG. 14.

Moreover, as shown in FIG. 16, it is also preferable that scanning line 3a" be formed so that the grooves 12cva may not be completely buried. Even though the scanning line 3a" is formed in this manner, it is possible to enhance light-shielding performance on the channel regions 1a' and the adjacent regions thereof in accordance with the inside-groove parts which are provided in the groove 12cva of the scanning line 3a", and at the same time, it is possible to reduce the wire resistance of the scanning line.

4: Light shielding by the lower light shielding film 11a will now described.

Figure 17:
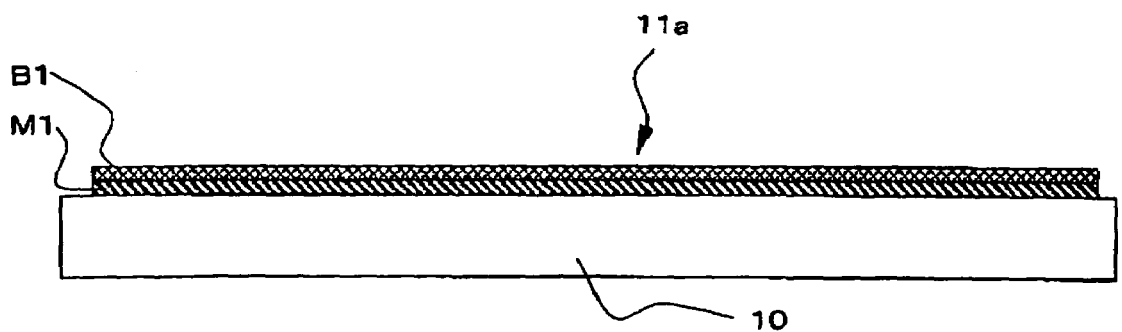
FIG. 17 is a cross-sectional view illustrating a structure of the lower light shielding film according to the first exemplary embodiment of the present invention and a TFT array substrate together.
Figure 19:
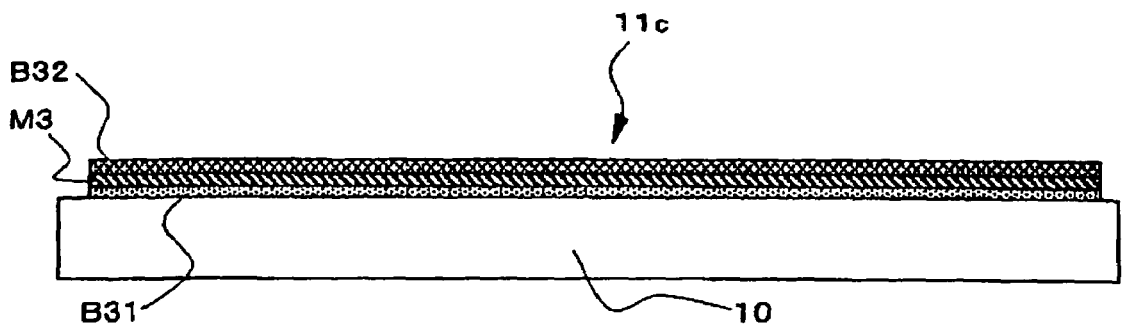
FIG. 19 is a cross-sectional view illustrating a modified aspect (structure that a metal layer of the lower light shielding film is interposed between barrier layers) of FIG. 17.
Figure 20:
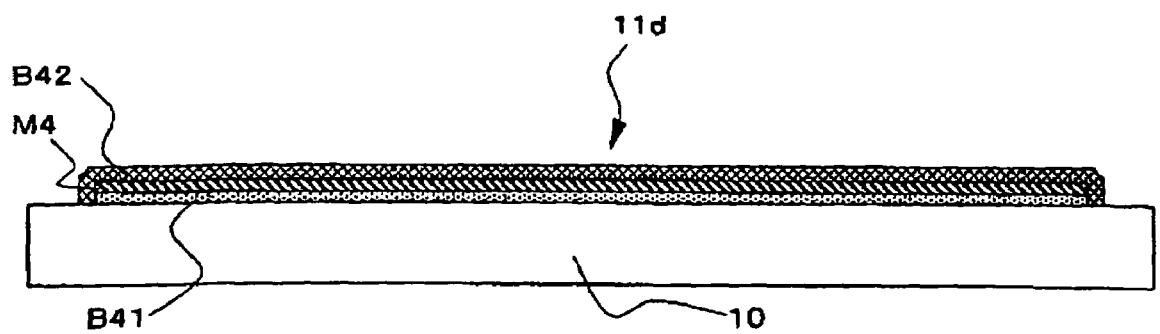
FIG. 20 is a cross-sectional view illustrating a modified aspect (structure that a barrier layer of the lower light shielding film covers sides of the metal layer) of FIG. 17.

Fourth, the structure of the lower light shielding film 11a will be described with reference to FIG. 4 and FIGS. 17 to 20 to which have been already referred. Herein, FIGS. 17 to 20 are cross-sectional views illustrating structures of only TFT array substrate 10 and lower light shielding films, and FIG. 17 shows the lower light shielding film 11a according to the first exemplary embodiment described above, and FIG. 18 and the others show each lower light shielding film (11b, 11c, and 11d) according to the modified aspects.

Preferentially, in the first exemplary embodiment, as described above, the lower light shielding film 11a has a double-layer structure including a metal layer M1 below the film 11a and a barrier layer B1 above the film 11a (see FIG. 17 and FIG. 4).

Such barrier layer B1 includes an oxygen-free and high-melting-point metal or a metal compounds. Such a barrier layer B1 includes one of, a nitrogen compound, a silicon compound, a tungsten compound, a tungsten, and a silicon. Sin (silicon nitride), Tin (nitride titanium), WIN (nitride tungsten), Moon (nitride molybdenum), CRM (nitride chromium), etc. are preferably used as the nitrogen compounds. Also, TiSi (titanium silicide), WSi (tungsten silicide), Mossy (molybdenum silicide), Cozy (cobalt silicide), Crisp (chromium silicide), etc. are preferably used as the silicon compounds. In addition, Taw (titanium tungsten), Mow (molybdenum tungsten), etc. are preferably used as the tungsten compounds. Also, Non-doped silicon is preferably used as the silicon.

It is desirable that the thickness of the barrier layer B1 is set 1 to 200 nm, if 30 to 50 nm, a function of thin film thickness barrier can be executed and diffused reflection can be reduced. When the thickness of the barrier layer B1 is set below 3 nm, it is unlikely to be able to sufficiently reduce or prevent deterioration of light-shielding properties due to oxidation of a metal layer through a high-temperature processing. On the other hand, when the thickness of the barrier layer B1 is set more than 150 nm, there is an increase tendency in bow-state volume of TFT array substrate 10. Unless there is negative effect on the display quality of a crystal device, 200 nm may be preferable. Such barrier layer B1 is also a protective layer to protect oxidation of the metal layer M1.

Also, the metal layer M1 is a metal substance or a metal compounds with light-shielding properties, and is made of any one of a metal substance or a metal compounds where deterioration of a light-shielding properties appears if the metal layer M1 becomes an oxygen compounds through a chemical reaction with an insulating layer of $SiO_2$, Ti (titanium), W (tungsten), Mo (molybdenum), Co (cobalt), Cr (chromium), He (hafnium), Run (ruthenium), etc. are preferably used as the metal substance. Also, Tin (nitride titanium), Taw (titanium tungsten), Mow (molybdenum tungsten), etc. are preferably used as the metal compounds. It is desirable that the film thickness of the metal layer M1 is set 10 to 200 nm.

It is not desirable that the thickness of the metal layer M1 is set less than 10 nm, because there are apprehensions about insufficiency of light-shielding properties. It is also not desirable that the thickness of the metal layer M1 is set more than 200 nm, because bow-state volume of TFT array substrate 10 greatly increases so that apprehensions about quality decrease of a crystal device can occur.

With such structure, of the laminated structure, in forming elements positioned above such lower light shielding film 11a, although a high-temperature processing, such as annealing processing in forming a TFT 30 will be described below is performed, it is possible to reduce or prevent an oxidation of the metal layer M1 in advance because a barrier layer B1 is provided thereon. Thus, according to the first exemplary embodiment, as described above, the metal layer M1 is made of, for example, a titanium, thereby enabling decrease of deterioration possibility of light-shielding properties without formation of a titanium oxide due to the high-temperature processing. Also, in the first exemplary embodiment, it is possible to reduce or prevent light incident, that is, returning light incident from the lower side to a semiconductor layer 1a of the TFT 30 in advance by setting a light-shielding film having such double-layer structure as a lower light-shielding film positioned below the TFT 30, and to further decrease a possibility that light leakage current in the semiconductor 1a may break out.

Also, the present invention is not limited to the aspects having the double-layer structure described above. Hereinafter, various modified aspects about such lower light-shielding film will be described. First, as described above, it is preferable to take not the double-layer structure of the metal layer M1 and the barrier layer B1 from the TFT array substrate 10 in order, but a bottom-up structure, that is, a double-layer structure of a barrier layer and a metal layer from the TFT array substrate 10 in order. In this case, owing to the barrier layer, oxidation of the metal layer can be reduced or prevented.

Figure 18:
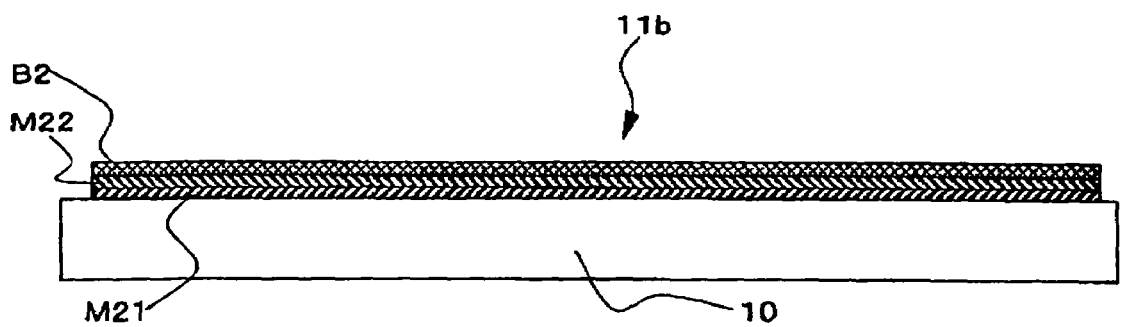
FIG. 18 is a cross-sectional view illustrating a modified aspect (structure that a metal layer of the lower light shielding film has double-layers) of FIG. 17.

Second, as shown in FIG. 18, the lower light-shielding film 11b has a type that the metal layer M1 in FIG. 4 is divided into a metal layer M21 with light-shielding property and a metal layer M22 with optical-absorption property. Also, in this case, it is desirable to arrange the latter optical-absorption metal layer M22 to be faced with the TFT 30, that is, to be positioned at upper side. As a result, such lower light-shielding film 11b has a triple-layer structure of the metal layer M21, the optical-absorption metal layer M22, and the barrier layer B2 from the TFT array substrate 10 in order. Based on such structure, because of the metal layer 21 with light-shielding property, it is possible to reduce or prevent an exposure on the TFT 30. At the same time, it is possible to reduce or prevent inner-reflection of light because of light absorption by the optical-absorption metal layer M22 confronted with the TFT 30.

Third, as shown in FIG. 19, the lower light-shielding film 11b has a structure that a barrier layer B31 is further provided below the metal layer M1 in FIG. 4. Namely, such lower light-shielding film 11c has a triple-layer structure of the barrier layer B3, a metal layer M3, and the barrier layer B4 from the TFT array substrate 10 in order. As a result, both sides of the metal layer M3 are protected by the barrier layers B31 and B32 so that decrease of light-shielding property due to oxidation of the metal layer M3 can be further suppressed.

Further, regarding such lower light-shielding film 11c, it is preferable to constitute the metal layer M3 interposed between the barrier layers B31 and B32 by using a metal layer having the double-layer structure as shown in FIG. 17, or more commonly having a multi-layered structure. For example, it is also preferable to adopt a structure of a barrier layer B31, a first optical-absorption metal layer, a metal layer with light-shielding property, a second optical-absorption metal layer, and a barrier layer B32 from the TFT array substrate 10 in order.

Fourthly, as shown in FIG. 20, the lower light-shielding film 11d has a structure that the barrier layer B32 is formed to cover sides of the metal layer M3 and the barrier layer B31 positioned in a lower layer than itself. Namely, such lower light-shielding film 11d has a triple-layer structure of the barrier layer B41, a metal layer M4, and the barrier layer B42 covering entire of the two layers from the TFT array substrate 10 in order. As a result, besides the same effect as FIG. 19, because the barrier layer B42 is also provided on sides of the metal layer M4 so that oxidation thereof can be reduced or prevented, a state that light-shielding capability may decrease due to provision of the metal layer M4 hardly occurs.

Also, it is needless to say that similar structure to such lower light-shielding film 11d can be taken in FIGS. 17 and 18 described above in a quite same manner. That is, it is easily possible to form sides of the barrier layer B1 and the metal layer M1 in FIG. 17 and sides of the barrier layer B2, and the metal layers M22, M21 in FIG. 18 so as to be covered. As a result, it is possible to greatly reduce or prevent decrease of light-shielding capability.

Regarding various light-shielding structures described above and effects thereof, in a word, because it is possible to effectively reduce or prevent light incidence from upper side or lower side to the TFT 30, light incidence from the sides, or light incidence from slopes, it is possible to positively reduce or prevent occurrence of light leakage current in the TFT 30. In addition, the upper light-shielding film and the embedded light-shielding film described above may greatly contribute to such effects.

Namely, in the laminated structure, various elements made of an opaque material formed above the TFT 30, such as scanning lines 3a, data lines 6a, capacitive electrodes 300, shielding layer 400, or the like, reduce or prevent light incidence from the upper side of the semiconductor layer 1a of the TFT 30 in advance so that occurrence of light leakage current in the semiconductor layer 1a can also be suppressed.

As a result, according to the exemplary embodiment, since the switching operation of the TFT 30 can be accurately performed and the state in which so called bias is always driven due to the light leakage current in the semiconductor layer 1a can be avoided, it is also possible to implement high frequency driving. Furthermore, if the light shielding can be effectively performed on the TFTs 30, any particular hindrance will not occur even in a case where the miniaturization of the electro-optical device is sought. In other words, since the images of uniform brightness have to be displayed, even the miniaturized electro-optical device has to have the associated certain pixel aperture ratio. In the case, the danger of light entering into the TFTs 30 is highly associated with the "miniaturization". However, there is little concern about such a danger in the present embodiment.

As a result, according to the electro-optical device of the present exemplary embodiment, it is possible to keep the voltage applied to the pixel electrode to be as constant as possible, and at the same time, it is possible to implement miniaturization and render high accuracy and to display high quality of image by high frequency driving.

Figure 21:
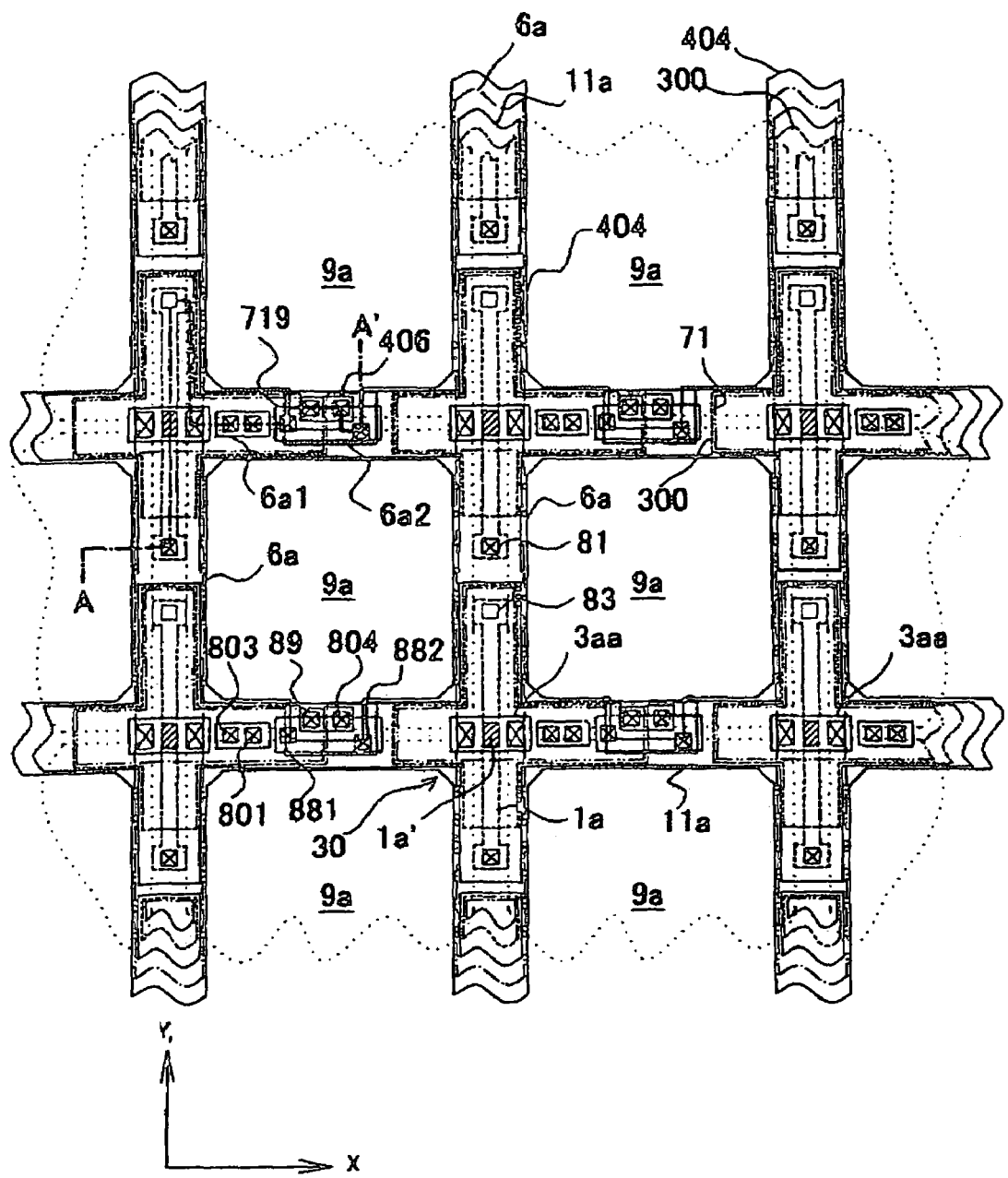
FIG. 21 is a plan view illustrating a plurality of pixels arranged to be adjacent to each other on the TFT array substrate on which data lines, scanning lines, and pixel electrodes are formed, in the electro-optical device of the second exemplary embodiment according to the present invention.
Figure 22:
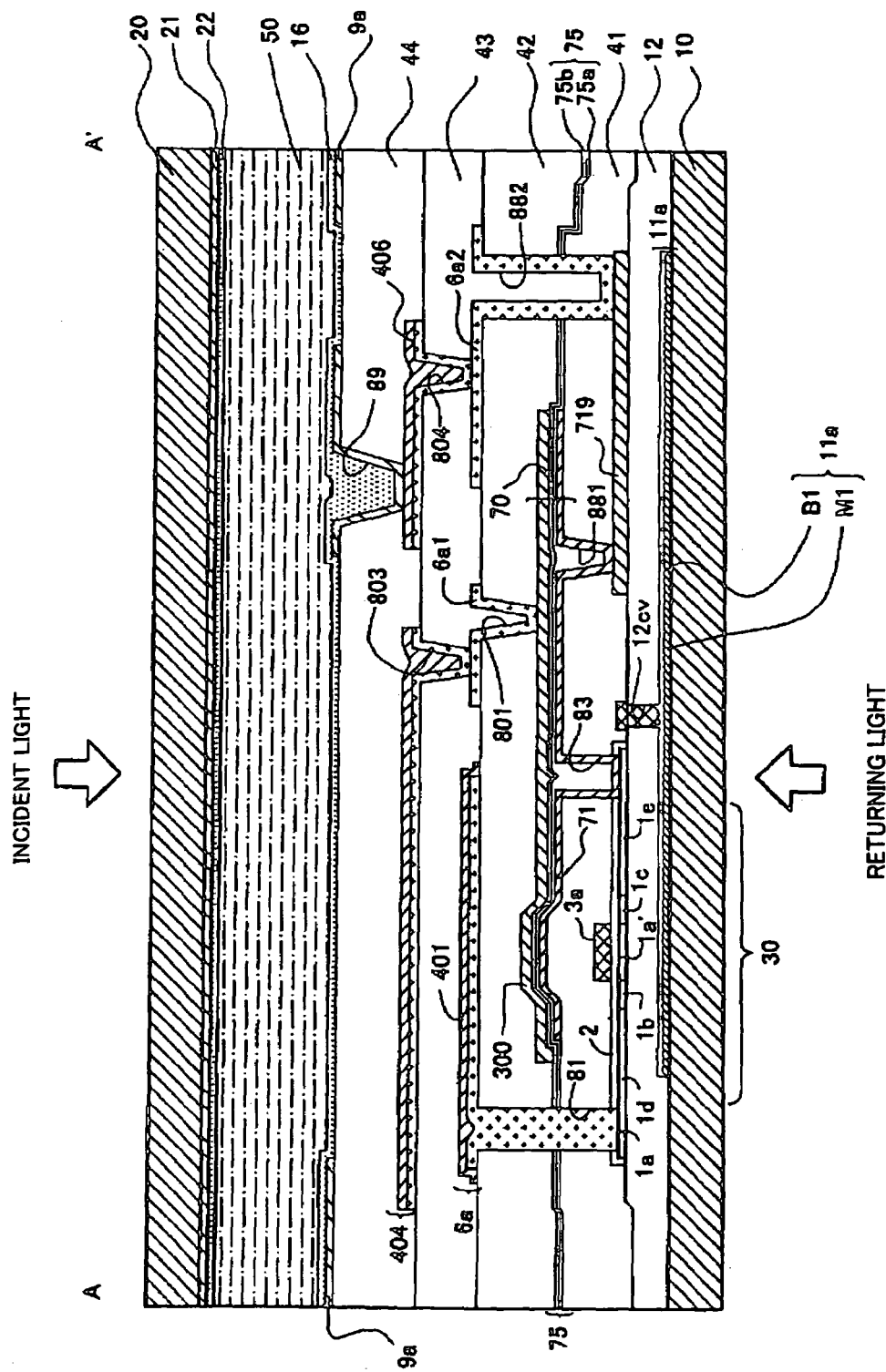
FIG. 22 is a cross-sectional view taken from taken along the plane A–A' in FIG. 21.
Figure 23:
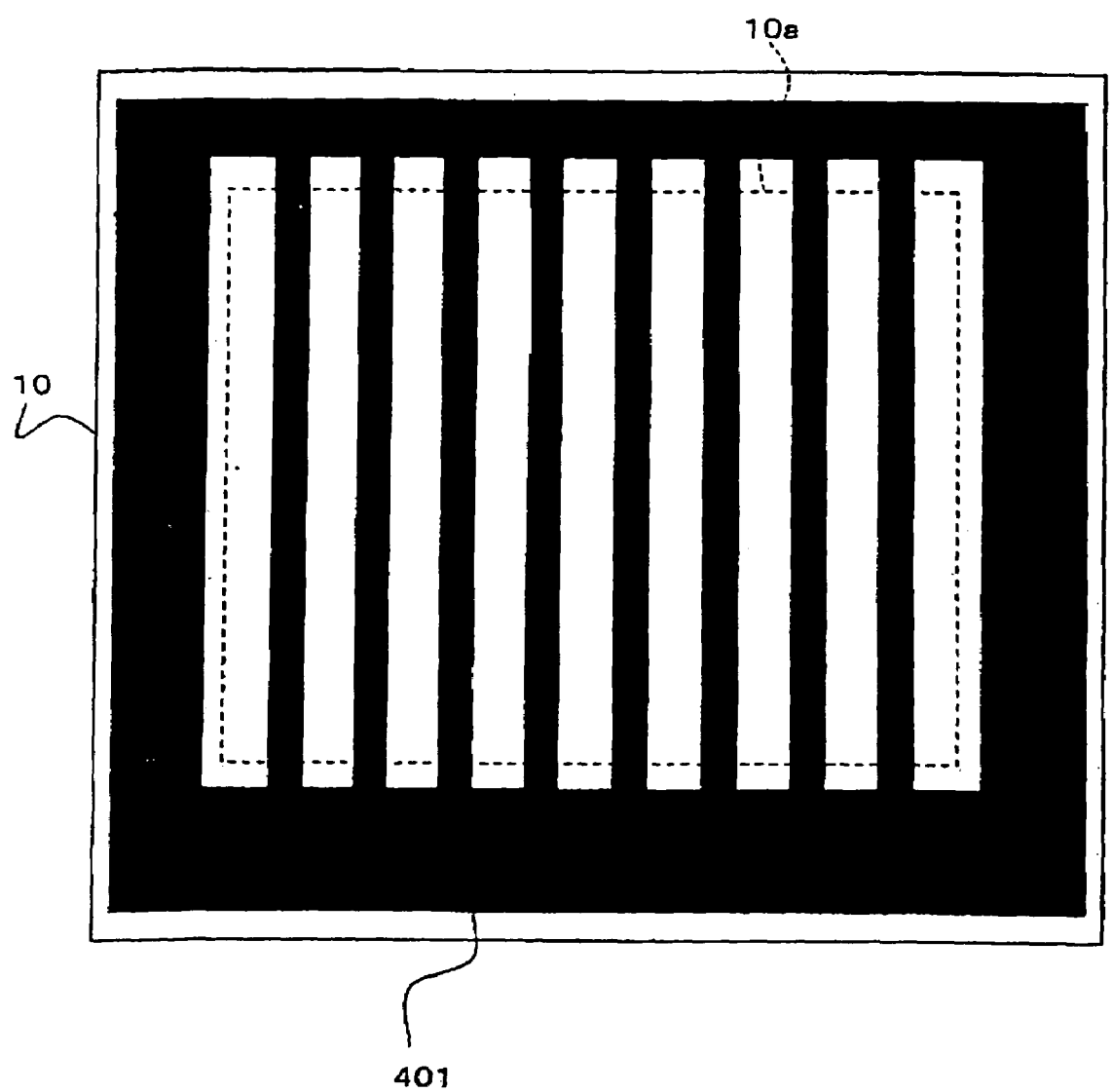
FIG. 23 is a plan view illustrating formation of an aspect of nitride films (on data lines and except image display regions)

Second Embodiment: A Case That Shielding Layers and Data Lines are Formed in Each Layer Hereinafter, an electro-optical device according to the second exemplary embodiment of the present invention will be described with reference to FIGS. 21 to 23. FIG. 21 is a plan view, for the same purpose as FIG. 2, illustrating a group of pixels adjacent to each other in a TFT array substrate where data lines, scanning lines, pixel electrodes, etc. are formed. Also, FIG. 22 is, for the same purpose as FIG. 3, a cross-sectional view taken along the plane A–A' in FIG. 21. Further, FIG. 23 is a plan view illustrating an aspect of forming a specific nitride film in the second exemplary embodiment. In addition, structure of pixel part of the electro-optical device in the second exemplary embodiment is generally equivalent to that of the electro-optical device in the first exemplary embodiment.

Therefore, hereinafter, only specific points of the second exemplary embodiment will be explained, but the other points thereof will be omitted or simplified.

In the second exemplary embodiment, as shown in FIG. 22, as compared with FIG. 4, the capacitor electrode 300 which is the upper electrode constituting the storage capacitor 70 and the data line 6a is not made of the same film, and in addition, interlayer insulating film is added thereto. Namely, the difference is that one more new "fourth interlayer insulating film 44" is provided and a relay electrode 719 is formed of the same film as the gate electrode Ana. By doing so, in the following order starting from the TFT array substrate 10, a first layer which includes the lower light-shielding film 11a functioning also as scanning line, a second layer which includes the TFT 30 having the gate electrode Ana, a third layer which includes the storage capacitor 70, a fourth layer which includes the data line 6a, a fifth layer on which a shielding layer 404 is formed, a sixth layer (the upper most layer) which comprises the aforementioned pixel electrode 9a and the alignment film 16, and the like are provided. Furthermore, the base insulating film 12 is formed between the first layer and the second layer, the first interlayer insulating film 41 is formed between the second layer and the third layer, the second interlayer insulating film 42 is formed between the third layer and the fourth layer, the third interlayer insulating film 43 is formed between the fourth layer and the fifth layer, and the fourth interlayer insulating film 44 is formed between the fifth layer and the sixth layer, thereby reducing or preventing a short circuit between the aforementioned constituents.

In the second exemplary embodiment, in place of the scanning line 3a, the gate electrode Ana is formed, and at the same time, the relay electrode 719 is further formed of the same film as the gate electrode Ana. Hereinafter, structures of each layer will be described below in detail.

First, in a second layer, gate electrodes Ana are formed so as to correspond to channel regions 1a' of semiconductor layers 1a. Such gate electrodes Ana are not formed on the lines as the scanning lines 3a in the first exemplary embodiment, but formed in the shape of islands in conformity with the fact that semiconductor layers 1a and channel regions 1a' are formed in the shape of islands on a TFT array substrate 10. Also, in the second exemplary embodiment, bottoms of grooves 12cv of contact holes are contacted to surfaces of the lower light-shielding films 11a of the first layer, respectively, and the lower light-shielding films 11a are formed in the shape of stripe extending in the direction of x in FIG. 21. As a result, gate electrodes Ana formed on the grooves 12cv is electrically connected through the grooves 12cv to the lower light-shielding films 11a. That is, in the second exemplary embodiment, scanning signals are supplied through the lower light-shielding films 11a to the gate electrodes Ana. In other words, the lower light-shielding films 11a in the second exemplary embodiment function as scanning lines.

Further, the lower light-shielding films 11a in the second exemplary embodiment have protrusions along extending direction of data lines 6a, as shown in FIG. 21. By such protrusions, the lower light-shielding film 11a in the second exemplary embodiment accomplishes a light shielding function comparable to that of the lower light-shielding film 11a in lattice shape in the first exemplary embodiment. But, protrusions, which extend from the lower light-shielding films 11a adjacent to each other, are not contacted to each other and electrically isolated. Otherwise, the lower light-shielding films 11a cannot function as scanning lines. Also, the lower light-shielding films 11a have protrusions at intersection regions with the data lines 6a, thereby enabling corners of the pixel electrodes 9a to be rounded off.

And, particularly in the second exemplary embodiment, the above-described gate electrodes Ana and relay electrodes 719 are formed in the same films. The relay electrodes 719 are formed at about center part of side of each pixel electrodes 9a in the shape of islands in plan view, as shown in FIG. 21. Because the gate electrodes Ana and the relay electrodes 719 are formed in the same films, when the latter are made of, for example, conductive polysilicon film or the like, the former is also made of conductive polysilicon or the like.

Next, a first relay layers 71 constituting storage capacitors 70, dielectric films 75, and capacitive electrodes 300 are formed in third layers. The first relay layers 71 in the third layers are formed of polysilicon. And, because the capacitive electrodes 300 are not formed together with the data lines 6a, considering electrical connection between the data lines 6a and the TFTs 30, it is not necessary to take a double-layer structure of an aluminum film and a conductive polysilicon film, unlike the first exemplary embodiment. Thus, the capacitive electrodes 300 are made of light-shielding materials, such as metal simple substance, alloy, metal silicates, poly silicates, and a stack thereof including, for example, at least one of high-melting-point metals such as Ti (titan), Cr (chromium), W (tungsten), Ta (tantalum), Mo (molybdenum) and so on, as similar to the lower light-shielding films 11a. By doing so, the capacitive electrodes 300 can function as the "upper light-shielding film" and "embedded light-shielding film" described above very well (but, a material for the capacitive electrodes 300 in the second exemplary embodiment will be described later).

In addition, the dielectric film 75 has a two-layered structure, as shown in FIG. 22, in which the lower layer is a silicon oxide film 75a and the upper layer is a silicon nitride film 75b and is formed over the entire surface of the TFT array substrate 10. Furthermore, in the other example of the dielectric film 75, the lower layer of the silicon oxide film 75a may be formed over the entire surface of the TFT array substrate 10 and the upper layer of the silicon nitride film 75b may be patterned to be accommodated in a light-shielding region (a non-opening region), so that the silicon nitride film having colorability can prevent the decrease of the transmittance.

Further, since the capacitive electrodes 300 and the data lines 6a are formed in each layer, in the present aspect, it is not necessary to electrically disconnect from each other in one plane. Thus, it is possible to form the capacitive electrodes 300 as portions of capacitive lines extending in the direction of the scanning lines 3a.

As described above, although first interlayer insulating films 41 are formed on the gate electrodes Ana and the relay electrodes 719 and under the storage capacitors 70, it is preferable that the first interlayer insulating films 41 are formed of silicate glass films, such as NSG, PSG, BSG, and BPSG, nitride oxide films, silicon oxide films, or the like. Also, in the first interlayer insulating film 41, contact holes 881, which are arranged so as to be electrically connected with center parts of bottom surfaces of the first relay layers 71 in FIG. 22, are opened. As a result, the first relay layers 71 can be electrically connected to the relay electrodes 719. Also, in order to electrically connect with second relay layers 6a2, contact holes 882 are opened through second interlayer insulating films 42 described below in the first interlayer insulating film 41.

On the other hand, although data lines 6a are formed in a fourth layers, like the capacitive electrodes 300 described above, the data lines 6a do not have to take double-layer structure. For example, the data lines 6a may be made of conductive materials, such as aluminum simple substance, aluminum alloy, other metals or alloy. But, because such data lines 6a have to be electrically connected to the semiconductor layers 1a of the TFTs 30 similarly to the first exemplary embodiment, it is preferable that conductive polysilicon films are provided to portions directly contacted with the semiconductor layers 1a.

Further, as an example of a triple-layer structure, it is preferable that the data lines 6a and the first and second relay layers 6a1, 6a2 for the shielding layers are formed in a triple-layer structure, the triple-layer structure including a layer made of aluminum, a layer of made of nitride titanium, and a silicon nitride film from the lower layer in order. It is desirable that the silicon nitride film is patterned a little bigger so as to cover the aluminum layer and the nitride titanium layer positioned below it. Since the data lines 6a contain aluminum of relatively low-resistive material, it is possible to easily supply image signals to the TFTs 30 and the pixel electrodes 9a.

And, in the second exemplary embodiment, a nitride film 401 is formed over the data lines 6a made of aluminum, as described above, along the direction of the data lines 6a. Furthermore, the nitride film 401 according to the present exemplary embodiment also extends around an image display region 10a in which pixel electrodes 9a arranged in a matrix, and data lines 6a and scanning lines 3a arranged between these pixel electrodes 9a are formed. In addition, the thickness of such nitride film 401 is set, for example, 10 to 500 nm, and more preferably, 10 to 30 nm. Such nitride film 401 can be formed in a laminated structure or the like having a Tin film of 50 to 300 nm as a lower layer and having an Sin film or Sino film as an upper layer.

As described above, the nitride film 401 according to the present exemplary embodiment are formed on the TFT array substrate 10 as entire-schematically shown in FIG. 23.

Further, in FIG. 23, the nitride film 401 provided around the image display region 10a, and more particularly, Sin film or Sino film capable of constituting such nitride film 401 greatly contributes to reduce or prevent water from invading COMES (Complementary MOS) type TFT constituting data line driving circuits 101 and scanning line driving circuits 104 described below. However, compared with general materials, because low etching rate in dry-etching or the like may be estimated, when nitride film 401 is formed in the peripheral region of the image display region 10a described above, if it is needed to form contact holes in the region, it is preferable to previously open holes in the nitride film 401 at positions corresponding to the contact holes. If such processing is performed together with patterning illustrated in FIG. 23, it is helpful to the simplification of the manufacturing process.

In addition, in new fourth layers, first relay layers 6a1 and second relay layers 6a2 (but, slightly different from "the second relay layers" in the first exemplary embodiment in a sense) for a shielding layer are formed in the same films as the data lines 6a. The former are relay layers to electrically connect shielding layers 404 having light-shielding properties with the capacitive electrodes 300, and the latter are relay layers for electrically connecting pixel electrodes 9a with the first relay layers 71. Also, it is needless to say that such relay layers are made of the same material as the data lines 6a.

As described above, although a second interlayer insulating films 42 are formed on the storage capacitors 70 and under the data lines 6a and the relay layers 6a1, 6a2 for shielding layers, the second interlayer insulating films 42 may be formed of silicate glass films such as NSG, PSG, BSG, and BPSG, silicon nitride films, silicon oxide films, or the like, similarly to those described above.

Further, contact holes 801 and the contact holes 882 are opened in the second interlayer insulating films 42 to correspond to the first and second relay layers 6a1, 6a2 for shielding layers.

Next, in new fifth layers, shielding layers 404 having light-shielding properties are provided. Such layers may be formed in, for example, double-layer structure including an upper layer of nitride titanium and a lower layer of aluminum, or, if necessary, may be formed of conductive material, such as ITO, similarly to the shielding layers 400 described above. Such shielding layers 404 are electrically connected through the relay layers 6a1 for shielding layers described above to capacitive electrodes 300. By doing so, the shielding layers are held to constant potential, similarly to the first exemplary embodiment, interference of capacitor coupling generated from between pixel electrodes 9a and the data lines 6a can be excluded. Also, in such new fifth layers, third relay layers 406 are formed of the same film as the shielding layers 404.

As described above, third interlayer insulating films 43 are formed on the data lines 6a and below the shielding layers 404. Such third interlayer insulating films 43 can be formed of the same material as the second interlayer insulating film 42. But, when the data lines 6a contain aluminum described above, in order to avoid exposure to high-temperature atmosphere, it is desirable that the third interlayer insulating films 43 are formed by using low-temperature film forming method, such as plasma COD or the like.

In addition, contact holes 803 are opened in the third interlayer insulating films 43 to electrically connect the shielding layers 404 with the relay layers 6a1 for shielding layers described above, and contact holes 804, which are connected with the second relay layers 6a2 and correspond to third relay layers 406, are opened.

With regard to the other configuration, in new sixth layers, pixel electrodes 9a and alignment films 16 are formed, and fourth interlayer insulating films 44 are formed between the new sixth and fifth layers. And, in the fourth interlayer insulating films 44, contact holes 89 are opened to electrically connect the pixel electrodes 9a with the third relay layers 406.

Also, in above-described structures, because the third relay layers 406 are directly contacted to the pixel electrodes 9a made of ITO or the like, electrical erosion described above should be noticed. Thus, considering such points, it is preferable that the shielding layers 404 and the third relay layers 406 are formed in the double structure including aluminum and nitride titanium, similarly to the first exemplary embodiment. Further, it is needless to consider electrical erosions between the third relay layers 406 and the pixel electrodes 9a when the shielding layers 404 and the third relay layers 406 are formed of ITO. But it is necessary to consider electrical erosions between the shielding layers 404 and the relay layers 6a1 for shielding layers or between the third relay layers 406 and the second relay layers 6a2. Thus, in order to avoid direct contact of the ITO and aluminum, it is desirable that the relay layers 6a1 for shielding layers, the second relay layers 6a2, and the data lines 6a adopt a proper double-layer structure.

In the second exemplary embodiment, because the capacitive electrodes 300 can be formed as portions of the capacitive lines, in order to hold the capacitive electrodes 300 constant potential, the capacitive lines may be extended to outer regions of the image display regions 10a so as to be connected to constant potential source. Also, because the capacitive lines including the capacitive electrodes 300 can be connected the constant potential source individually by themselves and the shielding layers 404 can be connected to the constant potential source individually by themselves, when such configurations are adopted, it is needless to form the contact holes 801, 803 to electrically connect both with each other. Thus, in such a case, when materials for the shielding layers 404 and the capacitive electrodes 300 or relay layers 6a1 for shielding layers are selected (originally, the relay layers 6a1 for corresponding shielding layer are no longer needed), it is needless to consider generation of electrical erosion.

In an electro-optical device according to the second exemplary embodiment having such a structure, first, it is apparent that the substantially same effect as the first exemplary embodiment can be obtained. Thus, similarly to the first exemplary embodiment, grooves 12cv and horizontal protrusions 3b are provided and the lower light-shielding films 11a are formed of the barrier layers B1 and the metal layers M1 so that the semiconductor layers 1a of the TFT 30 can be effectively shielded from light and image of quality without flicker can be displayed.

And, in the second exemplary embodiment, particularly, because the nitride film 401 is formed over the data lines 6a and peripheral region of the image display region 10a, it is possible to realize more waterproof TFT 30. Namely, because nitride film and nitride greatly effectively prevent invasion and diffusion of moisture, it is possible to shield the semiconductor layers 1a of the TFT 30 from moisture invasion in advance. Besides, in the second exemplary embodiment, nitride film may be used for the shielding layers 404, the third relay layers 406, and dielectric films 75 constituting the storage capacitors 70. But when such nitride film is provided to all structures, moisture invasion can be more effectively reduced or prevented. However, undoubtedly, it is needless to say that "nitride film" may not necessarily be formed in all structures.

Also, in the second exemplary embodiment, because the nitride film 401 is provided on only the data lines 6a except the outer region of the image display region 10a, without great inner-stress concentration, it does not occur that the nitride film 401 is destroyed due to the inner-stress, or cracks are produced, for example, at the third interlayer insulating films 43 provided around the nitride film 401 due to outer action of the inner-stress. On the assumption that nitride film is provided over entire surfaces of the TFT array substrate 10, it is more apparent.

In addition, nitride film 401 in the second exemplary embodiment have the thickness of 10 to 100 nm, and more preferably, 10 to 30 nm so that function and effect described above can be more effectively obtained.

Further, in the second exemplary embodiment, particularly, following function and effect can be obtained because relay layers 719 are provided. That is, in FIG. 4, in order to electrically connect the TFTs 30 with the pixel electrodes 9a, like contact hole 85 shown in FIG. 4, it is necessary to contact to "top surface" of the first relay layer 71 as lower electrode of the storage capacitor 70 in the drawing.

But, in such a structure, in the step of forming the capacitive electrodes 300 and the dielectric films 75, when etching precursor films thereof, very troublesome manufacturing processes, where corresponding precursor films are etched with the first relay layers 71 positioned right below the films reliably remaining, should be performed. Particularly, like the present invention, in a case that material having a high dielectric constant is used as the dielectric films 75, because it is generally difficult to etch and also conditions that etching rates in the capacitive electrodes 300 and the high dielectric-constant material are different from each other are amassed, it is more difficult to perform the corresponding manufacturing process. Thus, in such cases, there may be "penetrations" in the first relay layers 71. As a result, in a worse case, there may be short-circuit between the capacitive electrodes 300 and the first relay layers 71 which constitute the storage capacitors 70.

But, like the present exemplary embodiment, when the TFTs 30 are electrically connected to the pixel electrodes 9a by providing the relay layers 719 so that the first relay layers 71 have electrical contact points at "bottom surfaces" thereof in Figs, the above-described problems do not happen. The reason is, as apparent from FIG. 22, that it is not necessary to perform the step for having the first relay layers 71 remain reliably while the capacitive electrodes 300 and the precursor films of the dielectric films 75 are being etched.

As described above, according to the present exemplary embodiment, because it is needless to perform the troublesome etching process described above, it is possible to excellently realize the electrical connections between the first relay layers 71 and the pixel electrodes 9a. This is based that electrical connections between the both are realized through the relay layers 719. That is, according to the present exemplary embodiment, there is little possibility of short-circuit between the capacitive electrodes 300 and the first relay layers 71. Namely, it is possible to quite suitably form defective-free storage capacitors 70.

In addition, in the second exemplary embodiment, particularly, as described above, because the capacitive electrodes 300 can be formed of portions of the capacitive lines, it is needless to individually provide conductive materials to hold each capacitive electrode provided to correspond to each pixel as constant potential, and it is desirable that aspects of each capacitive line being connected to constant potential source be adopted. Thus, according to the present exemplary embodiment, it is possible to facilitate simplification of manufacturing process or decrease of manufacturing cost.

Also, similarly to the first exemplary embodiment, the capacitive lines including the capacitive electrodes may be formed in the shape of double-layer structure including aluminum films and polysilicon films. When the capacitive lines contain aluminum films, the capacitive lines can have higher conductivity. By doing so, in such aspects, it is possible to realize narrowness of the capacitive lines, i.e., the storage electrodes 70 without specially accompanying restrictions. Thus, in the second exemplary embodiment, it is possible to facilitate enhancement of new aperture ratio. In other words, because the capacitive lines are generally formed of material simple substance such as polysilicon or WSi or the like, and resistances of the materials are high, when narrowness is performed to enhance the aperture ratio, cross talks or sticking occurs, however, worry about such inconvenience in the second exemplary embodiment may disappear.

In addition, in such exemplary embodiment, because aluminum has an optical reflexibility and polysilicon film has an optical-absorption property, as described in the first exemplary embodiment, the capacitive lines are expected to function as light-shielding layers. Also, in such capacitive lines, inner-stress thereof can be less than that of a related art (inner-stress of aluminum is less than that of WSi or the like). Thus, in such exemplary embodiment, it is possible to form the third interlayer insulating film 43 as thin as possible, and to more favorably realize miniaturization of the electro-optical device.

Figure 24:
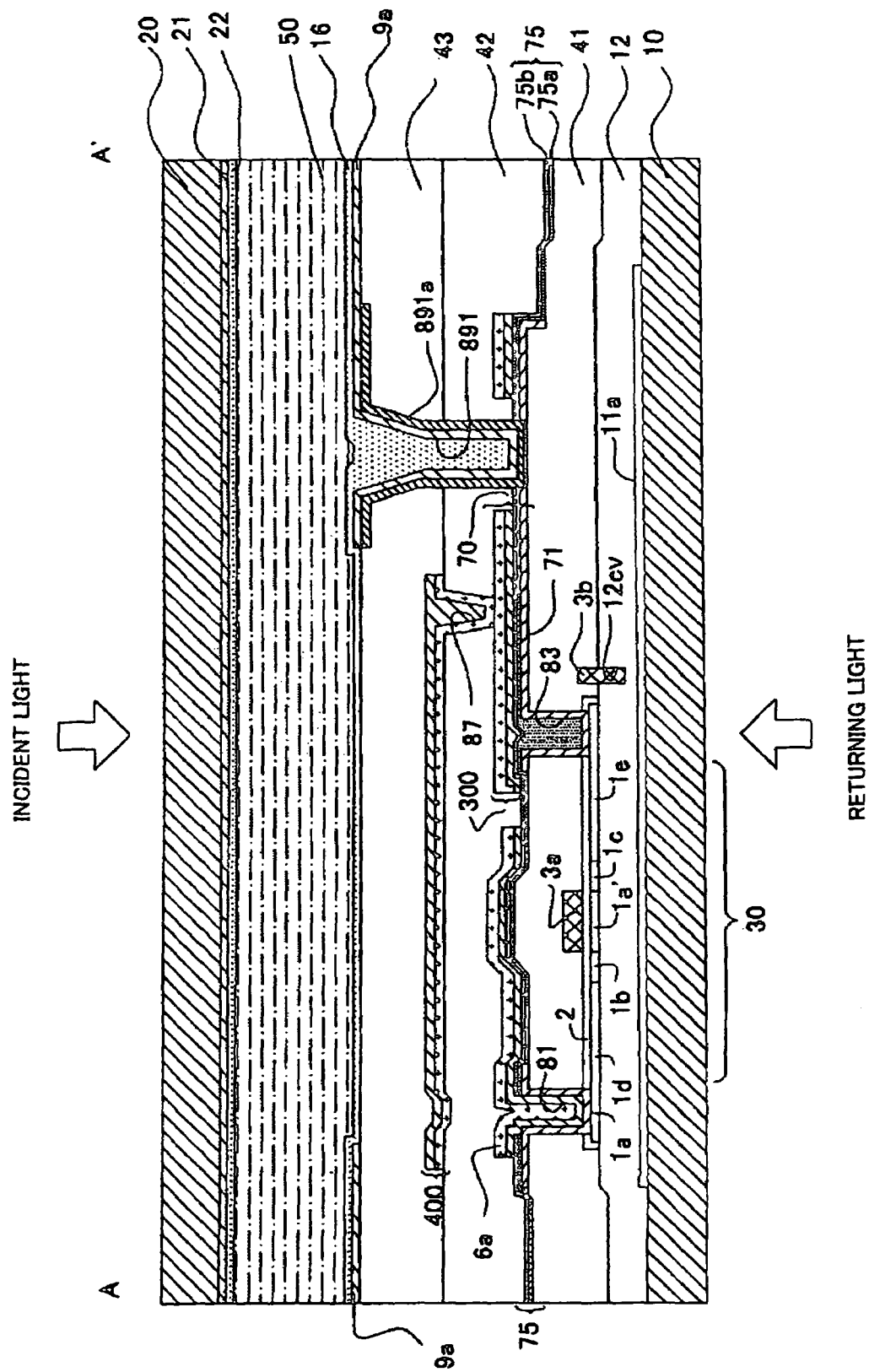
FIG. 24 is a schematic, as the same effect of FIG. 4, illustrating an aspect that Ti films are formed on inside surfaces of contact holes so as to electrically connect to pixel electrodes, according to the third exemplary embodiment of the present invention.

Third Exemplary Embodiment: Modified Aspect of Contact Hole so as to Facilitate Electrical Connect with Pixel Electrode Hereinafter, according to third exemplary embodiment of the present invention, modified aspect of contact hole so as to facilitate electrical connection with pixel electrode 9*a* of an electro-optical device according to the first exemplary embodiment described above will be described with reference to FIG. 24. FIG. 24 is a cross-sectional view, for the same purpose as FIG. 4, illustrating an aspect where films made of titanium simple substance, tungsten simple substance, compound of titanium or tungsten, or a stack of them, are specifically formed on inside surface of the contact hole to facilitate electrical connection with pixel electrode 9*a*. In addition, structure of pixel part of the electro-optical device in the third exemplary embodiment is generally equivalent to that of the electro-optical device in the first exemplary embodiment. Therefore, hereinafter, only specific points of the third exemplary embodiment will be explained, but the other points thereof will be appropriately omitted or simplified.

As shown in FIG. 24, in the third exemplary embodiment, compared with FIG. 4, it is very different in that second relay layers 402 are not formed, and Ti films 891*a* are formed on inside surfaces of the contact holes 891 for electrically connecting the pixel electrodes 9*a* with the first relay layers 71.

In more detail, differently from the first exemplary embodiment, because the second relay layers 402 are not formed on the fourth layers, electrical connection between the first relay layers 71 and the pixel electrodes 9*a* is realized through the contact holes 891 formed through penetrations in the second interlayer insulating films 42 and the third exemplary interlayer insulating films 43. And, Ti films 891*a* are formed on inside surfaces of such contact holes 891. Such Ti films 891*a* may contain at least titanium, or compound thereof. For example, nitride titanium, silicon nitride or the like is preferably used. ITOs constituting the pixel electrodes 9*a* are formed so as to cover surfaces of Ti films 891*a* or the like inside of the contact holes 891.

In an electro-optical device according to the third exemplary embodiment having such configuration, because the pixel electrodes 9*a* made of ITO are directly contacted to Ti films 891*a* or the like, similarly to the first exemplary embodiment where the second relay layers 402 made of aluminum films and nitride titanium films are provided so that danger of electrical erosion can be avoided, it is also possible to avoid danger of electrical erosion. Therefore, in the third exemplary embodiment, it is possible to effectively hold voltage apply to the pixel electrodes 9*a* or potential holding properties in the pixel electrodes 9*a*.

Also, according to the Ti films 891*a* described above, because the titanium has relatively excellent light-shielding property, it is possible to reduce or prevent light leakage due to the contact holes 891. That is, the corresponding Ti films 891*a* absorb light so that light transmitting through driving parts of the contact holes can be reduced or prevented from traveling. As a result, worry about optical-leakage on image may substantially disappear. Also, based on the same cause, it is possible to enhance light-resistant property of the TFT 30 and the semiconductor layers 1*a* thereof. By doing so, when light is incident on the semiconductor layers 1*a*, it is possible to reduce or prevent a light leakage current and flicker generation in image due to such current in advance. As described above, in the electro-optical device according to the third exemplary embodiment, it is possible to display images with more excellent quality.

In addition, compared with FIG. 4 explained with reference to the first exemplary embodiment and FIG. 22 explained with reference to the second exemplary embodiment, structures of the electro-optical device shown in FIG. 24 with reference to the third exemplary embodiment enrich concrete exemplary embodiments of laminated structures on the TFT array substrates 10.

Namely, in FIG. 24 with reference to the third exemplary embodiment, compared with FIGS. 4 and 22, because the second relay layers 402 are omitted so that the number of contact holes decreases, it is possible to simplify the structure of the electro-optical device and to enhance the aperture ratio. And, it is advantageous that various components constituting stacked structure may be arranged within the light-shielding regions. Further, in FIG. 4, as described above, it is possible to advantageously shorten and miniaturize the contact holes 83, 85, and 89 so as to reduce cost. And, in FIG. 22, it is possible to advantageously form the capacitive electrodes 300 out of portions of capacitive lines so as to reduce cost. Namely, in various exemplary embodiments of electro-optical devices according to the present embodiment, although aperture ratio is enhanced and the other associated function and effect are displayed individually, it is impossible to determine the best structure.

Whole Construction of Electro-Optical Device

The whole construction of the electro-optical device for each of the exemplary embodiments will be described with reference to FIGS. 25 and 26. In addition, FIG. 25 is a plan view illustrating the TFT array substrate in the electro-optical device of the exemplary embodiment according to the present invention and the constituents formed thereon as viewed from the substrate side, and FIG. 26 is a cross sectional view taken along the plane H–H' in FIG. 25.

Figure 25:
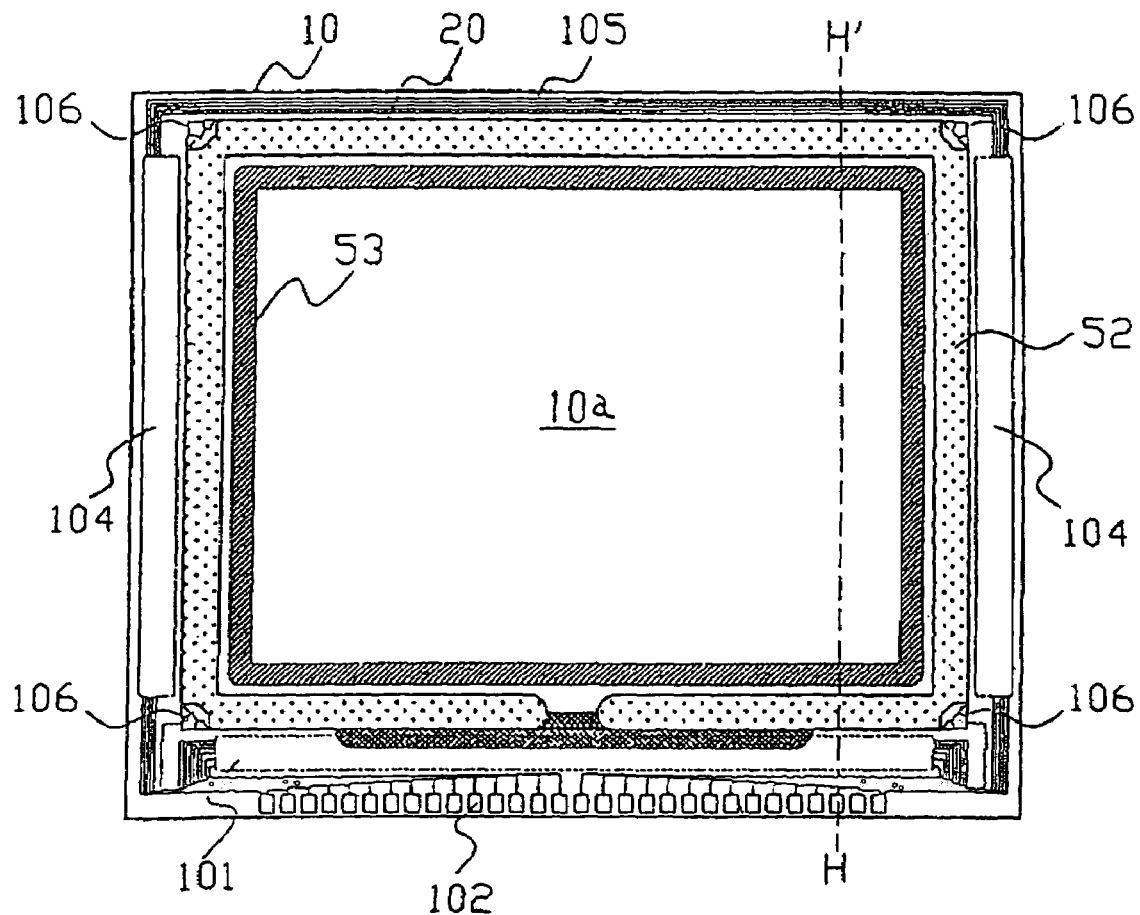
FIG. 25 is a plan view, as viewed from the counter substrate, illustrating a TFT array substrate of the electro-optical device according to an exemplary embodiment of the present invention and each element formed thereon together.
Figure 26:
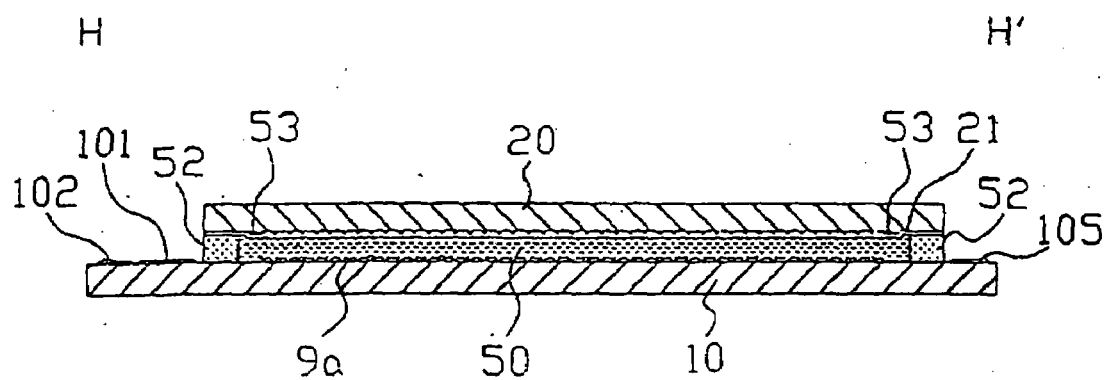
FIG. 26 is a cross-sectional view taken from taken along the plane H–H' in FIG. 25.

In FIGS. 25 and 26, with regard to the electro-optical device according to the present invention, the TFT array substrate 10 and the counter substrate 20 are provided to face each other. Between the TFT array substrate 10 and the counter substrate 20, liquid crystals 50 are sealed, and the TFT array substrate 10 and the counter substrate 20 are attached to each other with sealing materials 52 which are provided at the sealing regions located at the image display regions 10*a*.

The sealing materials 52 are made of, for example, a ultra-violet curing resin or a thermo setting resin for attaching both substrates to each other and are cured by ultra-violet irradiation or heating, etc. Furthermore, among the sealing materials 52, gap materials (spacers), such as glass fibers or glass beads may be dispersed in order to keep the distance (the gap between the substrates) between both substrates in a predetermined value if the liquid crystal device in the exemplary embodiments is a small liquid crystal device with a function of displaying enlarged images, such as a projector. In addition, the gap materials may be included in the liquid crystal layer 50 if the liquid crystal device is a large liquid crystal display or television with function of displaying images in the equal magnification power.

In the outside regions of the sealing materials 52, a data line driving circuit 101 which drives the data lines 6*a* by supplying the image signals to the data lines 6*a* at a predetermined timing and an external circuit connection terminals 102 are provided along the one side of the TFT array substrate 10, and scanning line driving circuits 104 which drive the scanning lines 3a by supplying the scanning signals to the scanning lines 3a at a predetermined timing are provided along the two sides which are adjacent to the one side.

In addition, as long as the delay of the scanning signals supplied to the scanning lines 3a is not considered to be a problem, the scanning line driving circuits 104 may be also provided at the only one side. Furthermore, the data line driving circuit 101 may be provided at both sides along the one side of the image display regions 10a.

In the other side of the TFT array substrate 10, a plurality of wiring lines 105 are provided to connect the scanning line driving circuits 104 which are provided at both sides of the image display regions 10a.

Furthermore, in at least one position of the corner parts of the counter substrate 20, a conductive material 106 is provided to perform electrical conduction between the TFT array substrate 10 and the counter substrate 20.

In FIG. 26, on the TFT array substrate 10, alignment films are provided over the pixel switching TFTs or the pixel electrodes 9a after forming the wiring lines such as scanning lines, data lines, or the like. On the other hand, on the counter substrate 20, alignment films as well as the counter electrodes 21 are provided on portions of the upper most layer. Furthermore, the liquid crystal layers 50 include, for example, one type liquid crystal or a mixture of various types of nematic liquid crystals, and take predetermined alignment states between a pair of the alignment films.

In addition, on the TFT array substrate 10, a sampling circuit to apply the image signals to the plurality of the data lines 6a in a predetermined timing, a precharge circuit to supply precharge signals of a predetermined voltage level to the plurality of the data lines 6a in advance of the image signals, and a test circuit to check the quality, defects, etc., of the electro-optical device during the manufacturing stage or at the shipment stage in addition to the data line driving circuit 101, the scanning line driving circuits 104, etc., may be provided.

Electronic Apparatus

Next, with regard to an exemplary embodiment of a projection type color display device as an example of the electronic apparatus for which the electro-optical device described above in detail is used as a light valve, the whole construction, and particularly the optical construction will be described. Herein, FIG. 27 is a schematic cross sectional view of the projection type color display device.

Figure 27:
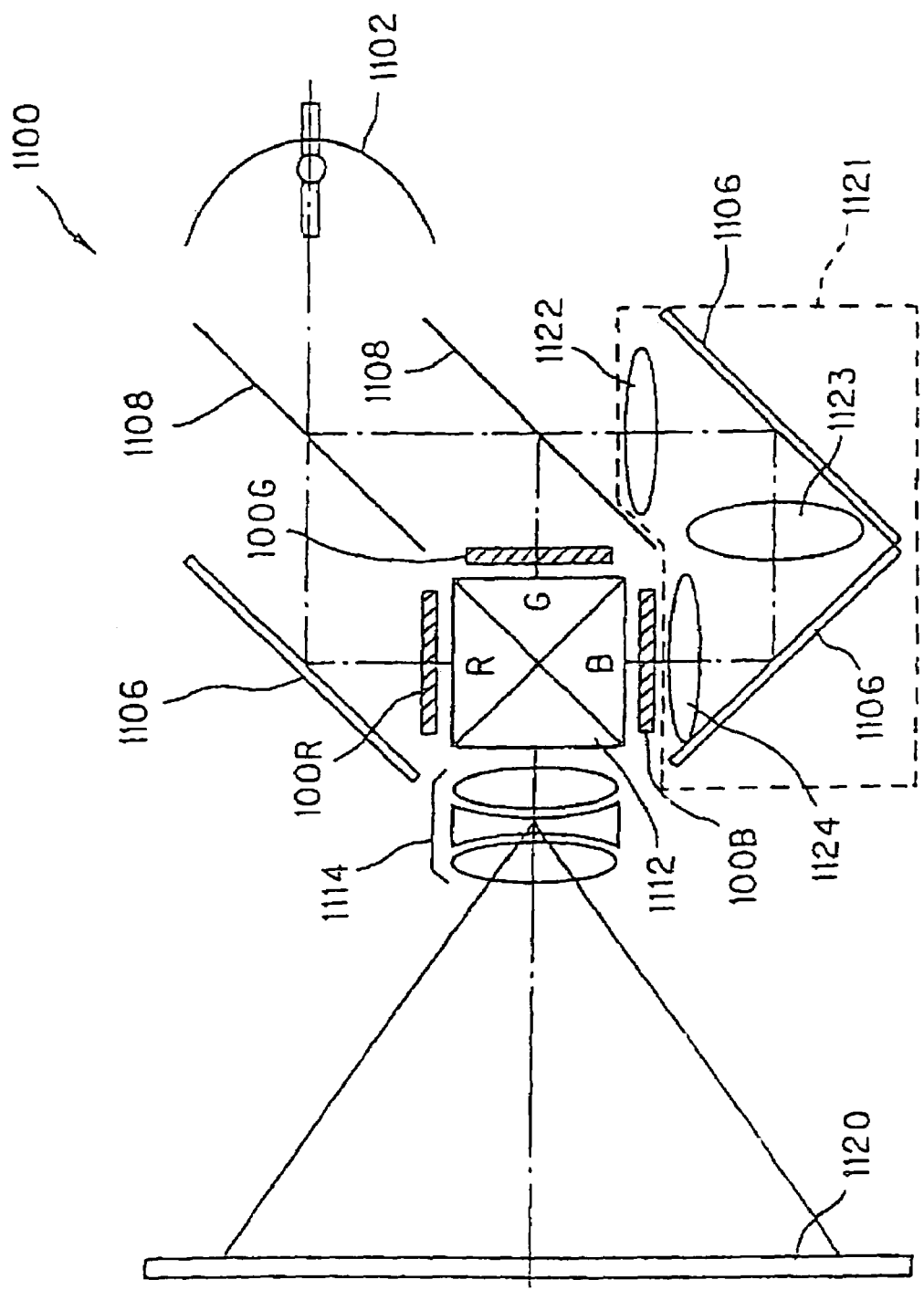
FIG. 27 is a schematically-cross-sectional view illustrating a color liquid crystal display device as an example of a projection-type color display device which is an exemplary embodiment of an electronic apparatus according to the present invention.

In FIG. 27, the liquid crystal projector 1100 as an example of the projection type color display device according to the exemplary embodiment is provided with three liquid crystal modules which comprise liquid crystal devices in which driving circuits are mounted on the TFT array substrate, and is constructed as a projector which is used as RGB light valves 100R, 100G, and 100B, respectively. In the liquid crystal projector 1100, when the projection light is emitted from the lamp unit 1102 of a white light source such as a metal halide lamp, etc., the light is divided into light components R, G, and B corresponding to the three primary colors of RGB by three pieces of mirrors 1006 and two pieces of dichroic mirrors 1108, and then guided to the light valves 100R, 100G, and 100B corresponding to each color. At this time, in particular, the B light is guided through relay lens system 1121 which includes an incident lens 1122, a relay lens 1123, and an emitting lens 1124 in order to reduce or prevent light leakage due to long light paths. In addition, the light components corresponding to the three primary colors which are modulated by the light valves 100R, 100G, and 100G, respectively, are combined again by a dichroic prism 1112, and then projected as a color image on a screen 1120 through the projection lens 1114.

The present invention is not limited to the aforementioned exemplary embodiments, and can be appropriately modified without departing from the principle or sprit of the invention. Any electro-optical device and electronic apparatus involved in the modifications are also included into the technical scope of the present invention. The electro-optical device can be adapted to an electrophoresis device, an electroluminescent device, or a device using electron emitting elements (a field emission display and a surface-conduction electron-emitter display).

What is claimed is:

1. An electro-optical device comprising, above a substrate:
   a substrate;
   a pixel electrode;
   a data line extending in a first direction;
   a thin film transistor including a semiconductor layer having a channel region that extends in a longitudinal direction;
   a storage capacitor electrically connected to the thin film transistor and the pixel electrode, the storage capacitor including a fixed capacitance line disposed between the pixel electrode and the data line at a position that overlaps the thin film transistor in plan view, the fixed capacitance line having a light shielding property that shields the thin film transistor from incident light;
   a gate electrode that overlaps with the channel region in plan view;
   a scanning line extending in a second direction and intersecting the data line, the scanning line being located in between the substrate and the channel;
   an insulation layer that separates the gate electrode from the scanning line; and
   contact holes that penetrate through the insulation layer to bring the gate electrode into electrical connection with the scanning line, the contact holes being disposed at sides of the channel region.

2. The electro-optical device according to claim 1, wherein the scanning line has a light shielding property.

3. The electro-optical device according to claim 1, wherein the scanning line includes a main-body part extending in a direction that intersects the longitudinal direction.

4. The electro-optical device according to claim 1, further comprising an upper light-shielding film at least covering the channel region of the thin film transistor from the upper side, at least a part of the upper light-shielding film being formed in a concave shape in a cross section perpendicular to the longitudinal direction of the channel region.

5. The electro-optical device according to claim 1, the scanning line including a light-shielding film containing metal or alloy.

6. The electro-optical device according to claim 1, wherein the fixed capacitance line extends in the second direction and being made of a multi-layered film including a low-resistive film.

7. The electro-optical device according to claim 1, the pixel electrode being electrically connected to other layers of a laminated structure through at least one of a titanium simple substance, a tungsten simple substance, a compound of titanium and tungsten, or a stack thereof.

8. The electro-optical device according to claim 7, wherein the laminated structure includes:
   interlayer insulating film provided as bases of the pixel electrodes, a contact hole formed in the interlayer insulating film to electrically connect the pixel electrodes thereto, and film formed at, at least an inside surface of the contact hole and a lower layer of the pixel electrodes, the film including a titanium simple substance, a tungsten simple substance, a compound of titanium or tungsten, or a stack thereof.

9. The electro-optical device according to claim 1, wherein the data line is formed of the same film as one of a pair of electrodes of the storage capacitor.

10. The electro-optical device according to claim 1, further comprising:

relay layers as a part of a laminated structure, the relay layers electrically connecting the pixel electrode to one of a pair of electrodes of the storage capacitor.

11. The electro-optical device according to claim 10, wherein the shielding layer is formed of the same film as the relay layer.

12. The electro-optical device according to claim 1, at least some elements of the scanning line, the data line, a pair of electrodes of the storage capacitor constitute an embedded light-shielding film in the laminated structure.

13. The electro-optical device according to claim 1, wherein the scanning lines includes:

a metal layer that contains a high-melting-point metal simple substance or a metal compound, and a barrier layer that is made of a high-melting-point and oxygen-free metal or a metal compound laminated on at least one surface of the metal layer.

14. The electro-optical device according to claim 13, wherein the metal layer includes a light-shielding metal layer and a light-absorbing metal layer, the light-absorption metal layer facing the thin film transistor.

15. The electro-optical device according to claim 13, further comprising another barrier layer, the metal layer being interposed between the barrier layer and the other barrier layer.

* * * * *